US012651135B1

(12) United States Patent
Bondarenko et al.

(10) Patent No.: US 12,651,135 B1
(45) Date of Patent: Jun. 9, 2026

(54) SYSTEM CONTROLLED BY DATA BEARING RECORDS

(71) Applicant: OEConnection LLC, Fairlawn, OH (US)

(72) Inventors: Igor Bondarenko, Pepper Pike, OH (US); Scott Morman, Akron, OH (US); Mike Folk, Cleveland, OH (US); Guillermo Lopez, Bloomfield Hills, MI (US); Sarah Truman, Seven Hills, OH (US); Katherine Golden, Chagrin Falls, OH (US)

(73) Assignee: OECONNECTION LLC, Fairlawn, OH (US)

( * ) Notice: Subject to any disclaimer, the term of this patent is extended or adjusted under 35 U.S.C. 154(b) by 0 days.

(21) Appl. No.: 19/256,479

(22) Filed: Jul. 1, 2025

Related U.S. Application Data

(63) Continuation of application No. 18/753,703, filed on Jun. 25, 2024, now Pat. No. 12,353,950, which is a continuation of application No. 18/211,984, filed on Jun. 20, 2023, now Pat. No. 12,026,579, which is a continuation of application No. 17/577,843, filed on Jan. 18, 2022, now Pat. No. 11,704,514, which is a continuation of application No. 17/014,393, filed on Sep. 8, 2020, now Pat. No. 11,238,250, which is a continuation of application No. 16/702,158, filed on Dec. 3, 2019, now Pat. No. 10,817,686, which is a continuation of application No. 16/385,768, filed on Apr. 16, 2019, now Pat. No. 10,540,529, which is a continuation-in-part of application No. 16/139,274, filed on Sep. 24, 2018, now Pat. No. 10,372,953, which is a continuation-in-part of application No. 15/877,550, filed on Jan. 23, 2018, now Pat. No. 10,121,037, which is a continuation-in-part of application No. 15/646,834, filed on Jul. 11, 2017, now Pat. No. 9,904,829, which is a continuation of application No. 15/093,057, filed on Apr. 7, 2016, now Pat. No. 9,747,481.

(60) Provisional application No. 62/193,178, filed on Jul. 16, 2015.

(51) Int. Cl.
*G06K 7/14* (2006.01)
*G06K 7/10* (2006.01)

(52) U.S. Cl.
CPC ....... *G06K 7/10722* (2013.01); *G06K 7/1413* (2013.01); *G06K 7/1417* (2013.01)

(58) Field of Classification Search
CPC ........................... G06K 7/1413; G06K 7/1417
USPC ........................................................ 235/385
See application file for complete search history.

(56) References Cited

U.S. PATENT DOCUMENTS 9,747,481 B1 * 8/2017 Bondarenko ........ G06K 7/1413
9,904,829 B1 * 2/2018 Bondarenko .......... G06Q 10/20

* cited by examiner

*Primary Examiner* — Toan C Ly
(74) *Attorney, Agent, or Firm* — Ralph E. Jocke; WALKER & JOCKE

(57) ABSTRACT

A system controlled responsive at least in part to data read from data bearing records is operative to cause vehicle parts usable to repair or upgrade vehicles to be determined and furnished. Further parts that are determined as near the end of useful life are determined responsive to stored vehicle operation data. A repair estimate calculation circuit (RECC) operates responsive to the read data to produce a needed parts record (NPR). The records produced by the RECC are operative to cause a vehicle repair entity (VRE) to be furnished the vehicle repair or upgrade parts.

28 Claims, 64 Drawing Sheets

PPC

API FOR REPAIR ESTIMATE

COLLISION ESTIMATING SYSTEM (CES)

API OBJECTS

THE EIGHT (8) OBJECTS YOU WILL ENCOUNTER IN THE API

- NEW ESTIMATE
- ESTIMATE HEADER
- PARTS
- PART
- RELATED PART
- QUOTES
- EMS DATA
- ERRORS

FIG. 6

OBJECT: NEW ESTIMATE

OVERVIEW

THE NEW ESTIMATE OBJECT CONTAINS THE UNIQUE ESTIMATE FILE IDENTIFICATION NUMBER AND NAME OF THE BODY SHOP (VEHICLE REPAIR ENTITY)

| KEY | VALUE TYPE | VALUE DESCRIPTION | INPUT/OUTPUT | REQUIRED (Y/N) |
|-----|-----------|-------------------|--------------|----------------|
| UNIQUE FILE ID | STRING | THE CES UNIQUE IDENTIFIER FOR THE ESTIMATE<br><br>EXAMPLE:<br>"UNIQUEFILEID": "CD8D58C4" | INPUT | Y |
| REQUESTORCOMPANYNAME | STRING | THE COMPANY NAME OF THE REQUESTOR OF THE ESTIMATE<br><br>EXAMPLE:<br>"REQUESTORCOMPANYNAME" "BOB'S BODY SHOP" | INPUT | Y |

FIG. 7

OBJECT: ESTIMATE HEADER

OVERVIEW
AN ESTIMATE HEADER CONTAINS ALL THE NECESSARY INFORMATION TO PROPERLY
PRICE PARTS.

| KEY | VALUE TYPE | VALUE DESCRIPTION | INPUT/OUTPUT | REQUIRED (Y/N) |
|---|---|---|---|---|
| UNIQUE FILE ID | STRING | THE AUTOMAKER THAT MANUFACTURED THE VEHICLE.<br><br>EXAMPLE:<br><br>"MANUFACTURER": "GM" | INPUT | Y |
| UNIQUE FILE ID | INT | INSURANCE COMPANY ID.<br><br>STANDARDIZED ID LIST FOR ALL KNOWN INSURANCE COMPANIES<br><br>EXAMPLE:<br><br>"INSURANCEID": "1" | INPUT | N |
| VIN | STRING | MANUFACTURER'S VEHICLE IDENTIFICATION NUMBER.<br><br>EXAMPLE:<br><br>"VIN": "1G6DV1EX6C0118048" | INPUT | N |
| YEAR | INT | THE MODEL YEAR OF THE VEHICLE. VCDB FORMAT REQUIRED.<br><br>EXAMPLE:<br><br>"YEAR": 2012 | INPUT | N |

FIG. 8

| MAKE | STRING | THE PARTICULAR BRAND OF A VEHICLE. FOR EXAMPLE, CHEVROLET. VCDB FORMAT REQUIRED.<br><br>EXAMPLE:<br><br>"MAKE": "BUICK" | INPUT | n |
|---|---|---|---|---|
| MODEL | STRING | THE SPECIFIC MODEL THAT IDENTIFIES THE VEHICLE. VCDB FORMAT REQUIRED. FOR EXAMPLE, MALIBU.<br><br>EXAMPLE:<br><br>"MODEL": "REGAL" | INPUT | N |
| MILEAGE | INT | THE MILEAGE OF THE VEHICLE .<br><br>EXAMPLE:<br><br>"MILEAGE": 29000 | INPUT | N |
| STATE | STRING | THE STATE WHERE THE VEHICLE'S OWNER RESIDES. USE THE 2-CHARACTER ABBREVIATION AS LISTED IN THE ISO 3166-2 STANDARD PUBLISHED BY THE ISO 3166 MAINTENANCE AGENCY (ISO 3166/MA).<br><br>EXAMPLE:<br><br>"STATE": "OH" | INPUT | N |

FIG. 8A

OBJECT: PARTS

OVERVIEW
A PARTS OBJECT IS A REQUEST AND RESPONSE LIST PRICING ON ONE OR MORE OE PARTS IN A
COLLISION TRANSACTION.

| KEY | VALUE TYPE | VALUE DESCRIPTION | INPUT/OUTPUT | REQUIRED (Y/N) |
|---|---|---|---|---|
| ESTIMATEHEADER | ESTIMATEHEADER OBJECT | FIG 8 FOR DETAILED INFORMATION | INPUT | Y |
| PARTS | LIST OF PART OBJECTS | FIG 10 FOR DETAILED INFORMATION | INPUT | Y |

FIG. 9

OBJECT: PART

OVERVIEW
A PART OBJECT CONTAINS INFORMATION ABOUT THE PART BEING PRICED.

| KEY | VALUE TYPE | VALUE DESCRIPTION | INPUT/OUTPUT | REQUIRED (Y/N) |
|---|---|---|---|---|
| PARTNUMBER | STRING | UNIQUE IDENTIFIER FOR A PART. EXAMPLE: "PARTNUMBER": "123456" | INPUT | Y |
| UNIQUESEQUENCENUMBER | INT | UNIQUE SEQUENCE NUMBER. EXAMPLE: "UNIQUESEQUENCENUMBER": 1 | INPUT | N* *EXCEPTION REQUIRED FOR POST/ESTIMATES /{ESTIMATEID}/QUOTES AND PUT/ESTIMATES /{ESTIMATEID}/QUOTES METHODS. |
| RELATEDPART | RELATED PART OBJECT | FOR DETAILED INFORMATION | INPUT | N |
| DESCRIPTION | STRING | THE DESCRIPTION OF THE PART. EXAMPLE: "DESCRIPTION": "FENDER- FRONT BRACKET- RIGHT" | OUTPUT | N |
| QUANTITY | INT | QUANTITY REQUESTED EXAMPLE: "QUANTITY": 1 | INPUT | N* *EXCEPTION RECCOMENDED FOR POST/ESTIMATES /{ESTIMATEID}/QUOTES AND PUT/ESTIMATES /{ESTIMATEID}/QUOTES METHODS. IF THIS IS NOT SPECIFIED, THEN PPC WILL DEFAULT TO "1". |
| DATABASELISTPRICE | DECIMAL | LIST PRICE PROVIDED BY THE CES. EXAMPLE: "DATABASELISTPRICE" 33.98 | INPUT | N* *EXCEPTION REQUIRED FOR POST/ESTIMATES /{ESTIMATEID}/QUOTES AND PUT/ESTIMATES /{ESTIMATEID}/QUOTES METHODS. |
| PRICE | DECIMAL | PART PRICE PROVIDED BY THE OEM. EXAMPLE: "PRICE": 33.98 | OUTPUT | N |

FIG. 10

OBJECT: RELATED PART

OVERVIEW
A RELATED PART OBJECT IS THE EQUIVALENT AFTER-MARKET, REMANUFACTURED OR SALVAGED PART INFORMATION.

| KEY | VALUE TYPE | VALUE DESCRIPTION | INPUT/OUTPUT | REQUIRED (Y/N) |
|---|---|---|---|---|
| PARTNUMBER | STRING | UNIQUE IDENTIFIER FOR A PART.<br><br>EXAMPLE:<br>"PARTNUMBER": "123456" | INPUT | N |
| DESCRIPTION | STRING | THE DESCRIPTION OF THE PART.<br><br>EXAMPLE:<br>"DESCRIPTION": "FENDER- FRONT BRACKET- RIGHT" | INPUT | N |
| TYPE | STRING | VALID PART TYPES ARE:<br><br>○ AM (AFTER-MARKET PART)<br>○ REMAN (REMANUFACTURED PART)<br>○ SALV (SALVAGED PART)<br>○ UNKNOWN<br><br>EXAMPLE:<br>"TYPE": "AM" | INPUT | N |
| PRICE | DECIMAL | PART PRICE PROVIDED FOR THE PART TYPE INDICATED.<br>EXAMPLE:<br>"PRICE": 33.98 | INPUT | N |

FIG. 11

OVERVIEW

OBJECT: QUOTES     A QUOTE OBJECT IS A FINAL LIST OF PARTS ON THE ESTIMATE.

| KEY | VALUE TYPE | VALUE DESCRIPTION | INPUT/OUTPUT | REQUIRED (Y/N) |
|---|---|---|---|---|
| QUOTEID | LONG | THE IDENTIFICATION NUMBER ISSUED FOR THE QUOTE. EXAMPLE: <br> "QUOTEID": 98765 | OUTPUT | N |
| PARTS | LIST OF PART OBJECTS | SEE FIG 10 PART OBJECT DEFINITION. | INPUT | N |

FIG. 12

OBJECT: EMS DATA
OVERVIEW
AN EMS DATA OBJECT CONTAINS A COMPLETE EMS DATA SET (PPR DATA)

FIG. 13

OBJECT: ERRORS
OVERVIEW
AN ERROR IS A COMBINATION OF A UNIQUE CODE AND RELATED MESSAGE THAT DESCRIBES THE
REASON A QUOTEREQUEST IS INVALID OR REJECTED.

| KEY | VALUE TYPE | VALUE DESCRIPTION |
|---|---|---|
| CODE | INT | THE CODE RETURNED THE PPC SERVER INDICATE WHY A QUOTE REQUEST IS INVALID OR REJECTED. EXAMPLE: <br><br> "CODE": 404 |
| MESSAGE | STRING | MESSAGE DESCRIBING THE ERROR AND WHY IT OCCURRED. <br><br> "MESSAGE": "NOT FOUND" |

FIG. 14

METHOD
ENDPOINT REFERENCE
API ENDPOINTS GIVE EXTERNAL CES APPLICATIONS THE ABILITY TO RETRIEVE LIST PRICING FOR PARTS IN AN ESTIMATE AND
AND CREATE QUOTES WITH ALL THE PARTS SELECTED IN THE ESTIMATE.

| METHOD | VALUE | USAGE | RETURNS |
|---|---|---|---|
| POST | /ESTIMATES | GENERATES A NEW ESTIMATE ID. | RETURNS A UNIQUE ESTIMATE ID PROVIDED BY PPC. |
| POST | /ESTIMATES/{ESTIMATEID}/PARTS | SENDS A LIST OF PARTS ASSOCIATED TO THE ESTIMATE FOR PRICING. | RETURNS LIST OF PARTS WITH PRICING INFORMATION. ONLY OE (MAN) MYPRICELINK PARTS ARE ACCEPTED. PRICES ARE CALCULATED FOR OE MYPRICELINK PARTS. OE PARTS THAT ARE NOT MYPRICELINK PARTSWILL BE RETURNED AS $0. NON-OE PARTS WILL BE RETURNED AS NULL WITH A PART DESCRIPTION OF "INVALID PART NUMBER". |
| POST | /ESTIMATES/{ESTIMATEID}/QUOTES | CREATES A QUOTE FOR THE ESTIMATE WITH THE FINAL LIST OF PARTS. | QUOTE OBJECT. |
| POST | /ESTIMATES/{ESTIMATEID}/EMSDATA | SUBMITS AN ESTIMATE'S ENTIRE EMS DATA SET. | RETURNS A UNIQUE EMS DATA ID PROVIDED BY PPC. |
| PUT | /ESTIMATES/{ESTIMATEID}/QUOTES/{QUOTEID} | UPDATES THE QUOTE WITH THE NEW LIST OF PARTS. | SUCCESS OR FAILURE. |
| PUT | /ESTIMATES/{ESTIMATEID}/EMSDATA/{EMSDATAID} | UPDATES THE ESTIMATE'S ENTIRE EMS DATA SET. | SUCCESS OR FAILURE. |

FIG. 15

POST /ESTIMATES

OVERVIEW
CREATES THE ESTIMATE AND RETURNS THE NEWLY CREATED ESTIMATE ID.

RESOURCE URL
HTTPS://API.OECONNECTION.COM/ESTIMATES/

RESOURCE INFORMATION

| | |
|---|---|
| RESPONSE FORMATS | JSON |
| REQUIRES AUTHENTICATION | YES |
| RATE LIMITED | YES |
| REQUESTS/15-MIN WINDOW (USER AUTH) | TBD |

EXAMPLE REQUEST
POST HTTP://API.OECONNECTION.COM/ESTIMATES/

EXAMPLE REQUEST BODY

```
{
    "UNIQUEFILEID": "CD8D59C4"
    "REQUESTORCOMPANYNAME": "BOB'S BODY SHOP"
}
```

EXAMPLE RESULT

```
HTTP/1.1 200 OK
CONTENT-TYPE: APPLICATION/JSON;CHARSET=UTF-8

{
    "ESTIMATEID": 22788411
}
```

FIG. 17

POST /ESTIMATES/{ESTIMATEID}/PARTS

OVERVIEW
RETRIEVES PART PRICES. ONLY OE MYPRICELINK PARTS ARE ACCPETED. OE PARTS THAT ARE NOT MYPRICELINK PARTS WILL RETURN $0.00 PRICING. NON-OE PARTS WILL BE RETURNED AS NULL WITH A PART DESCRIPTION OF "INVALID PART NUMBER".

RESOURCE URL
HTTPS://API.OECONNECTION.COM/ESTIMATES/{ESTIMATEID}/PARTS

RESOURCE INFORMATION

| | |
|---|---|
| RESPONSE FORMATS | JSON |
| REQUIRES AUTHENTICATION | YES |
| RATE LIMITED? | YES |
| REQUESTS/15-MIN WINDOW (USER AUTH) | TBD |

EXAMPLE REQUEST
POST HTTP://API.OECONNECTION.COM/ESTIMATES/101/PARTS

EXAMPLE BODY REQUEST

```
{
    "ESTIMATEHEADER": {
        "MANUFACTURER": "GM",
        "INSURANCEID": "1",
        "VIN": "1G6DV1EX6C0118048",
        "YEAR": "2012",
        "MAKE": "BUICK",
        "MODEL": "REGAL",
        "MILEAGE": "29000",
        "STATE": "OH",
    },
    "PARTS": {
        {
            "PARTNUMBER": "4744116"
        },
        {
            "PARTNUMBER": "25656397"
        },
        {
            "PARTNUMBER": "AMPARTNO"
        }
    }
}
```

FIG. 18

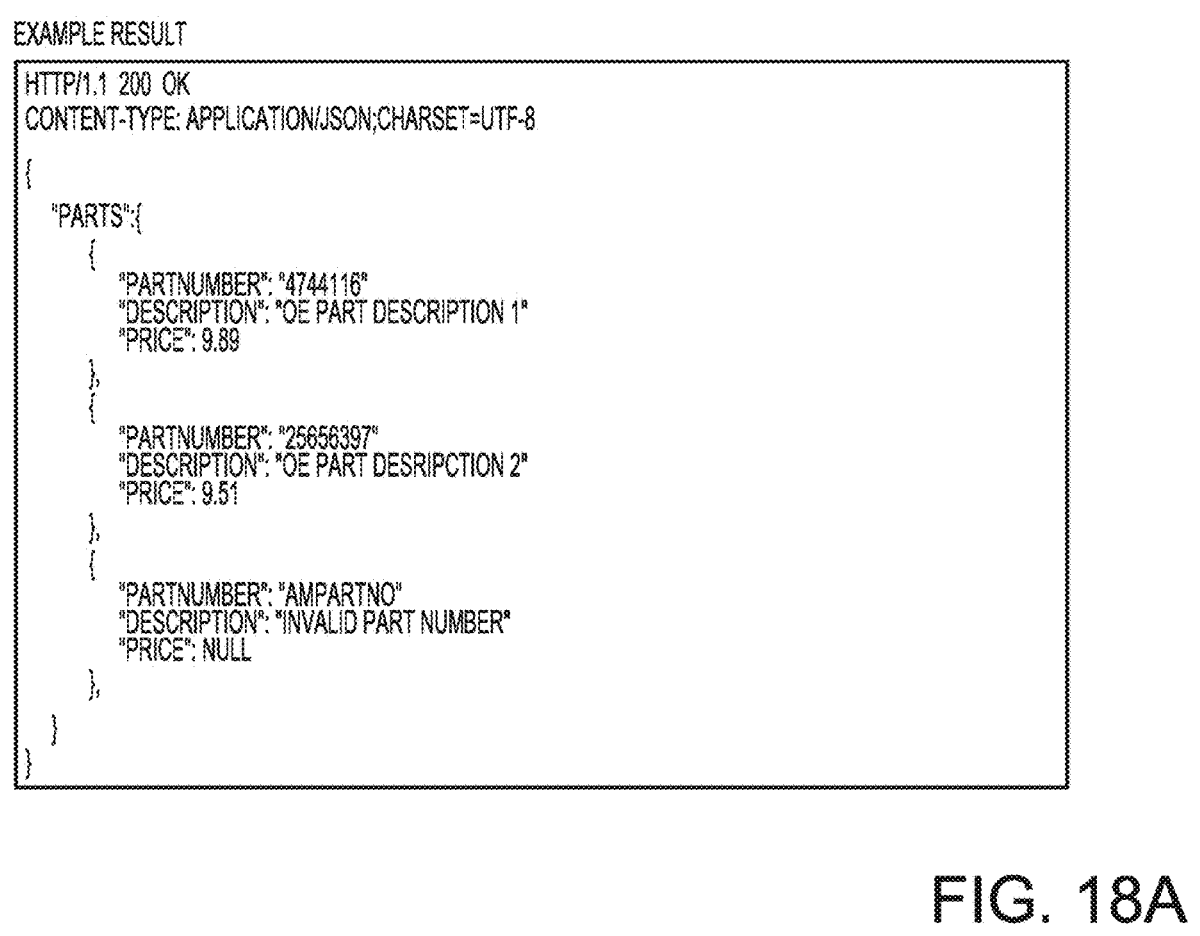

EXAMPLE RESULT

```
HTTP/1.1 200 OK
CONTENT-TYPE: APPLICATION/JSON;CHARSET=UTF-8

{
   "PARTS":{
      {
         "PARTNUMBER": "4744116"
         "DESCRIPTION": "OE PART DESCRIPTION 1"
         "PRICE": 9.89
      },
      {
         "PARTNUMBER": "25656397"
         "DESCRIPTION": "OE PART DESRIPCTION 2"
         "PRICE": 9.51
      },
      {
         "PARTNUMBER": "AMPARTNO"
         "DESCRIPTION": "INVALID PART NUMBER"
         "PRICE": NULL
      },
   }
}
```

FIG. 18A

POST /ESTIMATES/{ESTIMATEID}/QUOTES

FIG. 19

OVERVIEW

CREATES A QUOTE WITH THE FINAL LIST OF PARTS FOR THE ESTIMATE AND RETURNS THE NEWLY CREATED QUOTE ID. BOTH OE AND NON-OE PARTS ARE ACCEPTED. OE PARTS ONLY REQUIRE A PART NUMBER. NON-OE PARTS REQUIRE PRICING AND DESCRIPTION. OE AND NON-OE PARTS REQUIRE A QUANTITY.

RESOURCE URL
HTTPS://API.OECONNECTION.COM/ESTIMATES/{ESTIMATEID}/QUOTES

RESOURCE INFORMATION

| RESPONSE FORMATS | JSON |
|---|---|
| REQUIRES AUTHENTICATION | YES |
| RATE LIMITED | YES |
| REQUESTS/15-MIN WINDOW (USER AUTH) | TBD |

EXAMPLE REQUEST
POST HTTP://API.OECONNECTION.COM/ESTIMATES/

EXAMPLE REQUEST BODY

```
{
    "PARTS": [
        {
            "PARTNUMBER": "4744116",
            "UNIQUESEQUENCENUMBER": 1,
            "QUANTITY": 1,
            "DATABASELISTPRICE": 10.25
        },
        {
            "PARTNUMBER": "25656397",
            "UNIQUESEQUENCENUMBER": 2,
            "QUANTITY": 1,
            "DATABASELISTPRICE": 15.99
        },
        {
            "PARTNUMBER": "87657320",
            "UNIQUESEQUENCENUMBER": 3,
            "QUANTITY": 1,
            "RELATEDPART": {
                "PARTNUMBER":    " ",
                "DESCRIPTION": "AM PART DESCRIPTION 2",
                "TYPE": "AM ",
                "PRICE": 10.00
            }
        }
    ]
}
```

EXAMPLE RESULT

```
HTTP/1.1 200 OK
CONTENT-TYPE: APPLICATION/JSON;CHARSET=UTF-8

{
    "QUOTEID": 98765
}
```

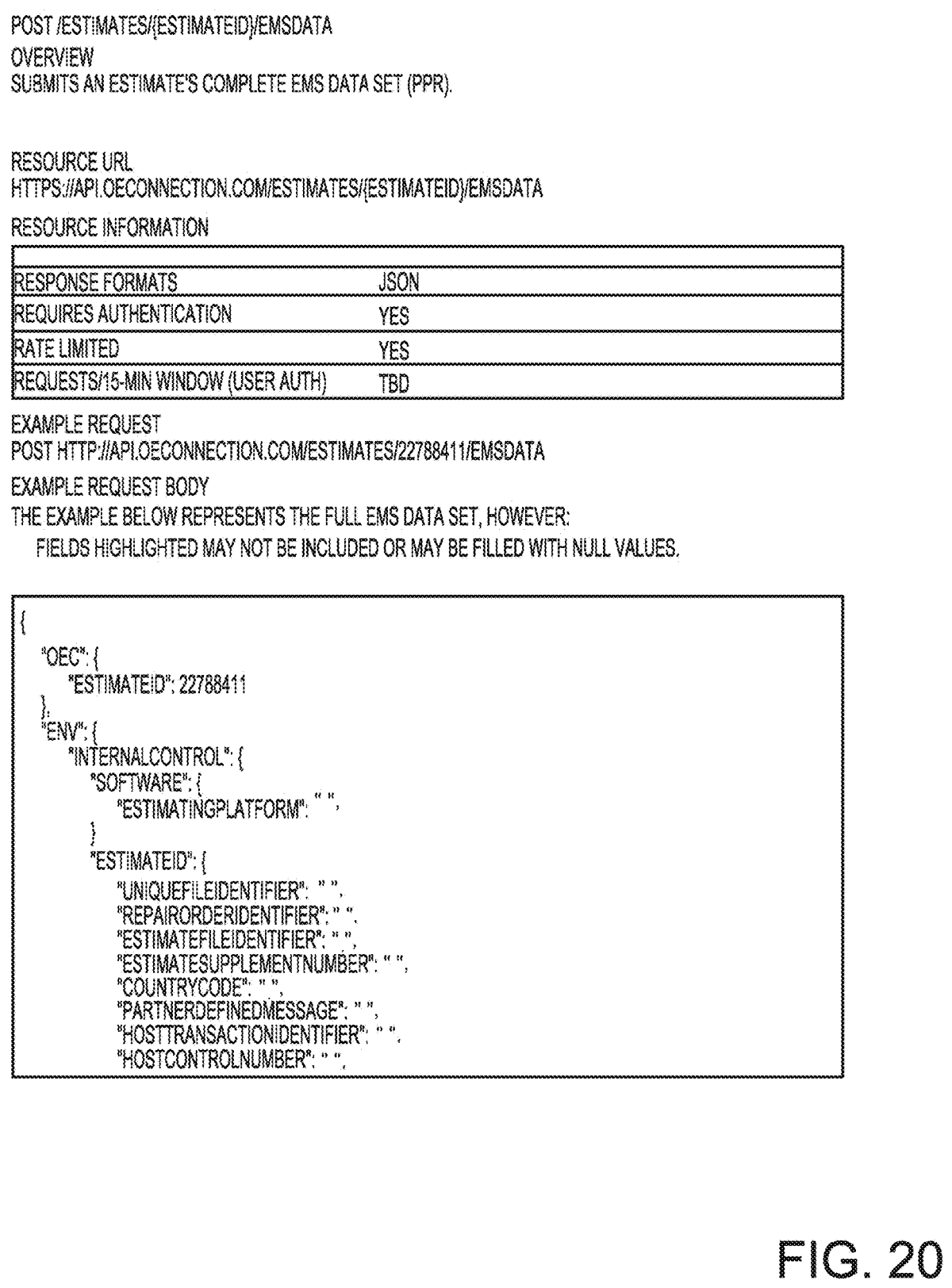

POST /ESTIMATES/{ESTIMATEID}/EMSDATA
OVERVIEW
SUBMITS AN ESTIMATE'S COMPLETE EMS DATA SET (PPR).

RESOURCE URL
HTTPS://API.OECONNECTION.COM/ESTIMATES/{ESTIMATEID}/EMSDATA

RESOURCE INFORMATION

| | |
|---|---|
| RESPONSE FORMATS | JSON |
| REQUIRES AUTHENTICATION | YES |
| RATE LIMITED | YES |
| REQUESTS/15-MIN WINDOW (USER AUTH) | TBD |

EXAMPLE REQUEST
POST HTTP://API.OECONNECTION.COM/ESTIMATES/22788411/EMSDATA

EXAMPLE REQUEST BODY
THE EXAMPLE BELOW REPRESENTS THE FULL EMS DATA SET, HOWEVER:
    FIELDS HIGHLIGHTED MAY NOT BE INCLUDED OR MAY BE FILLED WITH NULL VALUES.

```
{
    "OEC": {
        "ESTIMATEID": 22788411
    },
    "ENV": {
        "INTERNALCONTROL": {
            "SOFTWARE": {
                "ESTIMATINGPLATFORM": " ",
            }
            "ESTIMATEID": {
                "UNIQUEFILEIDENTIFIER": " ",
                "REPAIRORDERIDENTIFIER": " ",
                "ESTIMATEFILEIDENTIFIER": " ",
                "ESTIMATESUPPLEMENTNUMBER": " ",
                "COUNTRYCODE": " ",
                "PARTNERDEFINEDMESSAGE": " ",
                "HOSTTRANSACTIONIDENTIFIER": " ",
                "HOSTCONTROLNUMBER": " ",
```

FIG. 20

```
          "TRANSACTIONTYPE": " "
          "ESTIMATESUPPLEMENTSTATUS": " "
          "CREATIONDATE": " "
          "TRANSMITDATE": " "
        }
      }
  },
  "AD1": {
     "CLAIMDATA": " "
        "INSUARNCECOMPANY": {
           "COMPANYIDCODE": " "
           "COMPANYNAME":    " "
        },
        "CLAIMINFORMATION": {
           "ASSIGNMENTTYPE": " "
        },
        "LOSSINFORMATION": {
           "CATASTROPHENUMBER": " "
           "TOTALLOSS": " "
        }
     }
  }
  "AD2": {
     "INSPECTIONSITE": {
        "INSPECTIONDATE":  " "
     }
     "REPAIRFACILITY": {
        "COMPANYIDCODE": " ",
        "COMPANYNAME":  " ",
        "CITY": " ",
        "STATEPROVINCE": " ",
        "ZIPPOSTALCODE": " ",
        "COUNTRY": " ",
     }
     "REPAIRINFORMATION": {
        "VEHICLEDATEINSHOP": " ",
        "VEHICLETIMEINSHOP":  " ",
        "AUTHORIZATIONMEMO": " ",
        "VEHICLETARGETCOMPLETIONDATE": " ",
        "VEHICLETARGETCOMPLETIONTIME": " ",
        "VEHICLECOMPLETIONDATE": " ",
        "VEHICLECOMPLETIONTIME": " ",
     }
     "LOCATIONOFVEHICLE": {
        "CITY": " ",
        "STATEPROVINCE": " ",
        "ZIPPOSTALCODE": " ",
        "COUNTRY": " "
     }
```

FIG. 20A

```
},
"VEH": {
    "VEHICLE": {
        "CLAIMRELATED": {
            "PRIMARYPOINTOFIMPACT": " "
            "SECONDARYPOINTOFIMPACT": " "
        },
        "IDENTIFICATION": {
            "DATBASEVEHICLECODE": " "
            "LICENSEPLATESTATEPROVINCE": " ",
            "VIN": " ",
            "VEHICLECONDITION": " ",
            "PRODUCTIONDATE": " ",
            "YEAR": " ",
            "MAKECODE": " ",
            "MAKEDESCRIPTION": " ",
            "MODEL": " ",
            "VEHICLETYPE": " ",
            "BODYSTYLE": " ",
            "TRIMCODE": " ",
            "TRIMCOLOR": " ",
            "MOLDINGCODE": " ",
            "ENGINESIZE": " ",
            "MILEAGE": " ",
            "OPTIONSLIST": " "
        }
    }
}
"LIN": [{
    "INTERNALCONTROL": {
        "LINEINDICATOR": " "
    }
    "PART": {
        "DESCRIPTION": " "
            "PARTTYPE": " ",
            "DESCRIPTIONJUDGEMENTFLAG": " ",
            "GLASSPARTFLAG": " ",
            "OEMPARTNUMBER": " ",
            "PRICEINCLUDEDINDICTATOR": " ",
            "ALTERNATEPARTINDICATOR": " ",
            "TAXABLEFLAG": " ",
            "DATABASEPARTPRICE": " ",
            "ACTUALPARTPRICE": " ",
            "PRICEJUDGEMENTFLAG": " ",
            "CERTIFIEDFLAG": " ",
            "QUANTITY": " "
        },
```

FIG. 20B

```
            "NONOEMSUPPLIER": {
                "COMPANYIDCODE": " ",
                "NONOEMPARTNUMBER": " ",
                "NONOEMSUPPLIERUSEROVERRIDE": " ",
                "NONOEMSUPPLIERMEMO": " ",
            },
            "ADJUSTMENT": {
                "PERCENT": " ",
                "AMOUNT": " "
            }
        },
        "LABOR": {
            "DESCRIPTION": {
                "TYPE": " ",
                "ACTUALHOURS": " ",
                "HOURSJUDGEMENTFLAG": " ",
                "TYPEJUDGEMENTFLAG": " "
            }
        }
    }],
    "PFP": {
        "PARTS": [{
            "MARKUPPERCENTAGE": " ",
            "MARKUPTYPEINDICATOR": " ",
            "DISCOUNTPERCENT": " ",
        }]
    },
    "STI": {
        "SUBTOTAL": [{
            "TOTALTYPE": " "
            "TOTALTYPECODE": " ",
            "SUBTOTALDETAIL": {
                "TAXABLEAMOUNT": " "
            }
        }]
    },
    "TTL": {
        "GROSSNETTOTALS": {
            "GROSSTOTALAMOUNT": " "
        }
    }
}
}
```

EXAMPLE RESULT

```
HTTP/1.1 201 OK
CONTENT-TYPE: APPLICATION/JSON;CHARSET=UTF-8

{ "EMSDATAID": "CD8D594C" }
```

FIG. 20C

PUT /ESTIMATES/{ESTIMATEID}/QUOTES

OVERVIEW
UPDATES THE QUOTE BY REPLACING THE PARTS IN THE QUOTE WITH A NEW LIST OF PARTS

RESOURCE URL
HTTPS://API.OECONNECTION.COM/ESTIMATES/{ESTIMATEID}/QUOTES/{QUOTEID}

RESOURCE INFORMATION

| RESPONSE FORMATS | JSON |
|---|---|
| REQUIRES AUTHENTICATION | YES |
| RATE LIMITED | YES |
| REQUESTS/15-MIN WINDOW (USER AUTH) | TBD |

EXAMPLE REQUEST
PUT HTTP://API.OECONNECTION.COM/ESTIMATES/22788411/QUOTES/98765

EXAMPLE REQUEST BODY

```
{
    "PARTS": [
        {
            "PARTNUMBER": "4744116",
            "UNIQUESEQUENCENUMBER": 1,
            "QUANTITY": 1,
            "DATABASELISTPRICE": 10.25
        },
        {
            "PARTNUMBER": "25656397",
            "UNIQUESEQUENCENUMBER": 2,
            "QUANTITY": 1,
            "DATABASELISTPRICE": 15.99
        },
        {
            "PARTNUMBER": "87657320",
            "UNIQUESEQUENCENUMBER": 3,
            "QUANTITY": 1,
            "RELATEDPART": {
                "PARTNUMBER": " ",
                "DESCRIPTION": "AM PART DESCRIPTION 2",
                "TYPE": "AM ",
                "PRICE": 10.00
            }
        }
    ]
}
```

FIG. 21

EXAMPLE RESULT

```
HTTP/1.1 200 OK
CONTENT-TYPE: APPLICATION/JSON;CHARSET=UTF-8

{ "SUCCESS": TRUE }
```

FIG. 21A

PUT /ESTIMATES/{ESTIMATEID}/EMSDATA/{EMSDATAID}

OVERVIEW
UPDATES AN ESTIMATE'S COMPLETE EMS DATA SET (PPR).

RESOURCE URL
HTTPS://API.OECONNECTION.COM/ESTIMATES/{ESTIMATEID}/EMSDATA/{EMSDATAID}

RESOURCE INFORMATION

| | |
|---|---|
| RESPONSE FORMATS | JSON |
| REQUIRES AUTHENTICATION | YES |
| RATE LIMITED | YES |
| REQUESTS/15-MIN WINDOW (USER AUTH) | TBD |

EXAMPLE REQUEST
POST HTTPS://API.OECONNECTION.COM/ESTIMATES/22788411/EMSDATA/CD8D59C4

EXAMPLE REQUEST BODY
THE EXAMPLE BELOW REPRESENTS THE FULL EMS DATA SET, HOWEVER:
    FIELDS HIGHLIGHTED MAY NOT BE INCLUDED OR MAY BE FILLED WITH NULL VALUES.

```
{
   "OEC": {
      "ESTIMATEID": 22788411
   },
   "ENV": {
      "INTERNALCONTROL": {
         "SOFTWARE": {
            "ESTIMATINGPLATFORM":
         }
         "ESTIMATEID": {
            "UNIQUEFILEIDENTIFIER": " ",
            "REPAIRORDERIDENTIFIER": " ",
            "ESTIMATEFILEIDENTIFIER":   " ",
            "ESTIMATESUPPLEMENTNUMBER": " ",
            "COUNTRYCODE": " ",
            "PARTNERDEFINEDMESSAGE": " ",
            "HOSTTRANSACTIONIDENTIFIER": " ",
            "HOSTCONTROLNUMBER": " "
```

FIG. 22

```
            "TRANSACTIONTYPE": " ",
            "ESTIMATESUPPLEMENTSTATUS": " ",
            "CREATIONDATE": " ",
            "TRANSMITDATE": " "
        }
    }
},
"AD1": {
    "CLAIMDATA":
        "INSUARNCECOMPANY": {
            "COMPANYIDCODE": " ",
            "COMPANYNAME": " "
        },
        "CLAIMINFORMATION": {
            "ASSIGNMENTTYPE": " "
        },
        "LOSSINFORMATION": {
            "CATASTROPHENUMBER": " ",
            "TOTALLOSS": " "
        }
    }
}
"AD2": {
    "INSPECTIONSITE": {
        "INSPECTIONDATE": " "
    }
    "REPAIRFACILITY": {
        "COMPANYIDCODE": " ",
        "COMPANYNAME": " ",
        "CITY": " ",
        "STATEPROVINCE": " ",
        "ZIPPOSTALCODE": " ",
        "COUNTRY": " "
    }
    "REPAIRINFORMATION": {
        "VEHICLEDATEINSHOP": " ",
        "VEHICLETIMEINSHOP": " ",
        "AUTHORIZATIONMEMO": " ",
        "VEHICLETARGETCOMPLETIONDATE": " ",
        "VEHICLETARGETCOMPLETIONTIME": " ",
        "VEHICLECOMPLETIONDATE": " ",
        "VEHICLECOMPLETIONTIME": " "
    }
    "LOCATIONOFVEHICLE": {
        "CITY": " ",
        "STATEPROVINCE": " ",
        "ZIPPOSTALCODE": " ",
        "COUNTRY": " "
    }
```

FIG. 22A

```
},
"VEH": {
    "VEHICLE": {
        "CLAIMRELATED": {
            "PRIMARYPOINTOFIMPACT": " ",
            "SECONDARYPOINTOFIMPACT": " "
        },
        "IDENTIFICATION": {
            "DATBASEVEHICLECODE": " ",
            "LICENSEPLATESTATEPROVINCE": " ",
            "VIN": " ",
            "VEHICLECONDITION": " ",
            "PRODUCTIONDATE": " ",
            "YEAR": " ",
            "MAKECODE": " ",
            "MAKEDESCRIPTION": " ",
            "MODEL": " ",
            "VEHICLETYPE": " ",
            "BODYSTYLE": " ",
            "TRIMCODE": " ",
            "TRIMCOLOR": " ",
            "MOLDINGCODE": " ",
            "ENGINESIZE": " ",
            "MILEAGE": " ",
            "OPTIONSLIST": " "
        }
    }
}
"LIN": [{
    "INTERNALCONTROL": {
        "LINEINDICATOR": " "
    }
    "PART": {
        "DESCRIPTION": " "
            "PARTTYPE": " ",
            "DESCRIPTIONJUDGEMENTFLAG": " ",
            "GLASSPARTFLAG": " ",
            "OEMPARTNUMBER": " ",
            "PRICEINCLUDEDINDICTATOR": " ",
            "ALTERNATEPARTINDICATOR": " ",
            "TAXABLEFLAG": " ",
            "DATABASEPARTPRICE": " ",
            "ACTUALPARTPRICE": " ",
            "PRICEJUDGEMENTFLAG": " ",
            "CERTIFIEDFLAG": " ",
            "QUANTITY": " "
        },
```

FIG. 22B

```
        "NONOEMSUPPLIER": {
            "COMPANYIDCODE": " ",
            "NONOEMPARTNUMBER": " ",
            "NONOEMSUPPLIERUSEROVERRIDE": " ",
            "NONOEMSUPPLIERMEMO": " "
        },
        "ADJUSTMENT": {
            "PERCENT": " ",
            "AMOUNT": " "
        }
    },
    "LABOR": {
        "DESCRIPTION": {
            "TYPE": " ",
            "ACTUALHOURS": " ",
            "HOURSJUDGEMENTFLAG": " ",
            "TYPEJUDGEMENTFLAG": " "
        }
    }
}],
"PFP": {
    "PARTS": [{
        "MARKUPPERCENTAGE": " ",
        "MARKUPTYPEINDICATOR": " ",
        "DISCOUNTPERCENT": " ",
    }]
},
"STI": {
    "SUBTOTAL": [{
        "TOTALTYPE": " ",
        "TOTALTYPECODE": " ",
        "SUBTOTALDETAIL": {
            "TAXABLEAMOUNT": " "
        }
    }]
},
"TTL": {
    "GROSSNETTOTALS": {
        "GROSSTOTALAMOUNT": " "
    }
}
}
```

EXAMPLE RESULT

```
HTTP/1.1 201 OK
CONTENT-TYPE: APPLICATION/JSON;CHARSET=UTF-8

{ "SUCCESS": TRUE }
```

FIG. 22C

EMS DATA BATCH PROCESS
OVERVIEW
THE EMS DATA BATCH PROCESS MAKES IT POSSIBLE FOR THE CES TO SEND LARGE AMOUNTS OF EMS (NPR) DATA TO PPC WITHOUT USING THE CES API..

ADVANTAGES TO USING EMS DATA BATCH PROCESS:
  ∘ SHIFT THE PROCESSING BURDEN FOR LARGE AMOUNTS OF EMS DATA FROM THE CES SERVERS TO THE PPC SERVERS.
  ∘ REDUCE THE CES NETWORK BANDWIDTH AND CONNECTION REQUESTS SIGNIFICANTLY.
  ∘ UPLOAD EMS DATA FOR THOUSANDS OF ESTIMATES.

EMS DATA FILE SETTINGS
DUE TO POTENTIALLY LARGE EMS DATA FILES, PPC REQUIRES THAT FILES BE COMPRESSED USING GZIP. IN ADDITION, THE THE FILE NAMES MUST FOLLOW THIS FORMAT:

<CLIENT_ID>_EMSDATA_<YYYYMMDD>.GZ

PPC WILL VALIDATE WHETHER THE CLIENT_ID SPECIFIED IN THE FILE NAME IS VALID. FILES WITH AN INVALID CLIENT_ID WILL NOT BE PROCESSED.

IN ORDER FOR PPC TO DETERMINE THAT THE FILE HAS BEEN COMPLETELY UPLOADED, A CORRESPONDING DONE FILE MUST BE CREATED. AN EMS DATA FILE WITHOUT A MATCHING DONE FILE WILL NOT BE PROCESSED. THE DONE FILE CAN BE EMPTY.

<CLIENT_ID>_EMSDATA_<YYYYMMDD>.GZ.DONE

THE FILE CONTENTS ARE EXPECTED TO BE IN JSON AND CONTAIN A LIST OF EMS DATA SETS. (NPR)

```
{
    "EMSDATASETS": {
        {
            "OEC": {
                "ESTIMATEID": 22788411
            }
            ... (OMITTED FOR CLARITY)
        },
        {
            "OEC": {
                "ESTIMATEID": 22788412
            }
            ... (OMITTED FOR CLARITY)
        }
    }
}
```

FIG. 23

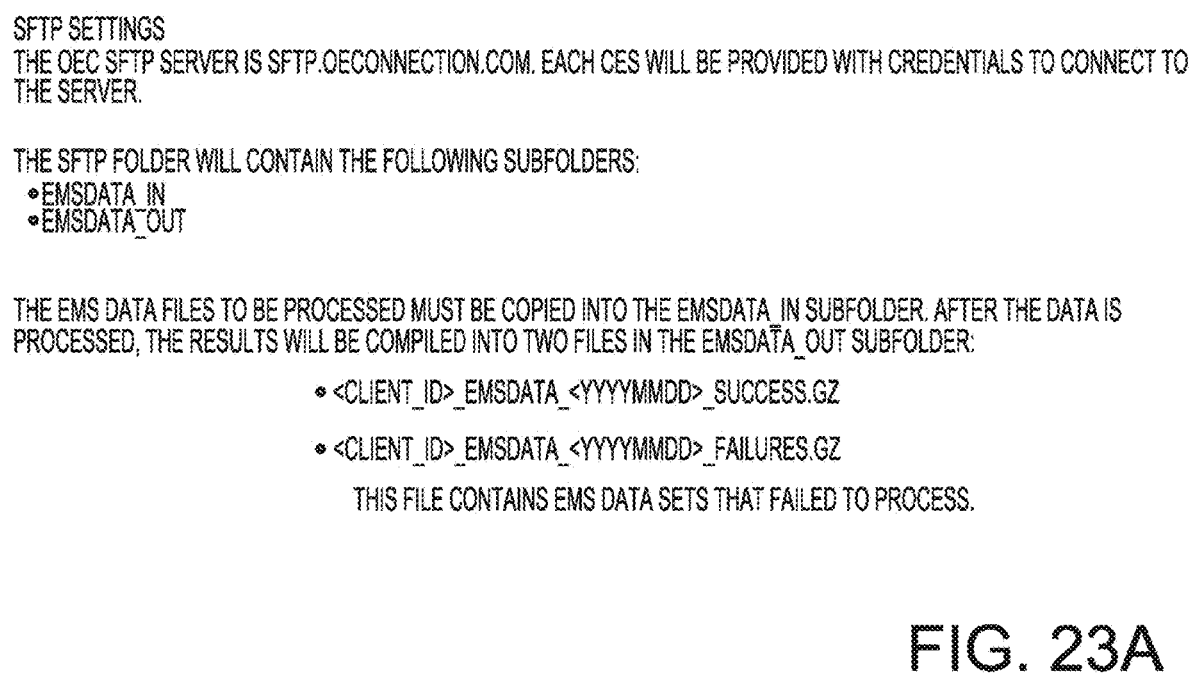

SFTP SETTINGS
THE OEC SFTP SERVER IS SFTP.OECONNECTION.COM. EACH CES WILL BE PROVIDED WITH CREDENTIALS TO CONNECT TO THE SERVER.

THE SFTP FOLDER WILL CONTAIN THE FOLLOWING SUBFOLDERS:
 • EMSDATA_IN
 • EMSDATA_OUT

THE EMS DATA FILES TO BE PROCESSED MUST BE COPIED INTO THE EMSDATA_IN SUBFOLDER. AFTER THE DATA IS PROCESSED, THE RESULTS WILL BE COMPILED INTO TWO FILES IN THE EMSDATA_OUT SUBFOLDER:

• <CLIENT_ID>_EMSDATA_<YYYYMMDD>_SUCCESS.GZ

• <CLIENT_ID>_EMSDATA_<YYYYMMDD>_FAILURES.GZ

THIS FILE CONTAINS EMS DATA SETS THAT FAILED TO PROCESS.

FIG. 23A

PPC API
FOR DEALER MANAGEMENT SYSTEM. (DMS)
(ADPOC)

API OBJECTS
THE FOUR (4) "OBJECTS" YOU WILL ENCOUNTER IN THE API ARE:
- QUOTES
- PARTS
- INVOICES
- ERRORS

FIG. 25

ENDPOINT REFERENCE
PPC API ENDPOINTS GIVE EXTERNAL DMS APPLICATIONS THE ABILITY TO RETRIEVE QUOTES AND PART INFORMATION.

| METHOD | ENDPOINT | USAGE | RETURNS |
|---|---|---|---|
| GET | /INVOICES/QUOTES | RETRIEVES A DEALER'S QUOTES. FIG 32 FOR DETAILED INFORMATION. | ALL QUOTES. |
| GET | /INVOICES/QUOTES/(ID) | RETRIEVE A SPECIFIC QUOTE. FIG 33 FOR DETAILED INFORMATION. | SINGLE QUOTE WITH THE ID NUMBER SPECIFIED. |
| GET | /INVOICES/QUOTES/(ID)/PARTS | RETRIEVE THE PARTS IN A SPEICIFIC QUOTE. FIG 34 FOR INFORMATION. | SPECIFIC QUOTE'S PARTS LIST. |
| POST | /INVOICES | UPDATES THE OECONNECTION PORTAL INFORMATION FROM THE DMS. FIG 35 FOR DETAILED INFORMATION. | SPECIFIC QUOTE'S PARTS LIST. |

FIG. 26

OBJECT: QUOTES
OVERVIEW
A QUOTE IS A RESPONSE TO A CONSUMER REQUEST FOR LIST PRICING ON ONE OR MORE OE PARTS
IN A COLLISION TRANSACTION.

| KEY | VALUE TYPE | VALUE DESCRIPTION |
|---|---|---|
| QUOTEID | LONG | UNIQUE IDENTIFIER FOR A QUOTE IN THE DMS GENERATED BY THE PPC. EXAMPLE: "QUOTEID": 123456 |
| MANUFACTURER | STRING | THE MANUFACTURER THE MANUFACTURED THE VEHICLE. EXAMPLE: "MANUFACTURER": "GM" |
| VIN | STRING | MANUFACTURER'S VEHICLE IDENTIFICATION NUMBER. EXAMPLE: "VIN": "1G6DV1EP6V011804" |
| YEAR | INT | THE MODEL YEAR IF THE VEHICLE.. VCDB FORMAT REQUIRED. EXAMPLE: "YEAR": 2012 |

FIG. 28

| MAKE | STRING | THE PARTICULAR BRAND OF VEHICLE. FOR EXAMPLE, CHEVROLET. VCDB FORMAT REQUIRED.<br><br>EXAMPLE:<br>"MAKE": "BUICK" |
|---|---|---|
| MODEL | STRING | THE SPECIFIC MODEL THAT IDENTIFIES THE VEHICLE. VCDB FORMAT REQUIRED. FOR EXAMPLE, MALIBU.<br><br>EXAMPLE:<br>"MODEL": "REGAL" |
| CUSTOMERID | STRING | THE SUBMITTING CUSTOMER'S UNIQUE IDENTIFICATION NUMBER WITHIN THE DMS. (VRE IDENTIFIER.)<br><br>EXAMPLE:<br>"CUSTOMERID": "100" |
| SALESPERSONID | STRING | THE SALESPERSON/COUNTERPERSON ID USED WHEN CREATING A QUOTE. THIS ID CAN BE UTILIZED TO TRACK AND IDENTIFY THE SALESPERSON RESPONSIBLE FOR THE SALE IN THE DMS.<br><br>EXAMPLE:<br>"SALESPERSONID": "80" |
| STATUS | STRING | VALID STATUSES ARE OPEN AND LOCKED.<br><br>EXAMPLE:<br>"STATUS": "OPEN" |
| CREATEDON | STRING | DATE/TIME THE QUOTE WAS CREATED IN THE PPC APPLICATION.<br><br>EXAMPLE:<br>"CREATEDON": "2014-11-10T18:25:43.5112" |

FIG. 28A

OBJECT: PARTS
OVERVIEW
A PART IS AN ITEM IN A QUOTE THAT A DEALERSHIP PROVIDES THE PRICE OF THE PART, AS LISTED BY THE MANUFACTURER, FOR THE RESPONSE OF THE CUSTOMER.

| KEY | VALUE TYPE | VALUE DESCRIPTION |
|---|---|---|
| PARTNUMBER | STRING | THE IDENTIFICATION NUMBER ISSUED BY THE MANUFACTURER FOR THE PART.<br>EXAMPLE:<br>"PARTNUMBER": "22788411" |
| LINEID | LONG | THE LINE IDENTIFICATION NUMBER OF THE PART IN THE ORIGINAL ESTIMATE.<br>EXAMPLE:<br>"LINEID": 1 |
| DESCRIPTION | STRING | THE DESCRIPTION OF THE PART.<br>EXAMPLE:<br>"DESCRIPTION": "FENDER-FRONT BRACKET RIGHT" |
| QTY | INT | THE QUANTITY OF PARTS TO ORDER.<br>EXAMPLE:<br>"QTY": 1 |
| LISTPRICE | DECIMAL | THE PRICE OF THE PART AS LISTED BY THE MANUFACTURER.<br>EXAMPLE:<br>"LISTPRICE": 33.98 |

FIG. 29

| NETBUYERCOST | DECIMAL | THE PRICE THE DEALERSHIP IS WILLING TO SELL THE PART FOR. NOTE: IF THE DEALER CHOOSES NOT TO SEND THE NETBUYERCOST IN THE PPC PORTAL THEN THIS WOULD DEFAULT TO $0. FOR THIS USE CASE, THE DEALER MAY USE EXISTING PRICING FORMULAS TO CALCULATE PRICE. EXAMPLE: `"NETBUYERCOST": 23.79` |
|---|---|---|
| TRADEPRICE | DECIMAL | TRADE PRICE IS THE SUGGESTED DEALER-TO-DEALER SALES PRICE PRE-DETERMINED BY OE. NOTE: SOME DEALERSHIPS USE THE TRADE PRICE TO CALCULATE THE PRICE THEY ARE WILLING TO SELL A PART FOR (NETBUYERCODE) TO A BODY SHOP. EXAMPLE: `"TRADEPRICE": 25.49` |

FIG. 29A

OBJECT: INVOICES
OVERVIEW
LIST OF PARTS TIED TO QUOTE THAT HAVE BEEN INVOICED IN THE DMS (ADPOC).

| KEY | VALUE TYPE | VALUE DESCRIPTION |
|---|---|---|
| QUOTEID | LONG | PPC SYSTEM GENERATED QUOTE IDENTIFICATION NUMBER. EXAMPLE: "QUOTEID": 123456 |
| INVOICENUMBER | STRING | THE INVOICE IDENTIFICATION NUMBER FROM THE DMS. EXAMPLE: "INVOICENUMBER": "123456" |
| INVOICEDATE | STRING | THE DATE THE INVOICES WAS CREATED IN THE DMS. EXAMPLE: "INVOICEDATE": "2014-11*10T18:25:43.5112" |
| PARTS | LIST OF PART OBJECTS | |

FIG. 30

OBJECT: ERRORS
OVERVIEW
AN ERROR IS A COMBINATION OF A UNIQUE CODE AND RELATED MESSAGE THAT DESCRIBES THE
REASON A QUOTE REQUEST IS INVALID OR REJECTED.

| KEY | VALUE TYPE | VALUE DESCRIPTION |
|---|---|---|
| CODE | INT | THE CODE RETURNED THE PPC SERVER INDICATE WHY A QUOTE REQUEST IS INVALID OR REJECTED.<br>EXAMPLE:<br><br>"CODE": 404 |
| MESSAGE | STRING | MESSAGE DESCRIBING THE ERROR AND WHY IT OCCURRED.<br>EXAMPLE:<br><br>"MESSAGE": "NOT FOUND" |

FIG. 31

GET /INVOICES/QUOTES
RETRIEVES A COLLECTION OF OPEN QUOTES.

RESOURCE URL
HTTPS://API.OECONNECTION.COM/INVOICES/QUOTES

RESOURCE INFORMATION

| | |
|---|---|
| RESPONSE FORMATS | JSON |
| REQUIRES AUTHENTICATION | YES |
| RATE LIMITED | YES |
| REQUESTS/15-MIN WINDOW (USER AUTH) | TBD |

SUPPORTED QUERY PARAMETERS

| PARAMETERS | DESCRIPTION |
|---|---|
| VIN | IF THIS IS SPECIFIED, THEN QUOTES ARE FILTERED BY VIN. |
| SALESPERSONID | IF THIS IS SPECIFIED, THEN QUOTES ARE FILTERED BY SALESPERSONID. |
| CUSTOMERID | IF THIS IS SPECIFIED, THEN QUOTES ARE FILTERED BY CUSTOMERID. |
| FIELDS | COMMA SEPARATED LIST OF AVAILABLE QUOTES. |
| OFFSET | THE $N^{TH}$ PAGE (ZERO BASED) OF DATA. (DEFAULT= ZERO). |
| LIMIT | NUMBER OF ITEMS TO RETURN PER CALL. (DEFAULT= 10; MAX= 100) |
| START_DATE | BEGINNING RANGE OF DATA RETURNED. FORMAT MUST CONFORM TO THE ISO 8601 STANDARD. |
| END_DATE | ENDING RANGE OF DATA RETURNED. FORMAT MUST CONFORM TO THE ISO 8601 STANDARD. |
| SORT | COMMA SEPARATED LIST OF FIELDS TO USE FOR SORTING. BY DEFAULT FIELDS ARE SORTED ASCENDING BY CREATEDON. ADD :A AFTER EACH FIELD TO SORT ASCENDING AND :D DESCENDING. |

EXAMPLE REQUEST 1
POST HTTPS://API.OECONNECTION.COM/INVOICES/QUOTES?OFFSET=0&LIMIT=1

EXAMPLE RESULT 1

```
HTTP/1.1 200 OK
CONTENT-TYPE: APPLICATION/JSON;CHARSET=UTF-8
{
    "QUOTES": {
      {
        "QUOTEID": 3,
        "MANUFACTURER": "GM"
        "VIN": "1G6DV1EPGC011804",
```

FIG. 32

```
                "YEAR": 2014,
                "MAKE": "CADILLAC",
                "MODEL": "CTS",
                "CUSTOMERID": "100",
                "SALESPERSONID": "80",
                "STATUS": "OPEN",
                "CREATEDON": "2014-11-10T18:25:43.5112"
            }
        }
        "_METDATA": {
            "TOTALCOUNT": 1,
            "OFFSET": 0,
            "LIMIT": 1
        }
}
```

EXAMPLE REQUEST 2
POST HTTPS://API.OECONNECTION.COM/INVOICES/QUOTES?VIN=1G6DV1EP6011804&CUSTOMERID=100&SA
LESPERSONID=80&OFFSET=0&LIMIT=1

EXAMPLE RESULT 2

```
HTTP/1.1 200 OK
CONTENT-TYPE: APPLICATION/JSON;CHARSET=UTF-8
{
        "QUOTES": {
            {
                "QUOTEID": 3,
                "MANUFACTURER": "GM"
                "VIN": "1G6DV1EPGC011804",
                "YEAR": 2014,
                "MAKE": "CADILLAC",
                "MODEL": "CTS",
                "CUSTOMERID": "100",
                "SALESPERSONID": "80",
                "STATUS": "OPEN",
                "CREATEDON": "2014-11-10T18:25:43.5112"
            }
        }
        "_METDATA": {
            "TOTALCOUNT": 1,
            "VIN": "1G6DV1EPGC011804",
            "CUSTOMERID": "100",
            "SALESPERSONID": "80",
            "OFFSET": 0,
            "LIMIT": 1
        }
}
```

FIG. 32A

EXAMPLE REQUEST 3
GET
HTTPS://API.OECONNECTION.COM/INVOICES/QUOTES?FIELDS=QUOTEID,YEAR,MAKE,MODEL,CREATEDON&OFF
SET=0&LIMIT=3&SORT=CREATEDON:D
EXAMPLE RESULT 2

```
HTTP./1.1 200 OK
CONTENT-TYPE: APPLICATION/JSON;CHARSET=UTF-8
{
    "QUOTES": {
        {
            "QUOTEID": 3,
            "YEAR": 2014,
            "MAKE": "CADILLAC",
            "MODEL": "CTS",
            "CREATEDON": "2014-11-10T18:25:43.5112"
        }
        {
            "QUOTEID": 2,
            "YEAR": 2012,
            "MAKE": "CHEVROLET",
            "MODEL": "MALIBU",
            "CREATEDON": "2014-11-10T18:25:43.5112"
        }
        {
            "QUOTEID": 1,
            "YEAR": 2014,
            "MAKE": "CHEVROLET",
            "MODEL": "COBALT",
            "CREATEDON": "2014-11-10T18:25:43.5112"
        }
    }
    "_METDATA": {
        "TOTALCOUNT": 3,
        "FIELDS": "QUOTEID,YEAR,MAKE,MODEL,CREATEDON",
        "OFFSET": 0,
        "LIMIT": 3,
        "SORT": "CREATEDON:D"
    }
}
```

FIG. 32B

GET /INVOICES/QUOTES/{ID}
RETRIEVES A SINGLE QUOTE BY ID.

RESOURCE URL
HTTPS://API.OECONNECTION.COM/INVOICES/QUOTES/{ID}

RESOURCE INFORMATION

| | |
|---|---|
| RESPONSE FORMATS | JSON |
| REQUIRES AUTHENTICATION | YES |
| RATE LIMITED | YES |
| REQUESTS/15-MIN WINDOW (USER AUTH) | TBD |

EXAMPLE REQUEST 1
GET HTTPS://API.OECONNECTION.COM/INVOICES/QUOTES/3

EXAMPLE RESULT

```
HTTP/1.1 200 OK
CONTENT-TYPE: APPLICATION/JSON;CHARSET=UTF-8
{
        "QUOTEID": 3,
        "MANUFACTURER": "GM"
        "VIN": "1G6DV1EPGC011804",
        "YEAR": 2014,
        "MAKE": "CADILLAC",
        "MODEL": "CTS",
        "CUSTOMERID": "100",
        "SALESPERSONID": "80",
        "STATUS": "OPEN",
        "CREATEDON": "2014-11-10T18:25:43.5112"
}
```

FIG. 33

GET /INVOICES/QUOTES/{ID}/PARTS
RETRIEVES ALL PARTS ASSOCIATED TO A QUOTE.

RESOURCE URL
HTTPS://API.OECONNECTION.COM/INVOICES/QUOTES/{ID}/PARTS

RESOURCE INFORMATION

| | |
|---|---|
| RESPONSE FORMATS | JSON |
| REQUIRES AUTHENTICATION | YES |
| RATE LIMITED | YES |
| REQUESTS/15-MIN WINDOW (USER AUTH) | TBD |

SUPPORTED QUERY PARAMETERS

| PARAMETERS | DESCRIPTION |
|---|---|
| FIELDS | COMMA SEPARATED LIST OF AVAILABLE QUOTES. |
| OFFSET | THE N$^{TH}$ PAGE (ZERO BASED) OF DATA. (DEFAULT= ZERO). |
| LIMIT | NUMBER OF ITEMS TO RETURN PER CALL. (DEFAULT=10) |
| SORT | COMMA SEPARATED LIST OF FIELDS TO USE FOR SORTING. BY DEFAULT FIELDS ARE SORTED ASCENDING BY CREATEDON. ADD :A AFTER EACH FIELD TO SORT ASCENDING AND :D DESCENDING. |

EXAMPLE REQUEST
POST HTTPS://API.OECONNECTION.COM/INVOICES/QUOTES?OFFSET=0&LIMIT=1

EXAMPLE RESULT

```
HTTP/1.1 200 OK
CONTENT-TYPE: APPLICATION/JSON;CHARSET=UTF-8
{
    "PARTS": {
      {
        "LINEID": 1,
        "PARTNUMBER": "22788411"
        "DESCRIPTION": "FENDER-FRONT BRACKET RIGHT",
        "QTY": 1,
        "LISTPRICE": 31.15,
        "NETBUYERCOST": 21.81,
        "TRADEPRICE": 23.36,
      },
      {
```

FIG. 34

```
        "LINEID": 2,
        "PARTNUMBER": "22788401"
        "DESCRIPTION": "FENDER-FRONT BRACE RIGHT",
        "QTY": 1,
        "LISTPRICE": 33.98,
        "NETBUYERPRICE": 23.79,
        "TRADEPRICE": 25.49
    }
  },
  "_METADATA": {
    "TOTALCOUNT": 2
  }
}
```

FIG. 34A

POST /INVOICES
UPDATES THE PPC DEALER PORTAL TRANSACTION WITH THE DMS INVOICE INFORMATION.

RESOURCE URL
HTTPS://API.OECONNECTION.COM/INVOICES

RESOURCE INFORMATION

| RESPONSE FORMATS | JSON |
|---|---|
| REQUIRES AUTHENTICATION | YES |
| RATE LIMITED | YES |
| REQUESTS/15-MIN WINDOW (USER AUTH) | TBD |

EXAMPLE REQUEST
POST HTTPS://API.OECONNECTION.COM/INVOICES

EXAMPLE REQUEST BODY

```
{
    "QUOTEID": 1,
    "INVOICENUMBER": "123456",
    "INVOICEDATE": "2014-11-10T18:25:43.5112",
    "PARTS": {
        {
            "LINEID": 1,
            "PARTNUMBER": "22788411",
            "QTY": 1,
            "NETBUYERCOST": 21.81
        }
    }
}
```

EXAMPLE RESULT

```
HTTP/1.1 200 OK
CONTENT-TYPE: APPLICATION/JSON;CHARSET=UTF-8
{
    "SUCCESS": "TRUE"
}
```

FIG. 35

COLLISION PART CATEGORIES
EXHAUST, FRAME, AND GAS TANKS
SHEET METAL
EXTERIOR BODY/ CHASSIS
INTERIOR BODY PARTS
LIGHTING

FIG. 36

FACTORS THAT INFLUENCE PARTS PRICE

VEHICLE MANUFACTURE DATE
  • DEALER PRICE (AKA DEALER COST)
  • PATENTED PART FLAG
  • PRODUCT LINE (IN 1 OF 5)

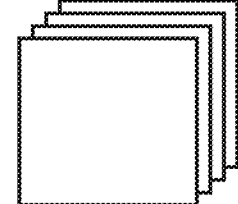

REPAIR SPECIFIC INFO
  • INSURANCE COMPANY OF REPAIR
  • VEHICLE MILEAGE AND MMY
  • VEHICLE OWNER STATE
  • OE VS. NON-OE PART

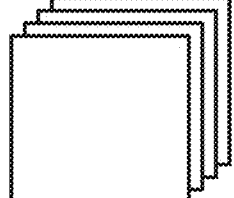

HISTORICAL PRICING OF COMPETITIVE PARTS
  • LOWEST SELLING PRICE (NATIONAL)
  • LOWEST SELLING PRICE BY STATE

FIG. 37

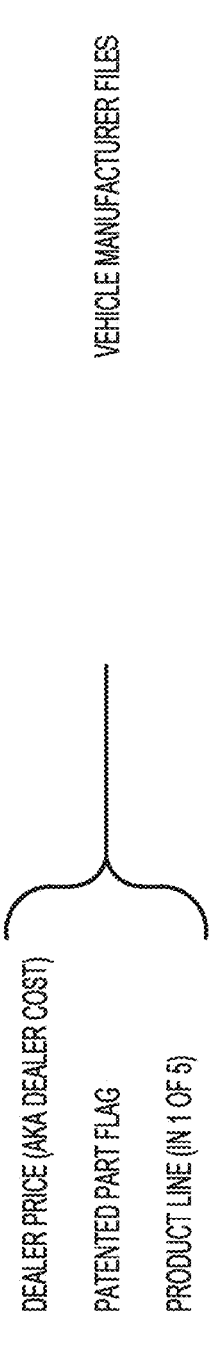

DATA SOURCE
FOR PRICE CALCULATION

VEHICLE MANUFACTURER FILES

INSURANCE COMPANY/ MILEAGE/ DISCOUNT FILE

MMY DISCOUNT FILE

STATE/PART DISCOUNT FILE

LOWEST SELLING PRICE FILE

LOWEST SELLING PRICE BY STATE FILE

DEALER PRICE (AKA DEALER COST)

PATENTED PART FLAG

PRODUCT LINE (IN 1 OF 5)

REAPAIR-SPECIFIC INFO

INSURANCE COMPANY OF REPAIR

VEHICLE MILEAGE AND MMY

VEHICLE OWNER STATE

OE AND NON-OE SPECIFIED PART

HISTORICAL PRICING OF COMPETITIVE PARTS

LOWEST SELLING PRICE (NATIONAL)

LOWEST SELLING PRICE BY STATE

FIG. 38

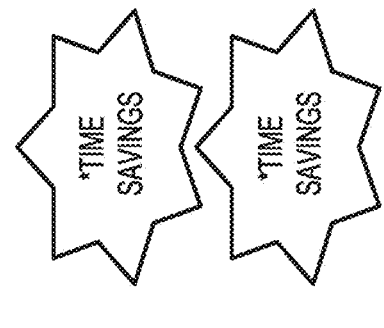
MyPriceLink.com
DEALER COLLISION ORDER *WORK FLOW* FOR QUOTING/ ORDERING/ PROCESSING MANUFACTURER REBATE ON COLLISION PARTS SOLD
1. VIEW LIST PRICE AND QUOTE SALES PRICE.
2. CREATE INVOICE IN DMS WITH LIST PRICE AND SALES PRICE.
3. SUBMIT $ CLAIM FOR REIMBURSEMENT TO VEHICLE MANUFACTURER WHO SUPPLIES SOLD PARTS.
*TIME SAVINGS VIA DMS INVOICE INTEGRATION
DMS= ADPOC
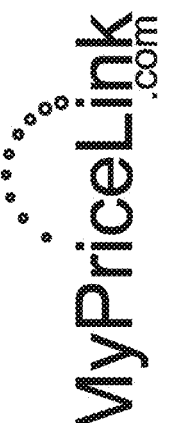
FIG. 40

FIG. 42

Figure 43:
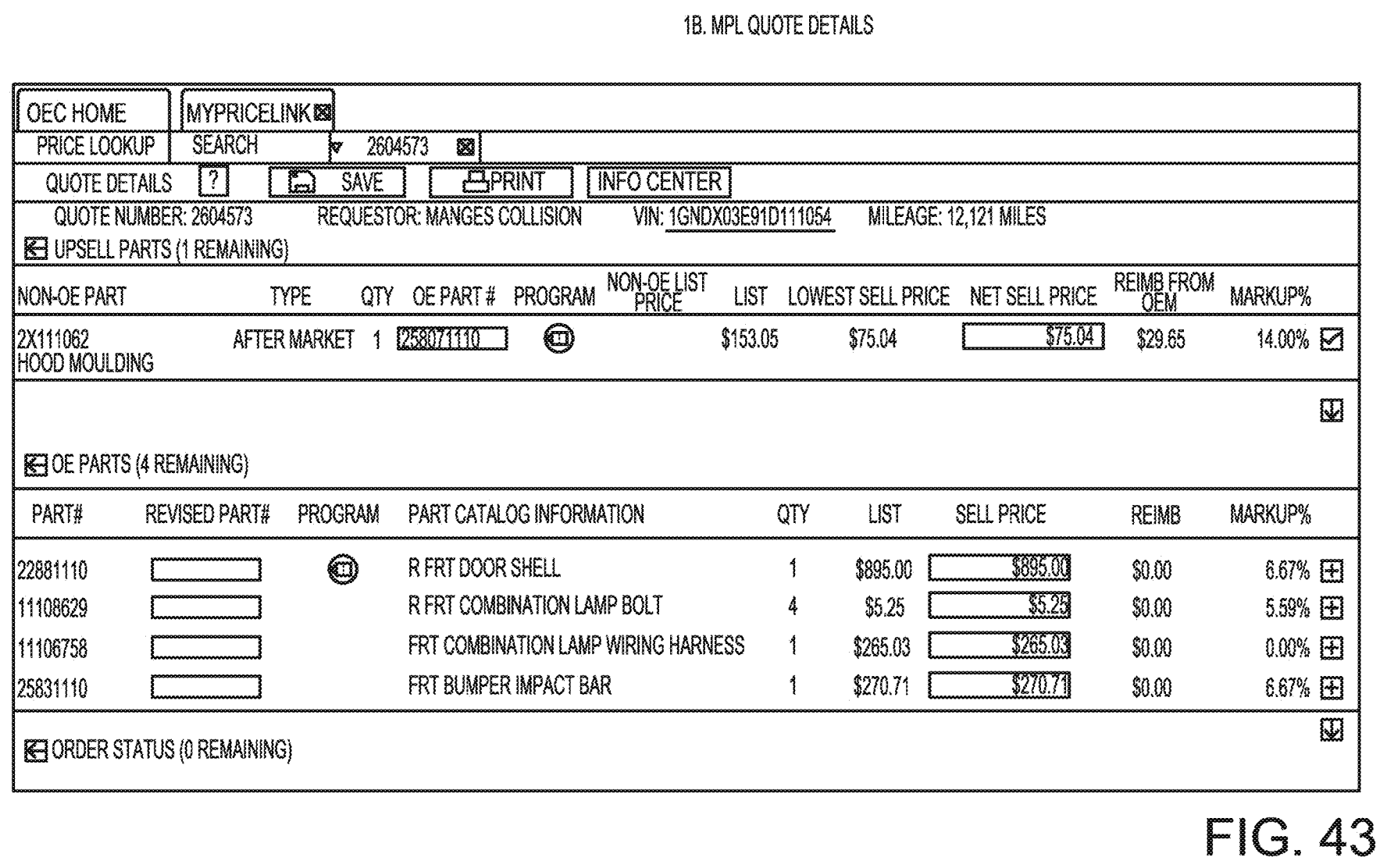

1B. MPL QUOTE DETAILS

| OEC HOME | MYPRICELINK ⊠ | | | |
|---|---|---|---|---|
| PRICE LOOKUP | SEARCH | ▽ 2604573 | ⊠ | |
| QUOTE DETAILS | ? | 🔍 SAVE | 🖨 PRINT | INFO CENTER |

REQUESTOR: MANGES COLLISION    VIN: 1GNDX03E91D111054    MILEAGE: 12,121 MILES

QUOTE NUMBER: 2604573

☑ UPSELL PARTS (1 REMAINING)

| NON-OE PART | TYPE | QTY | OE PART # | PROGRAM | NON-OE LIST PRICE | LIST | LOWEST SELL PRICE | NET SELL PRICE | REIMB FROM OEM | MARKUP% |
|---|---|---|---|---|---|---|---|---|---|---|
| 2X111062 HOOD MOULDING | AFTER MARKET | 1 | 25807110 | ⊞ | | $153.05 | $75.04 | $75.04 | $29.65 | 14.00% | ☑ |

☑

☑ OE PARTS (4 REMAINING)

| PART# | REVISED PART# | PROGRAM | PART CATALOG INFORMATION | QTY | LIST | SELL PRICE | REIMB | MARKUP% |
|---|---|---|---|---|---|---|---|---|
| 22881110 | | ⊞ | R FRT DOOR SHELL | 1 | $895.00 | $895.00 | $0.00 | 6.67% | ⊞ |
| 11108629 | | | R FRT COMBINATION LAMP BOLT | 4 | $5.25 | $5.29 | $0.00 | 5.59% | ⊞ |
| 11106758 | | | FRT COMBINATION LAMP WIRING HARNESS | 1 | $265.03 | $265.03 | $0.00 | 0.00% | ⊞ |
| 25831110 | | | FRT BUMPER IMPACT BAR | 1 | $270.71 | $270.71 | $0.00 | 6.67% | ⊞ |

☑ ORDER STATUS (0 REMAINING)

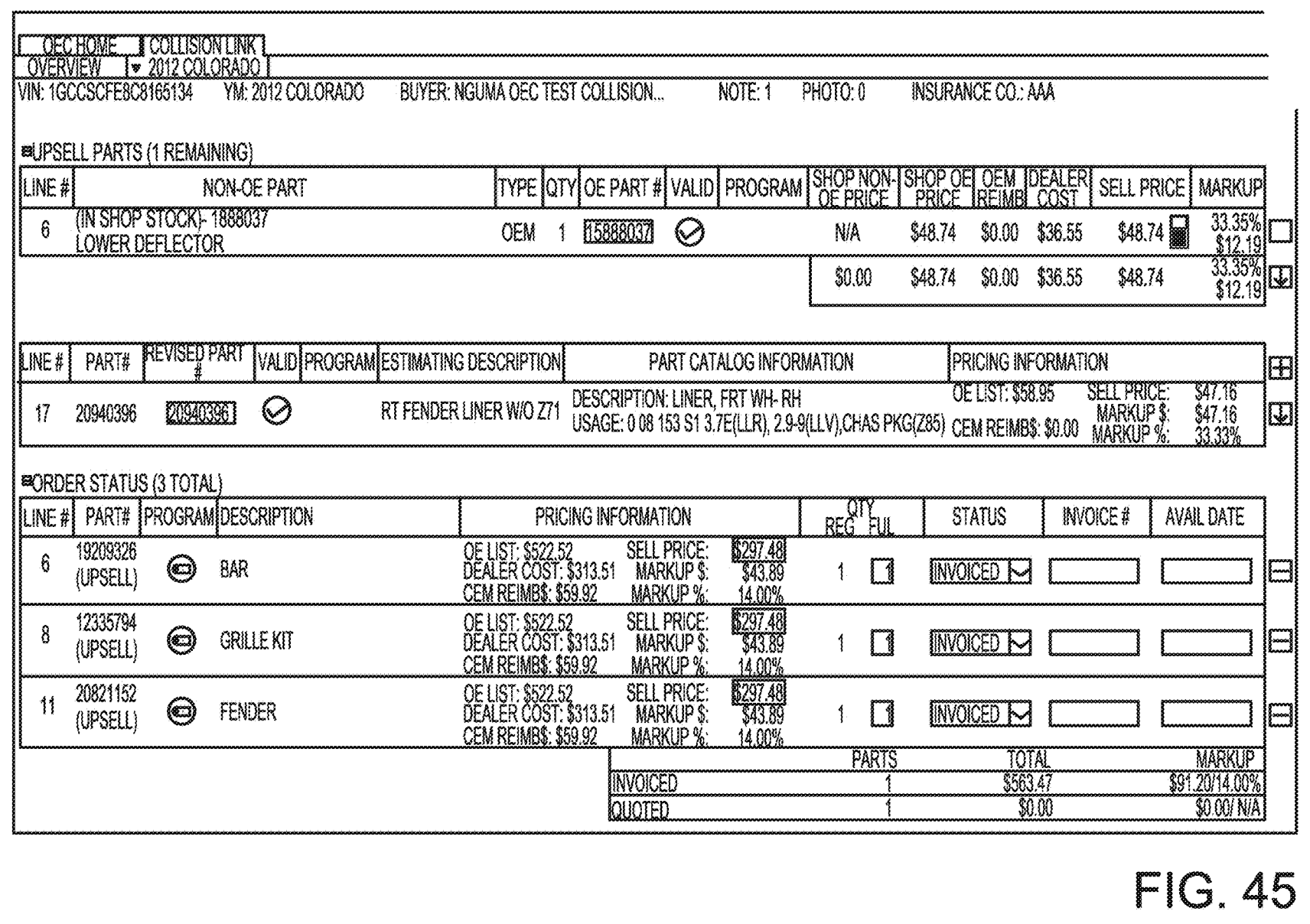

OEC HOME | COLLISION LINK
OVERVIEW ▼ 2012 COLORADO
VIN: 1GCGSCFE8C8165134     YM: 2012 COLORADO     BUYER: NGUMA OEC TEST COLLISION...     NOTE: 1     PHOTO: 0     INSURANCE CO: AAA

UPSELL PARTS (1 REMAINING)

| LINE # | NON-OE PART | TYPE | QTY | OE PART # | VALID | PROGRAM | SHOP NON-OE PRICE | SHOP OE PRICE | OEM REIMB | OEM DEALER COST | SELL PRICE | MARKUP |
|---|---|---|---|---|---|---|---|---|---|---|---|---|
| 6 | (IN SHOP STOCK)- 1888037 LOWER DEFLECTOR | OEM | 1 | 15888037 | ⊘ | | N/A | $48.74 | $0.00 | $36.55 | ▦ $48.74 | 33.35% $12.19 |
| | | | | | | | $0.00 | $48.74 | $0.00 | $36.55 | $48.74 | 33.35% $12.19 |

| LINE # | PART # | REVISED PART # | VALID | PROGRAM | ESTIMATING DESCRIPTION | PART CATALOG INFORMATION | PRICING INFORMATION |
|---|---|---|---|---|---|---|---|
| 17 | 20940396 | 20940396 | ⊘ | | RT FENDER LINER W/O Z71 | DESCRIPTION: LINER, FRT WH- RH  USAGE: 0 08 153 S1 3.7E(LLR), 2.9-9(LLV),CHAS PKG(Z85) | OE LIST: $38.95  SELL PRICE: $47.16  MARKUP $: $47.16  OEM REIMB $: $0.00  MARKUP %: 33.33% |

ORDER STATUS (3 TOTAL)

| LINE # | PART # | PROGRAM | DESCRIPTION | PRICING INFORMATION | QTY REG FUL | STATUS | INVOICE # | AVAIL DATE |
|---|---|---|---|---|---|---|---|---|
| 6 | 19203326 (UPSELL) | | BAR | OE LIST: $522.52  DEALER COST: $313.51  OEM REIMB $: $59.92 / SELL PRICE: $297.48  MARKUP $: $43.89  MARKUP %: 14.00% | 1 | INVOICED ☑ | | |
| 8 | 12335794 (UPSELL) | | GRILLE KIT | OE LIST: $522.52  DEALER COST: $313.51  OEM REIMB $: $59.92 / SELL PRICE: $297.48  MARKUP $: $43.89  MARKUP %: 14.00% | 1 | INVOICED ☑ | | |
| 11 | 2082152 (UPSELL) | | FENDER | OE LIST: $522.52  DEALER COST: $313.51  OEM REIMB $: $59.92 / SELL PRICE: $297.48  MARKUP $: $43.89  MARKUP %: 14.00% | 1 | INVOICED ☑ | | |

| | PARTS | TOTAL | MARKUP |
|---|---|---|---|
| INVOICED | 1 | $363.47 | $91.20/14.00% |
| QUOTED | | $0.00 | $0.00/ N/A |

FIG. 45

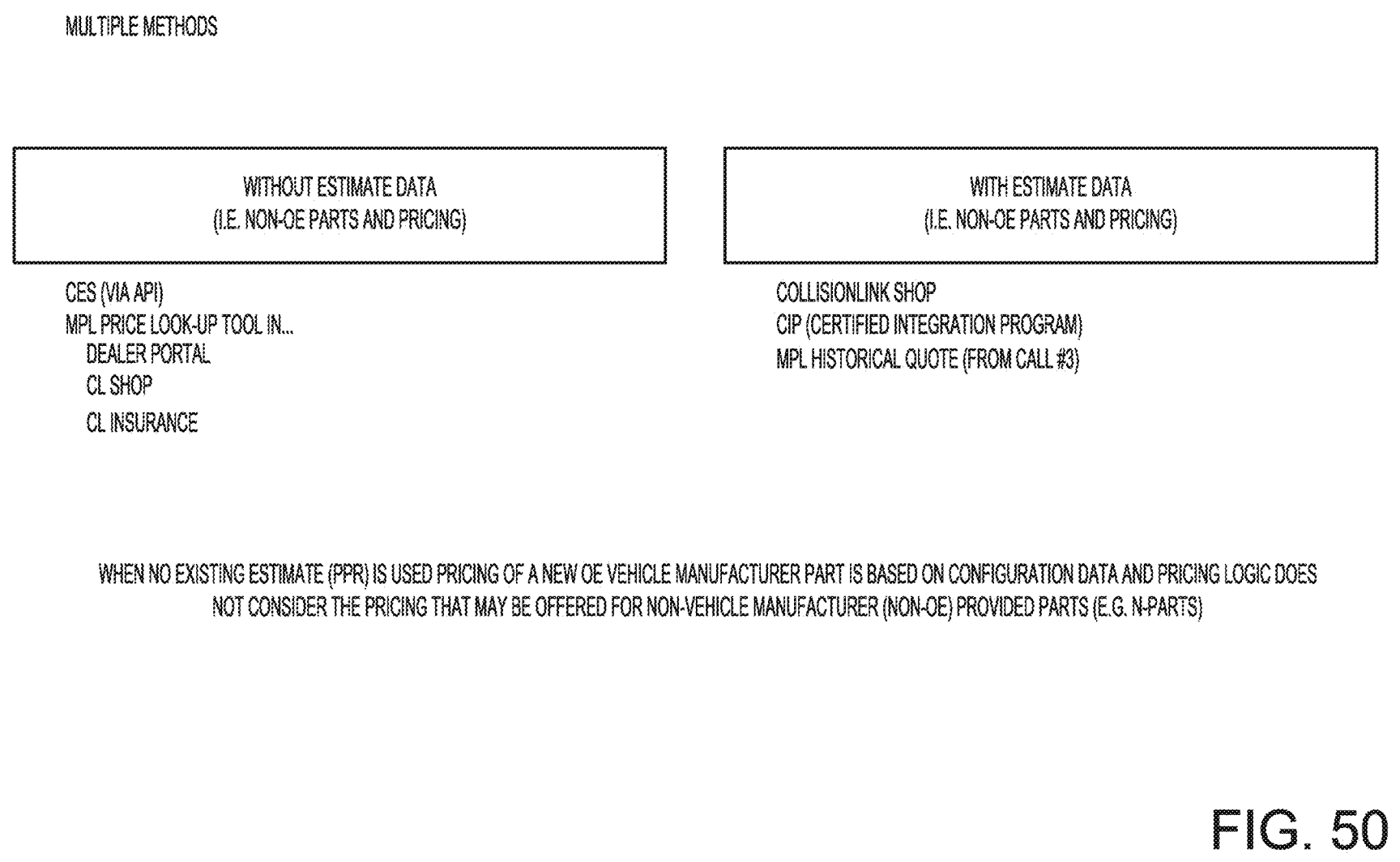

MULTIPLE METHODS

WITHOUT ESTIMATE DATA
(I.E. NON-OE PARTS AND PRICING)

CES (VIA API)
MPL PRICE LOOK-UP TOOL IN...
DEALER PORTAL
CL SHOP
CL INSURANCE

WITH ESTIMATE DATA
(I.E. NON-OE PARTS AND PRICING)

COLLISIONLINK SHOP
CIP (CERTIFIED INTEGRATION PROGRAM)
MPL HISTORICAL QUOTE (FROM CALL #3)

WHEN NO EXISTING ESTIMATE (PPR) IS USED PRICING OF A NEW OE VEHICLE MANUFACTURER PART IS BASED ON CONFIGURATION DATA AND PRICING LOGIC DOES NOT CONSIDER THE PRICING THAT MAY BE OFFERED FOR NON-VEHICLE MANUFACTURER (NON-OE) PROVIDED PARTS (E.G. N-PARTS)

FIG. 50

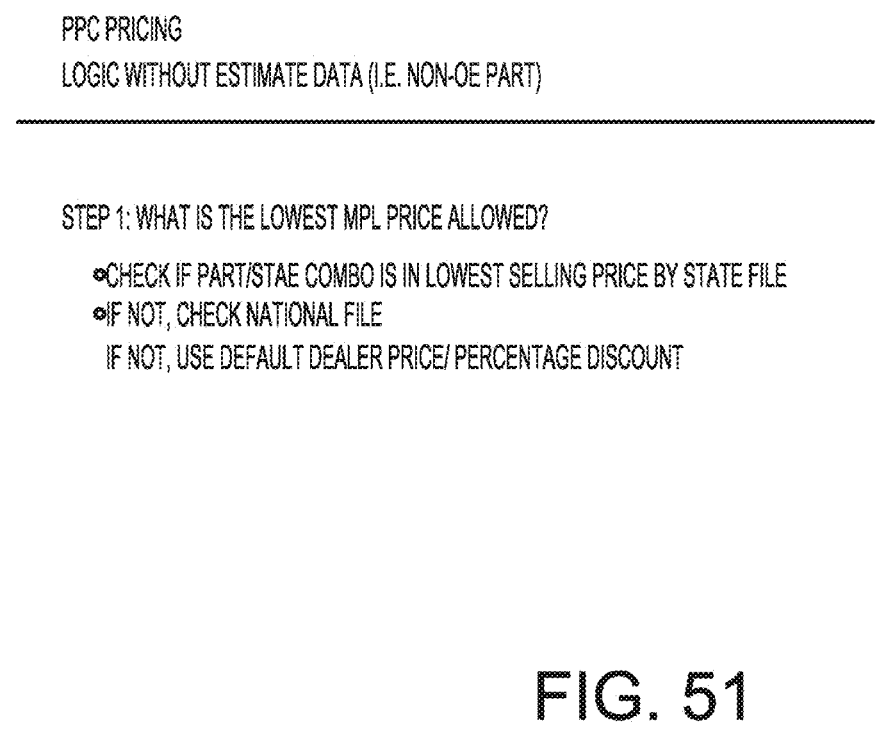

PPC PRICING

LOGIC WITHOUT ESTIMATE DATA (I.E. NON-OE PART)

STEP 1: WHAT IS THE LOWEST MPL PRICE ALLOWED?

∞CHECK IF PART/STAE COMBO IS IN LOWEST SELLING PRICE BY STATE FILE

◎IF NOT, CHECK NATIONAL FILE

IF NOT, USE DEFAULT DEALER PRICE/ PERCENTAGE DISCOUNT

FIG. 51

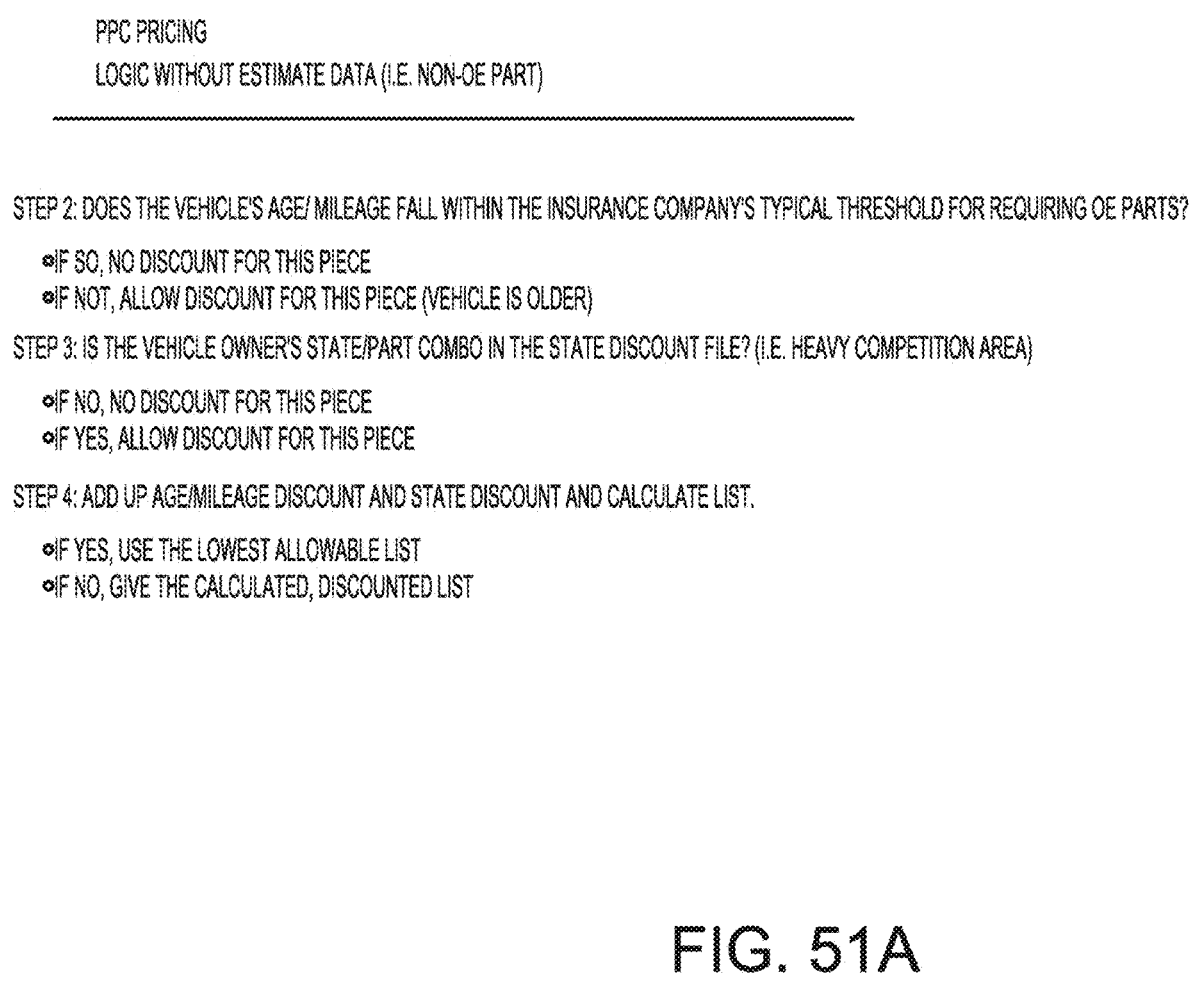

PPC PRICING
LOGIC WITHOUT ESTIMATE DATA (I.E. NON-OE PART)

STEP 2: DOES THE VEHICLE'S AGE/ MILEAGE FALL WITHIN THE INSURANCE COMPANY'S TYPICAL THRESHOLD FOR REQUIRING OE PARTS?

- IF SO, NO DISCOUNT FOR THIS PIECE
- IF NOT, ALLOW DISCOUNT FOR THIS PIECE (VEHICLE IS OLDER)

STEP 3: IS THE VEHICLE OWNER'S STATE/PART COMBO IN THE STATE DISCOUNT FILE? (I.E. HEAVY COMPETITION AREA)

- IF NO, NO DISCOUNT FOR THIS PIECE
- IF YES, ALLOW DISCOUNT FOR THIS PIECE

STEP 4: ADD UP AGE/MILEAGE DISCOUNT AND STATE DISCOUNT AND CALCULATE LIST.

- IF YES, USE THE LOWEST ALLOWABLE LIST
- IF NO, GIVE THE CALCULATED, DISCOUNTED LIST

FIG. 51A

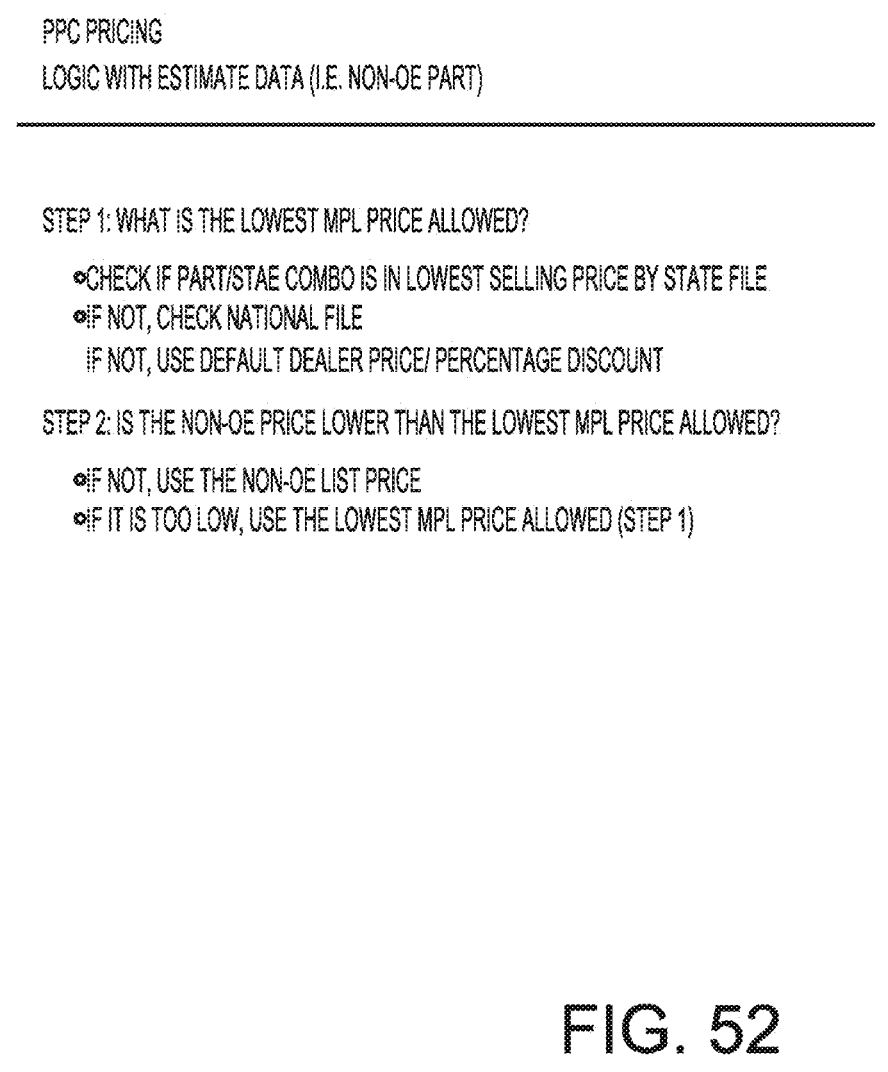

PPC PRICING
LOGIC WITH ESTIMATE DATA (I.E. NON-OE PART)

STEP 1: WHAT IS THE LOWEST MPL PRICE ALLOWED?

- CHECK IF PART/STAE COMBO IS IN LOWEST SELLING PRICE BY STATE FILE
- IF NOT, CHECK NATIONAL FILE
  IF NOT, USE DEFAULT DEALER PRICE/ PERCENTAGE DISCOUNT

STEP 2: IS THE NON-OE PRICE LOWER THAN THE LOWEST MPL PRICE ALLOWED?

- IF NOT, USE THE NON-OE LIST PRICE
- IF IT IS TOO LOW, USE THE LOWEST MPL PRICE ALLOWED (STEP 1)

FIG. 52

SYSTEM CONTROLLED BY DATA BEARING RECORDS

TECHNICAL FIELD

Exemplary embodiments include systems controlled by data bearing records which may be classified in CPC G 06 K 17/00; USPC 235/375.

BACKGROUND

Vehicle collisions are a common occurrence. Repairs often must be made to restore the vehicle to operating condition and to repair the cosmetic appearance of the vehicle to restore its value. Repair parts to repair the damaged vehicle must be identified and furnished to a vehicle repair entity ("VRE") in order to accomplish making the repairs. Also it is often desired to upgrade vehicles. Systems and methods for identifying the vehicle and proper repair and/or upgrade parts for the vehicle and furnishing the correct parts to the VRE may benefit from improvements.

SUMMARY

Exemplary embodiments include systems and methods by which repair and/or upgrade parts necessary for the repair or upgrade of damaged vehicles are determined and furnished to a vehicle repair entity responsive to data bearing records.

BRIEF DESCRIPTION OF DRAWINGS

FIG. 6 is a listing of exemplary program objects utilized by the PPC in connection with communication with an RECC.

FIGS. 7, 8, 8A, 9, 10, 11, 12, 13 and 14 describe the objects listed in FIG. 6 and the fields associated with each.

FIG. 15 is a schematic view listing the methods associated with the objects described in FIG. 6.

FIGS. 17, 18, 18A, 19, 20, 20A, 20B, 20C, 21, 21A, 22, 22A, 22B and 22C describe exemplary methods which are carried out in connection with the interaction between the PPC and an RECC and includes examples of the requests and results associated with each.

FIGS. 23 and 23A describe an exemplary batch process which can be used with the exemplary PPC to process large amounts of needed parts records (NPRs) through the PPC to obtain parts pricing data.

FIG. 25 is a listing of program objects of the PPC with methods that are invoked in communication sessions with an exemplary ADPOC.

FIG. 26 is a listing of methods associated with the objects listed in FIG. 25 and the functions carried out by each.

FIGS. 28, 28A, 29, 29A, 30 and 31 are schematic descriptions of each of the objects referred to in FIG. 25.

FIGS. 32, 32A, 32B, 33, 34, 34A and 35 are schematic descriptions of the methods that are invoked by the objects listed in FIG. 25 with examples of requests and results associated with each.

FIG. 36 is a schematic view listing types of collision parts which are procured and delivered to vehicle repair entities through operation of the exemplary embodiment.

FIG. 37 is a schematic view showing factors that are considered in connection with program logic of the PPC to determine pricing associated with collision parts.

FIG. 38 is a schematic view showing factors that are utilized by the program logic associated with the PPC to determine collision parts pricing information and the source of the data utilized in connection with the program logic.

FIG. 40 is a schematic view listing the work flow of an auto dealer in connection with quoting, ordering and processing rebates related to sales of collision parts.

FIGS. 42-45 disclose exemplary output screens produced through operation of the PPC.

FIG. 50 is a schematic view describing methods by which the PPC may be operated to help an operator of an ADPOC to sell an OE part to a vehicle repair entity when a non-OE part has originally been specified.

FIGS. 51, 51A and 52 are a schematic view describing program logic carried out by the PPC in connection with facilitating the substitution of an OE part for a non-OE part otherwise specified.

DETAILED DESCRIPTION

Figure 1:
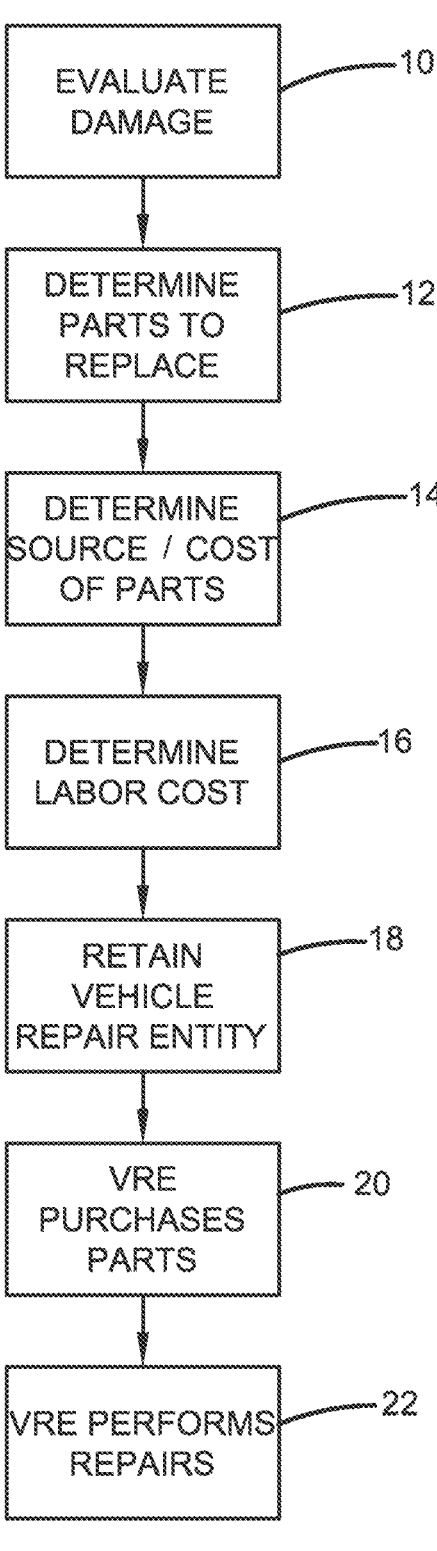
FIG. 1 is a schematic view showing exemplary steps that are carried out in connection with repair of a damaged vehicle.

Referring now to the drawings and particularly to FIG. 1, there is shown therein schematically a series of activities that are carried out in exemplary embodiments in connection with the repair of collision damage to vehicles. In an exemplary arrangement, the damage to the vehicle is first evaluated as represented in step 10. As represented in step 12, the evaluation proceeds to determine which parts of the vehicle need to be replaced. This includes, for example, determining that bumpers, sheet metal, window glass, lights, bezels, fascias and other items have been damaged to the point of a requirement that they must be replaced. Such parts may include both parts that are visible as well as parts that are not visible such as parts that are in the frame and substructure of the vehicle such as suspension struts, steering boxes, shift linkages, control arms, etc.

The sources of available repair parts and the cost thereof are determined as represented by step 14. The cost of labor is also determined as represented in step 16. Labor costs include the necessary dismantling of the damaged parts, repair of the components that can be repaired that were originally associated with the vehicle, replacing parts that cannot be repaired with the replacement parts, and also doing the necessary painting and other cosmetic work that is required to restore the value of the vehicle to its pre-collision status.

As represented by step 18, a vehicle repair entity (VRE) must be retained to do the work necessary to repair the damaged vehicle. In some cases, the vehicle repair entity is the same entity that conducts the evaluation of what needs to be replaced. In other instances, the individual or entity that owns the vehicle selects the VRE to do the work. In still other instances, an insurance company or other entity that pays for all or part of the repairs selects the VRE. Once the VRE is selected, the VRE must acquire the necessary repair parts to perform the repairs. In some instances, the VRE has some discretion as to the source of the repair parts. In other instances, the VRE may be required to acquire the parts from the sources that have been specified by an insurance company, leasing company or other entity that has submitted the repair order for the vehicle. In many cases the VRE is free to provide better quality parts than may have been specified in the repair order. This may be done, for example, to avoid having to rework and adjust non-OE parts and to promote customer satisfaction. Finally once the VRE has prepared all the necessary parts, the repairs are carried out as represented in step 22. Exemplary embodiments may include features like those described in U.S. Provisional Application 62/193,178 filed Jul. 16, 2015 or in U.S. patent application Ser. No. 15/877,550 filed Jan. 23, 2018, the disclosures of each of which are incorporated herein by reference in its entirety.

Figure 2:
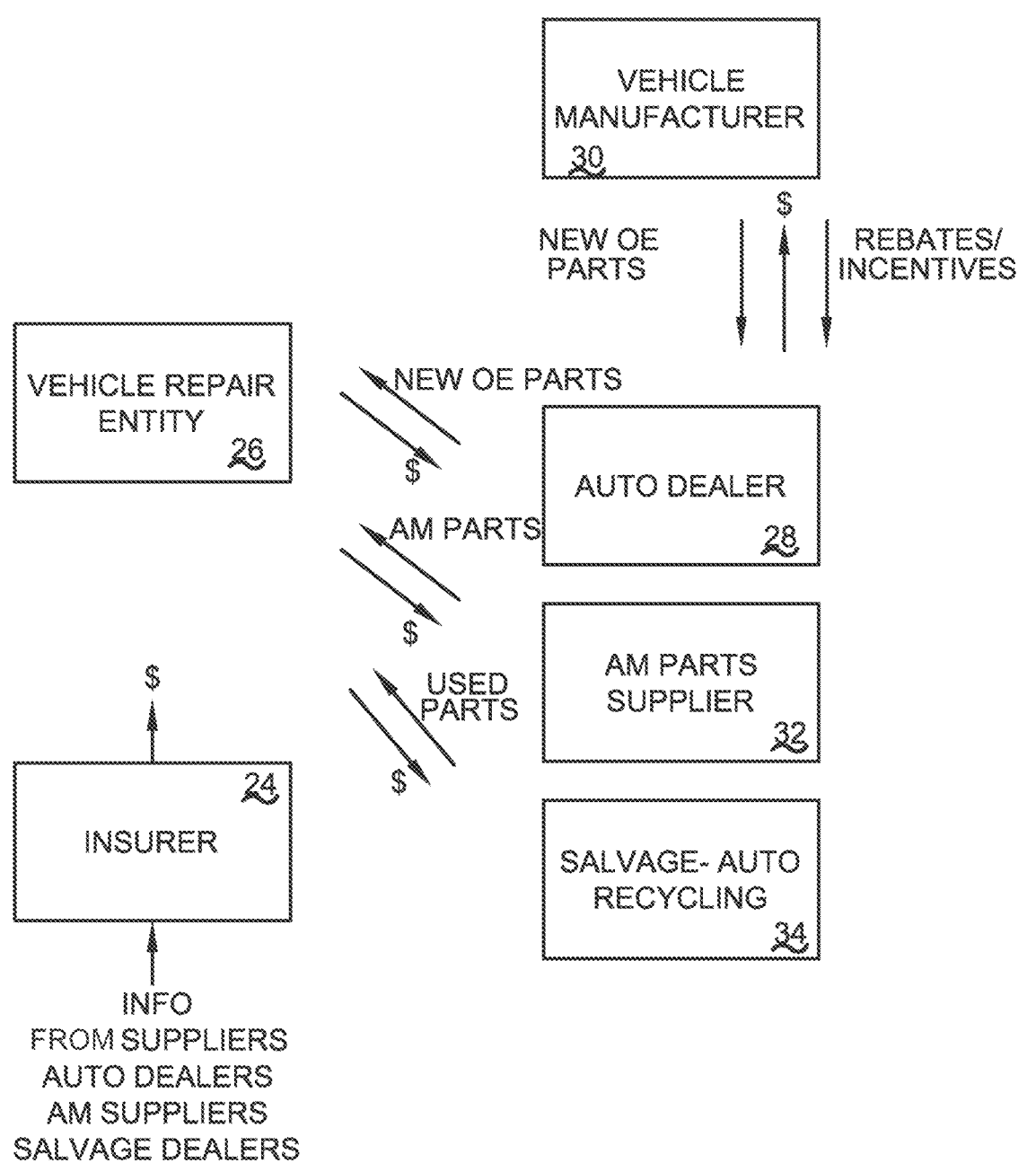
FIG. 2 is a schematic view that shows the entities involved in the repair of a damaged vehicle and the activities of each.

As represented in FIG. 2, the entities involved in a repair activity often include a company responsible for payment such as an insurer represented 24. The company will generally obtain information from suppliers such as auto dealers, after market suppliers, suppliers of used parts such as salvage dealers, organizations who calculate the amount of labor to perform work and other activities associated with repairs. As previously mentioned, such responsible companies are frequently responsible for preparing estimates of costs associated with the repair of damage as well as repair orders that are given to vehicle repair entities. Such companies are also generally responsible for all or at least a portion of the costs associated with conducting repairs.

The vehicle repair entity schematically represented 26 is most often a "body shop" or a "collision center" that has the capability to repair damaged vehicles. In some cases, the VRE may be an independent entity. In other situations, the VRE may be part of a dealer network. This may include an auto dealer network including a body shop portion of the repair center associated with an auto dealer that sells and services the vehicles of a particular auto manufacturer. Sometimes the body shop of an auto dealer that sells one brand of vehicle will repair other brands of vehicles that it does not sell. In other situations, the VRE may include repair centers operated by franchisees or other networks of such suppliers.

As previously mentioned, it is the VRE's responsibility to procure the parts necessary to repair the damaged vehicle. The parts used to repair damaged vehicles most desirably include new original equipment (OE) parts that are made under the auspices of the vehicle manufacturer that manufactured the vehicle. Such OE parts are available for purchase from authorized sellers of such parts including auto dealers such as auto dealer 28 who sells new vehicles made by the manufacturer as well as OE repair parts from that manufacturer. It should be understood that the reference to auto dealers herein may refer to dealers in vehicles of any type such as for example trucks, motorcycles, and recreational vehicles. Auto dealers also generally engage in the business of servicing vehicles made by the manufacturer that the dealer represents as well as other brands. As previously mentioned, vehicle dealers may also perform the VRE function to repair damaged vehicles.

New OE parts for collision repairs are generally procured by making a purchase from the auto dealer 28. Commonly the auto dealer will have a warehouse or other stock which has an inventory of vehicle repair parts that are available for purchase. These parts which the auto dealer has in stock are purchased from the vehicle manufacturer 30 or a manufacturer authorized source so that the auto dealer has a variety of collision repair parts readily available. For parts that the auto dealer 28 does not have immediately available that a VRE requests, the auto dealer may order such parts and have them delivered by the vehicle manufacturer 30. It should also be noted that commonly vehicle manufacturers provide certain rebates and incentives to their dealers in connection with the sale of items. This includes the sale of collision parts. Thus for example the auto dealer 28 may pay a "dealer price" to the auto manufacturer 30 in order to obtain a collision part (for example, a right front fender for a 2013 Buick Regal). However, when the auto dealer later sells that part to an end user the auto dealer will receive a rebate from the manufacturer for having made the subsequent sale of that part. Such sales may be to a body shop or other VRE, for example. Alternatively the sale may be made by the auto dealer to the person owning the vehicle that is repaired by the auto dealer in their VRE operation. Of course it should be understood that these sales scenarios are exemplary.

Referring again to FIG. 2, VREs also may acquire repair parts from an aftermarket parts supplier 32. Aftermarket parts suppliers 32 are generally independent of auto manufacturers. They produce parts that have "will fit" functionality with OE parts. Such aftermarket parts are generally ones for which the vehicle manufacturer does not have patent protection or other form of protection to prevent reproduction. Aftermarket parts suppliers will generally produce an aftermarket part corresponding to an OE part when there is sufficient demand for the part due to the number of collision situations for the types of vehicles that use the part. Often aftermarket parts are less expensive than the corresponding OE part. Further aftermarket parts sometimes do not have the same function, fit and finish quality as an OE part that they are meant to replace. This can require the VRE to have to invest labor to improve the properties of the aftermarket part so it can be satisfactorily used to repair the damaged vehicle. However, in some cases, the VRE does not have discretion to use an aftermarket part in lieu of an OE part. This may be, for example, in situations where the owner of the vehicle or the insurance company that insures the vehicle determines that the vehicle is sufficiently new, has low mileage or is a particular model for which after-market parts are not acceptable. Such policies help to preserve the value of the designated vehicle.

Another source of parts for VREs are salvage and/or auto recycling operations 34. Salvage and/or auto recycling operations which are sometimes referred to "junkyards" provide used parts. Most often the used parts are from a vehicle that has been totaled and scrapped but on which the particular part was not significantly damaged such that it can be reused. Used parts can have highly variable quality. Further the use of the used parts by the VRE may require the VRE to engage in significant part remediation in order to restore the part to a satisfactory fit and finish. However, used parts often have a lower price than aftermarket or OE parts.

In each case, the vehicle repair entity 26 will acquire the parts needed for repairing the vehicle and will make the appropriate payments to the entities who supply the parts. In some cases, for a particular repair, the VRE may acquire parts from all types of sources including OE parts from dealers, aftermarket parts from aftermarket resellers and used parts from auto salvage/recycling operations.

Figure 3:
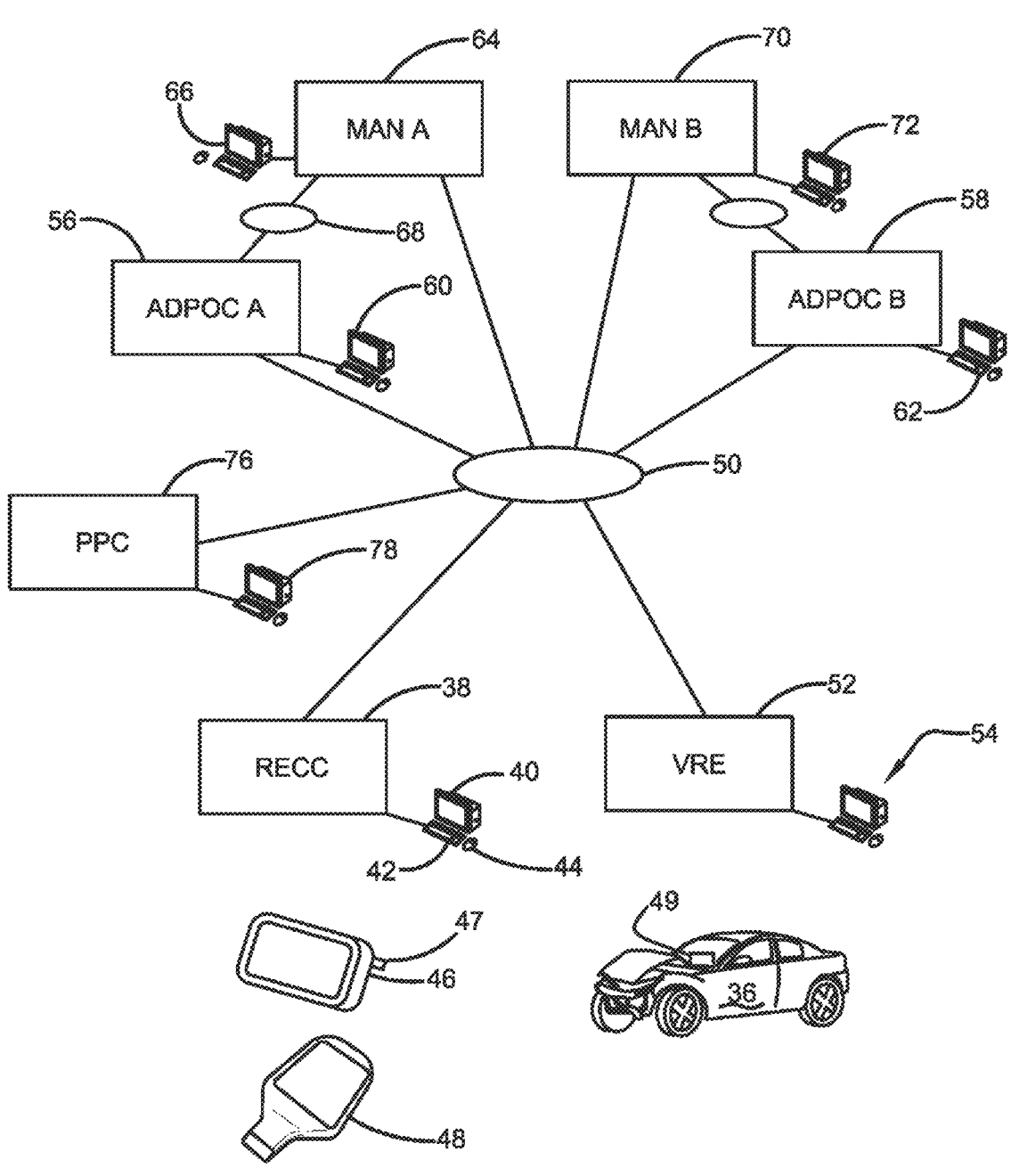
FIG. 3 is a schematic view of an exemplary system that is used in connection with providing vehicle collision repair parts.

FIG. 3 represents an exemplary system that is used to provide collision parts to vehicle repair entities and which can be operated to more efficiently deliver such parts and provide for higher quality vehicle repairs. Such system may also be used to provide parts that upgrade vehicles that are damaged or are not damaged.

A damaged vehicle requiring repairs 36 is shown sche-matically. The exemplary system includes a repair estimate calculation circuit (RECC) 38. The exemplary RECC is utilized by an entity that evaluates the damage to the damaged vehicle 36. In the exemplary embodiment, the RECC comprises one or more circuits including data pro-cessors which for purposes hereof corresponds to any elec-tronic device that is configured via circuit executable instructions that can be implemented in either hardware circuits, software, firmware or applications that are operative to enable the circuits to process data and carry out the other actions described herein. For example, the circuits may include circuits that correspond to one or more or a combi-nation of a CPU, FPGA, ASIC or any other integrated circuit or other type of circuit that is capable of processing data. The processors may be included in a computer, server or other type of electronic device. Further, the RECC may include data stores that correspond to one or more of volatile or non-volatile memories such as random access memory, flash memory, magnetic memory, optical memory, solid state memory or other devices that are operative to store computer executable instructions and data.

Computer executable instructions may include instruc-tions in any of a plurality of programming languages and formats including, without limitation, routines, subroutines, programs, threads of execution, objects, methodologies and functions which carry out the actions such as those described herein. Structures for the RECC may include, correspond to and utilize the principles described in the textbook entitled Microprocessor Architecture, Programming, and Applica-tions with the 8085 by Ramesh S. Gaonker (Prentice Hall, 2002), which is incorporated herein by reference in its entirety. Of course it should be understood that these circuit structures are exemplary and in other embodiments, other circuit structures for storing, processing, resolving and out-putting information may be used.

In the exemplary arrangement the RECC is operated to determine the repair parts necessary to repair the vehicle 36 that has been damaged in the collision. In order to carry out this function, the exemplary RECC may execute collision estimating programs that are commercially available to indicate all of the parts that make up the various areas of vehicles that may be damaged in collisions and to provide the part numbers or other identifying information associated therewith. Such commercial programs may be utilized by an estimator or other personnel for purposes of comparison to the damaged vehicle to note which parts have been damaged and require replacement. The RECC generally includes input and output devices included therewith, such as an output device in the form of a screen 40. Input devices such as for example a keyboard 42 and a mouse 44 or a touch screen may be utilized to provide inputs to the RECC so as to provide inputs thereto. The RECC may also include or be in operative connection with one or more readers. Such readers may include a bar code reader, an RFID tag reader, a camera or other image capture device or other device capable of reading indicia. Exemplary embodiments may include circuit executable instructions which are operative to analyze read indicia such as captured image data, resolve data corresponding thereto, and provide output signals cor-responding to the indicia such as signals corresponding to alphanumeric or other characters that are read through operation of the reader. In some exemplary arrangements the RECC may be operative to determine the damaged parts that require replacement based on analysis of a plurality of images of the damaged vehicle.

Circuit executable instructions that may be utilized in connection with an RECC sometimes cause such systems to be referred to as collision estimating systems (CES). CES instructions may provide not only the ability to identify and designate needed repair parts to replace parts that have been damaged, but also the amount of labor that is required to remove damaged parts, repair damaged parts to be reused, to install new parts and to perform other functions such as painting, clear coating, sound deadening and the like. It should be understood that in some arrangements, CES instructions may be utilized to determine the nature of damage incurred both to chassis, body and mechanical components of the vehicle and identify the necessary com-ponents for the repair of each.

As represented in FIG. 3, in some arrangements the RECC may comprise a stationary device located in a vehicle repair entity facility or in a facility which has the function of estimating vehicle damage. However, in alternative arrange-ments the RECC may comprise or be in operative connec-tion with one or more portable terminals which have the capability to be taken to a location of a damaged vehicle or otherwise used on a portable basis. Such portable terminals may include, for example, WiFi or other wireless interfaces so as to enable the communication thereof with other components of the system as later described herein. For example in some exemplary arrangements, the RECC may be in the form of a portable handheld device 46 which includes a reading device which comprises a camera 47. Some portable devices may be multi-function devices that are capable of performing multiple functions in addition to functions associated with the RECC. Other types of portable devices may include specially designed configurations such as the portable estimating terminal 48 shown. Estimating terminal 48 may include output and input devices operable by a user. Such input devices may include one or more readers. Such readers may include readers such as a camera or other image capture device, bar code readers, RFID tag readers or other readers suitable for reading optical, RF or other forms of indicia. Of course it should be understood that the RECC devices shown are exemplary and in other arrangements, other approaches may be used.

In some exemplary embodiments the portable device included or associated with the RECC is operable to utilize the reader associated therewith to read one or more tags 49 which are in operative connection with the damaged vehicle. The tag or tags in exemplary arrangements are usable to provide vehicle identifying information which may include or be usable to identify repair component identifying information associated with the damaged vehicle. For example in some exemplary arrangements the tag may include vehicle identifying indicia in the form of a Vehicle Identification Number ("VIN"). The tag may include alphanumeric or other optically readable characters which comprise the VIN. One or more images including VIN data may be captured through operation of a camera or other optical reader on the portable device or other reader in operative connection with the RECC. Character recognition circuit executable instructions operable in connection with RECC are operative to resolve data which corresponds to the characters in the VIN data. In exemplary embodiments the RECC is operative to utilize the characters of the VIN to determine vehicle identifying data, such as the vehicle make, model year, model, engine type, manufacture date, manufacture location, vehicle color, vehicle transmission type, vehicle suspension features, trim levels, option packages, and other characteristics or options included on the vehicle at the time of manufacture. Of course these examples of vehicle identifying data that can be determined using the VIN characters are exemplary. In exemplary arrangements the vehicle identifying data corresponding to the indicia on the one or more tags can be determined based on stored data included in one or more data stores associated with the circuits of the RECC. Alternatively the portable device may be selectively operative to communicate with other devices and systems which enable the resolution of vehicle identifying data responsive to the read indicia.

In other arrangements the reader may be operative to read machine readable indicia from one or more tags. Such tags may include one or two dimensional bar codes which correspond to information usable to determine one or more items of vehicle identifying data. Such indicia may be read through operation of the reader in operative connection with the RECC. The RECC may then be operative to resolve the characters or other data corresponding to the read indicia responsive to circuit executable instructions. The RECC is then operative to resolve the vehicle identifying data corresponding to the read indicia.

For example in some arrangements vehicle components are marked with bar code tags or other indicia which identify the vehicle and/or the particular part. In some exemplary arrangements the indicia may be read from a damaged part in order to determine the one or more repair parts needed to repair the damaged vehicle. In alternative arrangements indicia including lists of components used in connection with assembly of a vehicle may be included in or on the vehicle. The indicia may be read from such build sheets which correspond to tags for purposes of determining vehicle identifying information which is usable to identify repair components.

In some exemplary arrangements indicia may be read through operation of the at least one reader in the form of RF signals. For example in some exemplary arrangements, vehicle components or assemblies may include RFID tags which provide indicia to a reader in the form of RF signals that can be used to resolve vehicle identifying data. Alternatively or in addition, electronic control modules or other circuitry associated with components in the vehicle may be interrogated through RF or other electronic signals, and caused to provide outputs which correspond to vehicle identifying data and other information usable to identify needed vehicle repair parts. Such interrogatable components will also be considered to be tags for purposes hereof. In some exemplary embodiments some control modules may include internal diagnostic capabilities which can produce outputs that can be interpreted to identify circuits or other connected components or modules which have been damaged and require replacement. Alternatively or in addition the information stored in control modules or other devices may include information regarding a level of use or wear of components, data which includes the extent of usable component life or other information that is useful in determining a need for repair or replacement of certain vehicle components. Of course these approaches are exemplary and depend on the capabilities of the components of the damaged vehicle.

In other exemplary arrangements, the tags which are read through operation of the reader may include license plates, fleet vehicle identification stickers or other things which include readable indicia and which can be used to resolve vehicle identifying data. In exemplary arrangements the data resolved in response to the indicia read by the reader is usable by the RECC to obtain the vehicle identifying data and other data. Such tag data may be used to query a public or private database in order to obtain VIN data which can be used to obtain other items of vehicle identifying data. In other arrangements the read indicia may be used to recover other information which may be held by a fleet operator, manufacturer or other company in order to obtain the vehicle identifying data which is usable to identify needed repair or desired upgrade parts. Of course these approaches are exemplary.

In exemplary embodiments the RECC is operative responsive to inputs to produce a needed parts record (NPR). In some exemplary arrangements the NPR is generated through operation of the RECC or CES responsive to VIN or other vehicle identifying data. In some exemplary arrangements the vehicle identifying data is resolved responsive to indicia read through operation of the reader. Alternatively in other arrangements vehicle identifying data may be manually input to the RECC through at least one input device. In other arrangements data is input both manually or through operation of one or more readers.

In some exemplary arrangements the RECC and/or CES is operative responsive to the resolved vehicle identifying data, to provide display outputs on a terminal screen or display which corresponds to repair parts and/or other components or items which may be needed in connection with repair of the damaged vehicle. In some exemplary arrangements the RECC is operative to provide screen outputs responsive to the vehicle identifying data including drawings, exploded views, bills of material, schematics or other information related to components which comprise the particular vehicle which has been damaged or subject to upgrade. In some exemplary arrangements the RECC may also be operable to enable the selection of parts usable to upgrade a damaged or undamaged vehicle such as performance improvement parts, enhanced luxury parts and security improvement parts for example. Such schematic information may be presented based on the vehicle identifying data and stored information in data stores associated with the RECC. In other embodiments the data to produce screen outputs may be obtained from one or more data sources remote from the RECC and accessible through one or more networks. In other embodiments data may be obtained from control modules or other items on the damaged vehicle.

In some exemplary arrangements the operator of the RECC is enabled to provide selection inputs which cause the display of drawings, lists or other graphics which show vehicle components in the area of the vehicle where damage has occurred or an upgrade is desired. In exemplary arrangements the user is enabled to selectively view or receive identifying information regarding components in the damaged area or other area or system of interest. In some exemplary arrangements the user is enabled to provide selection inputs that identify the needed repair parts. Such inputs may include providing touch screen inputs on a portable terminal or pointer and mouse click inputs on a stationary terminal. Responsive to such inputs the exemplary RECC is operative to produce the NPR, which in the exemplary embodiment includes descriptions and part numbers for needed repair parts and/or desired upgrade parts. In other exemplary arrangements the RECC may be in operative connection with augmented reality displays and input devices which may be utilized to provide operators of the RECC with additional information that may facilitate producing the NPR. For example such augmented reality displays may present transparent or exploded views of components that can be visible to the user through the displays when viewing the damaged vehicle from various angles or perspectives. In some exemplary arrangements operators may use input devices such as tactile input gloves, eye tracking cameras or other input devices to select the displayed components that require replacement or upgrade. In some exemplary embodiments the user may be able to selectively manipulate the presented augmented reality information to make it easier to identify the repair parts which make up a given assembly. This may include the capabilities to selectively expand or change the orientation of the presented information, for example. Using the input devices the operator of the RECC may be able to provide inputs that facilitate producing the NPR for the damaged vehicle.

In some arrangements the RECC is operative to include in the NPR indicia corresponding to vehicle identifying data. Such data may include for example, the vehicle make, model, year, VIN and other data. Such other data may include for example, the mileage of the vehicle, the state where the vehicle is located, the VRE, the entity responsible for the cost of repairs or other information that is required by the RECC to be manually input or otherwise read or resolved from other data, and included in the NPR. Of course as previously discussed the RECC may operate to estimate other costs such as time and labor costs associated with replacing the identified parts in the NPR and repairing other components. Of course these features are exemplary and in other embodiments other, different or additional features and functions may be provided.

As represented schematically in FIG. 3, the RECC can communicate in one or more networks indicated 50. In exemplary arrangements the network 50 may include one or more electronic communication networks through which devices may communicate in the manner hereinafter described. Such networks may include wired or wireless communication networks, RF networks, satellite networks or other suitable networks for providing communications. Private networks may be used for communications or alternatively widely available public networks such as the Internet may be utilized in connection with exemplary embodiments. It should be understood that a single network is shown in FIG. 3 for simplicity for communication with numerous devices. However, this is exemplary and embodiments may utilize numerous different interconnected communication networks.

In the exemplary system shown in FIG. 3, one or more vehicle repair entities communicate in the system through a respective VRE circuit, schematically represented 52. The exemplary VRE circuit 52 may include one or more circuits including processors and data stores of the types previously described in connection with the RECC. The VRE circuit 52 includes input and output devices schematically represented 54 which enable operators of the VRE circuitry to provide inputs and receive outputs therefrom. The VRE circuitry is configured to communicate with the other devices included in the system through the one or more networks 50. The VRE circuit may also include portable terminals including readers like those previously described.

The exemplary system further includes an auto dealer parts order circuit (ADPOC) 56 and another ADPOC 58. Each ADPOC structure is comprised of circuits which may include processors and data stores of the types previously described in connection with the RECC. ADPOC 56 has input and output devices 60 included therewith. Likewise ADPOC 58 has input and output devices 62 included therewith. Such input devices may include keyboards, computer mice, microphones, touch screens or other types of suitable input devices. Output devices may include displays of various types or other suitable output devices for conveying information to users and/or other connected devices. Each ADPOC is operated by a respective auto dealer for purposes of identifying, pricing and ordering collision vehicle repair parts as will be described in greater detail hereinafter. Each ADPOC may operate programs and other circuit executable instructions associated with a dealer management system (DMS). DMS systems may be operated by auto dealers to perform the functions that are commonly associated with auto dealerships.

This includes operations like preparing invoices, managing inventory and other dealer functions. The capabilities of different DMS systems depends on the nature of the type of program that is used.

Each ADPOC is in operative connection with the one or more networks 50. The functions carried out by an exemplary ADPOC will be later discussed herein in detail.

In the exemplary system schematically represented in FIG. 3, the auto dealer associated with ADPOC 56 is associated with a particular vehicle manufacturer. In the exemplary arrangement, the auto dealer functions as the sales outlet for the vehicles manufactured by the respective manufacturer and also sells the original equipment (OE) parts that the manufacturer produces for its vehicles. The manufacturer with which the auto dealer who operates ADPOC 56 is associated, operates at least one manufacturer fulfillment circuit schematically indicated 64. Circuit 64 is comprised of circuitry which may include processor structures and data store structures of the types previously described in connection with the RECC. The manufacturer fulfillment circuit 64 includes input and output devices 66 which may be of the types previously described. The exemplary manufacturer fulfillment circuit 64 is configured to communicate in the one or more networks 50. Further in the exemplary arrangement the manufacturer fulfillment circuit 64 may also be in more direct communication with its dealers ADPOC 56 through an alternative direct network 68. Such a network 68 may be a nonpublic network that the manufacturer uses to communicate with its dealers. Such dealer networks may be utilized to enable dealers to place orders for products and services with the manufacturer.

Alternatively or in addition, such networks may be utilized to update service diagnostics, communicate information regarding service bulletins, disseminate information about recalls, implement promotional incentives, manage inventory between different dealers or otherwise perform functions that the manufacturer carries out in conjunction with its respective dealer network. Of course it should be understood that these functions are merely exemplary of those types of functions and activities that an auto manufacturer may carry out in conjunction with its dealers.

Similarly the dealer operating the exemplary ADPOC 58 is associated with a different vehicle manufacturer. The manufacturer operates a manufacturer fulfillment circuit 70 which has a structure and features like those previously described in connection with circuit 64. The exemplary manufacturer fulfillment circuit 70 includes input and output devices 72. The manufacturer fulfillment circuit communicates with the one or more networks 50 as well as in a network 74 which is used to communicate with its dealer organizations.

It should be understood that the exemplary system shown in FIG. 3 is simplified and that generally systems may involve numerous entities that operate respective RECC devices, numerous different VRE entities that operate VRE circuits, numerous different dealers associated with different manufacturers of vehicles and who supply collision and/or upgrade parts for the vehicles that their respective associated manufacturers have produced.

The exemplary system further includes at least one parts pricing circuit (PPC) 76. The exemplary PPC is comprised of circuits which may include processors and data stores having the structures like those described in connection with the RECC. The exemplary PPC includes one or more input and output devices schematically represented 78 like those previously discussed. In the exemplary arrangement, the PPC may comprise circuitry which is referred to herein as mypricelink.com or MPL which is operated by OEConnection of Richfield, Ohio. Of course, this arrangement is exemplary and in other embodiments, other arrangements and structures including distributed processing structures or networks may be utilized to perform the functions described herein in connection with the PPC.

In the exemplary arrangement the PPC operates as described in greater detail hereafter to provide pricing for vehicle repair or upgrade parts to operators of RECC system devices for purposes of preparing estimates which are alternatively referred to herein as repair orders, that are used by companies such as insurers responsible for payments and other operators of collision estimating systems. The exemplary PPC is also operative to enable auto dealers utilizing their respective ADPOC to recover information regarding repair or upgrade parts which are associated with estimates and pricing records for damaged vehicles. Such records may be recovered in response to inquiries by vehicle repair entities or other entities who require such parts to make repairs or upgrades. The dealer may utilize their ADPOC to identify the needed parts and place the requisitions or orders for such parts so that they are furnished to the VRE responsible for repair of the vehicle. Further the exemplary PPC may be utilized to enable the dealer to provide to the VRE a higher quality part such as an OE part, at a price that is equal to or better than an aftermarket or used part that has been specified in an estimate to be used in connection with repair of the vehicle. Further the exemplary PPC may be operative to track additional rebates or incentives that a respective auto manufacturer may offer to a dealer in connection with reducing the price for collision parts as necessary to meet the competition of a lower priced aftermarket or used part that has been specified originally in connection with the repair activities for a vehicle. Further the exemplary PPC can perform the additional functions and capabilities that are described herein.

Figure 4:
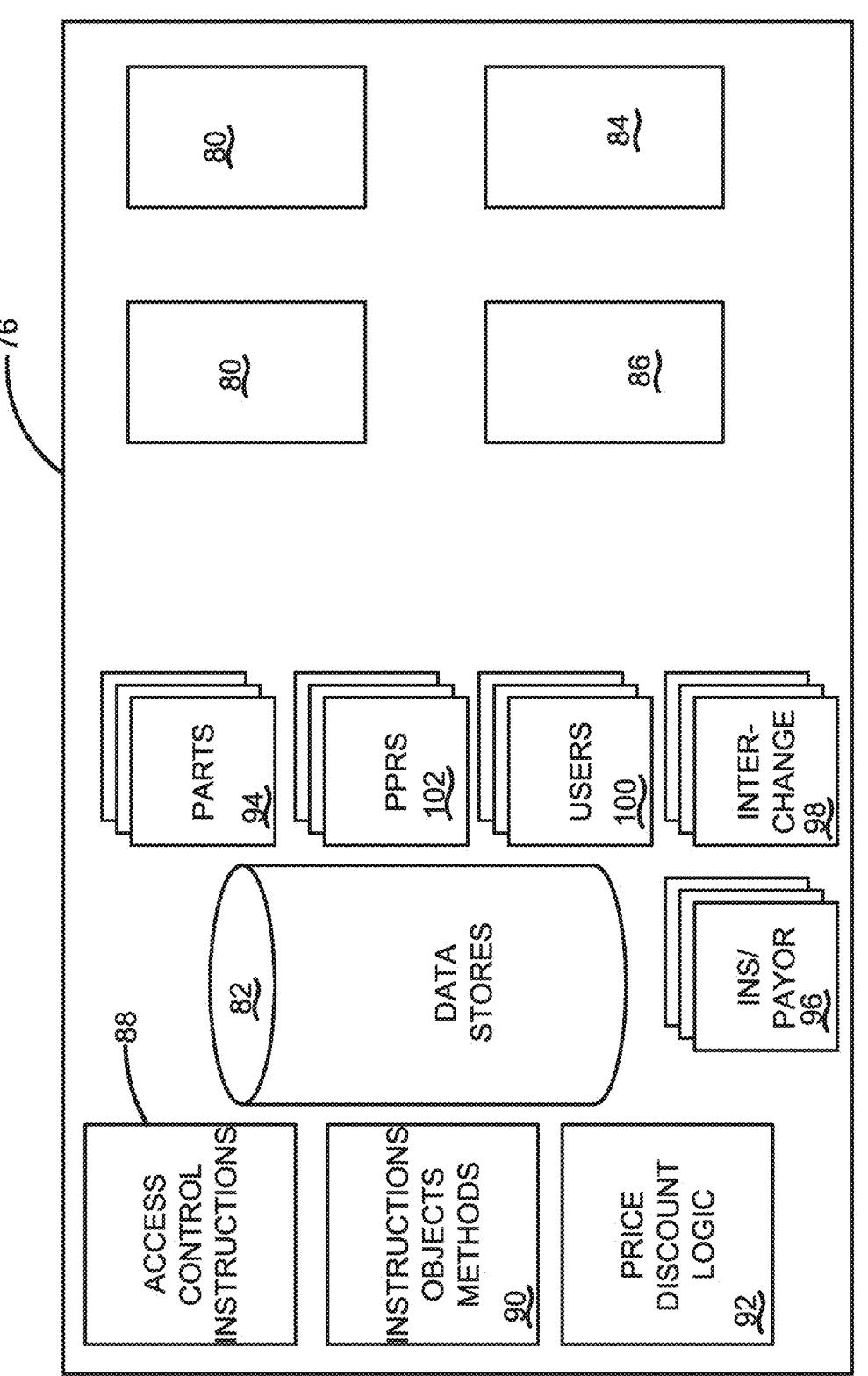
FIG. 4 is a schematic view of functional elements included in parts pricing circuitry (PPC) of an exemplary system.

FIG. 4 shows schematically the functional makeup of the exemplary PPC 76. In the exemplary arrangement the PPC comprises circuit structures including processor structures 80 that may be of the types previously described. The exemplary PPC further includes data stores 82 having the structures of the types previously described. Further the exemplary PPC includes interface circuitry which is suitable for enabling the PPC to communicate with input and output devices. Interface circuitry is also operative to enable the PPC 76 to communicate with other devices through the one or more networks 50. The exemplary PPC may also include other circuitry 86 such as integrated circuits that are operative to perform additional functions such as security functions. This may include for example encryption capabilities, the storage of digital signatures and/or certificates, public or private encryption keys, or other suitable structures. Such circuitry 86 may also include security devices such as a trusted programming module (TPM) as well as other circuitry associated with achieving the desired operations of the PPC.

As schematically represented in FIG. 4, the exemplary data stores 82 include stored circuit executable instructions which are in the form of program instructions that can be executed by the circuitry of the PPC. Such functions may include, for example, instructions which limit access to the functions performed by the PPC to certain authorized devices or users which are schematically indicated 88. Other exemplary instructions include program objects associated with determining parts pricing and communicating with external devices. Such instructions are schematically indicated 90. The exemplary PPC also includes instructions associated with the logic associated with applying discounts and rebates for parts for which prices are provided. This is represented schematically by instructions 92. Of course these instructions are merely illustrative of some of the high level instructions that may be included in the exemplary PPC data stores and in other arrangements, different, other and/or additional types of instructions may be utilized.

The exemplary data stores 82 further include stored instructions corresponding to records. Such records may include, for example, records regarding different parts which can be priced through the system schematically indicated 94. Other records may include records corresponding to companies or other payors who pay for collision or upgrade parts. These records schematically indicated 96 may commonly include the identity of the company or other payor. They also include policies, rules and requirements of such entities. Such policies, rules and requirements may include, for example, a requirement that only OE parts be used on certain vehicles. Such requirements may be designated by the model year, make, model type, mileage or other factors associated with a given vehicle that is to be repaired. Such policies may mandate that for vehicles which fall within certain criteria, no aftermarket or used parts may be utilized in connection with the repair. However, for other vehicles the policies reflected in the records 96 may authorize the use of some such parts or particular parts which the company has determined are of suitable quality. Further in some exemplary arrangements company instructions included in the records may indicate that within certain states, cities or other geographic regions, certain requirements associated with the repair parts must be followed. For example there may be restrictions on the use of aftermarket parts to make repairs within certain states. Further, the company may have policies that mandate the use of only OE parts for vehicles that remain under lease. Additional policies may not permit the installation of used parts that originate from certain states or from certain suppliers. Numerous different requirements of entities who are responsible for specifying the character of parts that can be utilized in connection with making repairs or upgrades may be included in the data and instructions represented by records 96.

Further in the exemplary arrangement the data stores 82 include interchange records schematically represented 98. In exemplary embodiments the interchange records may correspond to the interchange between OE parts and aftermarket parts. Thus for example such records may specify for a given OE part the one or more aftermarket parts that are available. Such records may also include other information regarding such parts such as specifications, sources, prices, countries of origin or other fit or finish parameters associated with such parts. Such interchange records may also include parts designation information which enables deciphering part numbering systems used by OE and aftermarket manufacturers so as to determine which parts may be substituted for others. Further exemplary arrangements may also include information regarding used parts that may be available from different sources including interchange information such as which used parts from different models of vehicles may be substituted for an aftermarket or an OE part which may be identified as usable on a vehicle that is in need of repair. Of course the information in the records 98 is exemplary and in other arrangements, other types of instructions may be included.

The exemplary PPC further includes records related to authorized users and/or user devices schematically indicated 100. Exemplary user records 100 may be utilized for limiting access to only authorized users of the PPC. Such user records may also include information concerning activities by the users including the submission of parts pricing data and the creation of parts pricing records (PPRs) or other estimate data that has been stored on the system in association with vehicles to be repaired.

The exemplary PPC further includes parts pricing records (PPRs) schematically indicated. In the exemplary arrangement the parts pricing records comprise instructions which correspond to the data associated with the repair of a damaged vehicle including the repair parts that will need to be acquired to achieve the repairs or in the case of upgrades, parts associated with such upgrades. In exemplary arrangements, the parts pricing records may include indicia corresponding to a data set of information produced through operation of a collision estimating system which specifies more than the particular vehicle for which the parts are needed and the parts. For example such records may include information about the responsible payment company, labor rates and estimates for repairs and other repair information. Such information may also include information about the vehicle repair entity who will perform the repair or upgrade activities, non-OE parts that have been specified for the repair and other information that is pertinent to the upgrade or repair activities that will be conducted to restore the damaged vehicle to operational condition.

Of course it should be understood that the exemplary types of instructions, records, structures and other features, functions and capabilities of the PPC 76 are exemplary and in other embodiments, different capabilities, structures, functions, data records and operational capabilities may be utilized.

In one exemplary arrangement, the PPC is operated responsive to the NPR data to provide parts pricing for purposes of estimating the cost associated with the parts necessary to repair a damaged vehicle. PPC is further operative to produce a parts pricing record (PPR) associated with the damaged vehicle or other situation for which the pricing is provided, and to store the associated data so that it can be reviewed, revised and recovered by authorized users of the system. The exemplary PPC further uses the data from the auto manufacturer regarding the parts and other data and pricing logic in order to provide a price that is appropriate for the given situation associated with the damaged vehicle or vehicle subject to upgrade. This pricing is in many cases specific to the particular vehicle, the state in which it is located, the company or other entity responsible for payment and other factors. This specific pricing is delivered for purposes of calculating the estimated cost to repair or upgrade the vehicle to a vehicle repair entity (VRE), payment responsible company or other operator of a collision estimating system (CES), is stored by the PPC in parts pricing records.

In the exemplary arrangement, an auto dealer who is subsequently requested by a vehicle repair entity to supply the OE parts that were made by the vehicle manufacturer for purposes of repairing or upgrading the vehicle, may recover and review the parts pricing record (PPR) associated with the particular vehicle stored in the PPC. The auto dealer can utilize their ADPOC to review the parts, the pricing quoted and other information about the particular parts. Such other information may include, for example, the dealer cost, costs at which such parts are commonly sold at a discount to other entities in the trade such as body shops, and other information such as any rebates or incentives that the manufacturer provides to its dealers in connection with the sale of the particular parts.

Further in the exemplary embodiment the PPC is operative to enable the auto dealer from which OE parts are being requested, to review any aftermarket parts or used parts that have been specified for the repair or upgrade. The exemplary PPC is operative to provide to the auto dealer information about original equipment parts that correspond to the aftermarket or used parts that could be offered as a higher quality substitute therefor. The exemplary PPC further provides the opportunity for further discounts for such OE parts that can be substituted and furnished in place of aftermarket or used parts to the VRE, along with additional incentives that can be offered to enable the dealer to meet the competition. This enables the dealer to offer to the VRE the option to acquire a new manufacturer OE part to use in the repair or upgrade of the vehicle at a price that is at least as low as that of the aftermarket or used part that has been specified. This enables VREs to opt to select such higher quality parts which may avoid the need for them to conduct rework or otherwise deal with imperfections in the fit or quality of aftermarket or used parts. In an exemplary arrangement if the VRE elects to acquire the OE part instead of the aftermarket or used part, the exemplary PPC enables the ADPOC to be utilized for purposes of modifying the parts pricing record PPR data associated with the vehicle to reflect the use of the OE part.

Further in the exemplary arrangement, the PPC is enabled to deliver data to the dealer's ADPOC so that the orders for the desired parts can be issued and the parts furnished or otherwise delivered to the VRE. Further in the exemplary arrangement the PPC is operative to enable the auto dealer who has been authorized to provide a discount on an OE part in order to meet the lower priced competition of an aftermarket or used part, to obtain the additional rebate compensation offered by the manufacturer in connection with achieving the sale of the OE part. In the exemplary arrangement the PPC is usable to enable the processing of the rebate request so that the auto dealer that achieved the sale of the OE part that was not originally specified, can receive the additional compensation and maintain a more suitable margin of profitability in connection with the sale of the part.

Of course it should be understood that these functions of the exemplary PPC are those of an exemplary arrangement and in other arrangements, different, fewer or additional functions may be carried out by a PPC. Further in other arrangements the PPC may include a number of distributed circuits and devices which carry out certain of the functions that have been described herein in connection with a single PPC.

Thus in the exemplary arrangement the system represented in FIG. 3 will most commonly be operated in connection with preparation for repair of a damaged vehicle by an entity associated with an RECC determining the parts necessary to repair the vehicle. This will be done through the operation of the collision estimating system (CES) instructions that may be operated in the RECC to identify the particular parts and part numbers of parts that have been damaged. In other exemplary arrangements the RECC may be used to identify repair parts and upgrade parts, or just upgrade parts for use on a vehicle. Of course as previously discussed, in exemplary arrangements such CES systems will generate numerous identifying items of information associated with the vehicle, the company associated with paying for the repairs or upgrades and numerous other items of information in addition to the repair or upgrade parts needed.

Once the repair or upgrade parts that are needed have been determined in a manner like that previously discussed, the RECC will operate to send a needed parts record (NPR) through the one or more networks 50 to the PPC 76. The exemplary needed parts record includes the identifying information associated with the vehicle as well as identifying information for each of the parts that will need to be procured by the VRE before the vehicle is repaired or upgraded. Of course as will be subsequently explained, generally not only the parts data will be included in the NPR that is sent to the PPC, but other information associated with the vehicle and its repair or upgrade will also be included.

The exemplary PPC receives the NPR information from the RECC. Responsive at least in part to the NPR and the information therein, the PPC is operative to cause a parts pricing record (PPR) to be produced. The PPR includes data corresponding to at least some of the parts that are included in the NPR that will be needed for the repair or upgrade of the vehicle. The exemplary PPC also causes at least one unique identifier to be associated with the PPR. The unique identifier (ID) can be utilized to recover the PPR. In some exemplary embodiments this may be an assigned generated quote number or other system number. Further additional identifiers may be associated with the PPR. For example, in exemplary arrangements the VIN associated with the vehicle, an identifier associated with the entity that requested the PPR, or other data may be utilized as an identifier or designator for the particular PPR record data. Once the PPR is generated, it is stored through operation of the PPC in the one or more data stores associated with the PPC. The PPR record data is also made accessible by the PPC to the RECC which requested the part data including parts pricing. This enables the RECC to produce a repair order record which in some arrangements may be in the form of an estimate or other document that corresponds to the repair or upgrade of the vehicle. In the exemplary arrangement the repair order record includes one or more of the ID values that are associated with the PPR in the records of the PPC. In the exemplary arrangement, the repair order record is utilized by the company responsible for paying for repairs, the vehicle repair entity or other entity to document the estimated cost of parts, labor and other activities associated with the repair or upgrade of the particular vehicle. Further in an exemplary arrangement the repair order record and PPR data may include information concerning any aftermarket or used parts that may have been specified for use in connection with the repair or upgrade of the particular vehicle.

To achieve the repair of the damaged vehicle or upgrade of a vehicle, the exemplary system is operative to assign the repair order record from a RECC to a vehicle repair entity (VRE). The repair order record may be assigned in any number of different ways. In some arrangements the repair order is generated by a printer on paper and delivered to a body shop that will do the work. In some exemplary arrangements the VRE may operate the RECC that is used to produce the NPR in accordance with requirements that have been established by the insurance company or other entity that is responsible for payment for the repairs or upgrades. Alternatively or in addition, the repair order record may be generated by the VRE who will perform the repair or upgrade work. Alternatively or in addition, the repair order record may be generated and sent electronically through the one or more networks 50 to the VRE circuit associated with the VRE who is retained to perform the repair or upgrade activity.

Alternatively in some exemplary arrangements the repair order record may be generated by a RECC and disseminated to a number of different prospective VREs who could perform the work for purposes of determining ones which may be able to perform the repair or upgrade activity in a more timely manner or based on other criteria that meet the needs of the vehicle owner and/or the company responsible for payment. For example in situations where the owner of a damaged vehicle is entitled to a replacement vehicle during the period of repair, the company making payment for the repairs may be interested in finding the VRE that can do the repairs the most rapidly so as to minimize the replacement vehicle expense. Of course such assignment of repair order records is merely exemplary and other factors and procedures may be utilized.

In an exemplary repair situation, the VRE who receives the repair order record is responsible for procuring the parts necessary to achieve the repairs or upgrades. In such circumstances, the VRE contacts an auto dealer who can supply the OE parts specified in the repair order record. This may be done in some situations electronically. The one or more networks 50 may be used, for example, by the VRE circuit associated with the VRE assigned to repair the damaged vehicle, to contact a selected auto dealer through an electronic message including identifying data corresponding to the particular ID associated with the PPR stored in the PPC. In some arrangements the VRE circuit may be enabled to communicate with a dealer's ADPOC for purposes of causing the ADPOC to recover the PPR associated with the particular vehicle, and to request electronically that the dealer through communication with the ADPOC furnish the indicated parts. Alternatively in other arrangements the VRE who has received the repair order record associated with the damaged vehicle may contact the dealer via phone and indicate the particular vehicle, quote ID, VIN or other information that will enable the dealer to recover the PPR associated with the vehicle from the PPC.

When the auto dealer that the VRE wishes to deal with is contacted about the parts needed for the repair or upgrade, the auto dealer utilizes the ADPOC to recover the PPR from the PPC associated with the damaged vehicle. In the exemplary arrangement the PPR will include data corresponding to the manufacturer's OE parts that have been specified in the repair order record for use in the repair or upgrade of the vehicle. In the exemplary arrangement the PPR will also include the pricing and other data that was calculated by the PPC for the parts and included in the PPR.

In the exemplary arrangement, the PPC will operate responsive at least in part to data included in the PPR to provide to the ADPOC of the dealer who has been selected to furnish the parts, additional information associated with the parts. This may include the dealer's cost to obtain the parts as well as data corresponding to any rebates or incentives that the manufacturer offers in conjunction with the sale of the OE repair or upgrade parts. Further in some exemplary arrangements the PPC will operate to cause an indication to the dealer through the ADPOC of a trade price or industry discounted price that is normally offered to persons in the trade, such as body shops and repair facilities. The trade price enables the VRE to make a profit on the sale of the parts that corresponds to the difference between the trade price and the parts price that the VRE was authorized to charge for the parts based on the repair order record. Further in the exemplary arrangement because the dealer through the ADPOC can review the dealer's cost plus rebates and other incentives that are associated with the sale of the part, the dealer is enabled to evaluate whether it may be appropriate to offer the VRE an additional discount or other incentive to purchase additional things that are needed for the vehicle repairs or upgrade from the dealer. This might include acquiring OE parts as substitutes for certain aftermarket parts that have been specified in the repair order record, and which the dealer can convince the VRE to buy from the dealer because of the additional discount. Further the dealer through the ADPOC may utilize an additional discount capability to have the VRE purchase other third party items, for example tires that might be needed for the vehicle repair, through the dealer. Of course these scenarios are exemplary.

Further in exemplary arrangements the PPR data that is presented to the dealer through the ADPOC may include aftermarket or used items that have been specified for the repair or upgrade of the vehicle. The exemplary PPC operates to analyze identifying data associated with such aftermarket or used items (sometimes referred to herein as N-parts) and provide information to the ADPOC on the corresponding new OE parts that are available from the dealer. The exemplary PPC further operates in accordance with its programming as later discussed, to determine whether a corresponding new OE part can be furnished by the dealer in place of the N-part for a price that is no greater than the N-part. The exemplary PPC further operates in accordance with its programming to display a price on a screen or other device associated with the ADPOC that can be offered for the corresponding OE part in place of the N-part along with an additional rebate that the manufacturer of the OE part is prepared to offer to the dealer, if the OE part is sold to the VRE at the discount price indicated.

In the exemplary arrangement the dealer has the opportunity to offer the VRE the OE part made by the manufacturer at a price that is at or below the price indicated that the VRE would have to pay to purchase the N-part. Generally a VRE would be interested in such an opportunity as there is a much lower risk of quality and rework problems associated with an OE part compared to an N-part. Further the dealer is enabled to offer a greater discount but also receive the rebate indicated which assures the dealer a reasonable profit margin on the sale of the OE part that is substituted for the N-part.

In the exemplary arrangement if the VRE chooses to purchase the OE part in lieu of the N-part, the dealer through corresponding inputs and operation of the ADPOC may change the PPR associated with the vehicle in the one or more data stores associated with the PPC. Further the exemplary ADPOC is operative to process an order from the VRE for the OE parts that the VRE has decided to order from the dealer. Further in the exemplary arrangement, the ADPOC is operative to generate electronically the paperwork that will cause the requested OE parts to be furnished to the VRE. This is done either through requisitions to supply the part from the dealer's own inventory or from a warehouse or similar operation operated by the vehicle manufacturer. For example in some exemplary arrangements the ADPOC may be operative responsive to the PPR to generate one or more fulfillment records. In exemplary arrangements the fulfillment records include data corresponding to the repair or upgrade parts to be furnished by the dealer to the VRE. In exemplary arrangements the fulfillment records may include human readable indicia which includes data corresponding to part numbers, part descriptions, the VIN or ID, and address or other data associated with the VRE and address or other data associated with the auto dealer. In some exemplary arrangements the fulfillment records may also include machine readable indicia that corresponds to parts included on the fulfillment record. In some exemplary arrangements the machine readable indicia may include bar codes or other indicia that is usable to identify and collect each vehicle repair or upgrade part. In some exemplary arrangements the machine readable indicia is usable to identify storage locations for parts as well as the parts that are stored in a warehouse or similar facility. In some exemplary arrangements an automated system or semi-automated system includes suitable readers and is operative to gather the repair or upgrade parts based on correspondence between the machine readable indicia in the fulfillment record and the machine readable indicia associated with the stored part packaging and/or locations. In such a system the readers may be in operative connection with a movable collection cart and/or automated picking or conveying structures to engage and move desired repair or upgrade parts including the machine readable indicia corresponding to data included in the fulfillment record, and to collect such parts together for furnishing to the VRE either via pick up by the VRE or by delivery to the VRE via a carrier. In some exemplary arrangements the ADPOC may be operative to cause the generation of fulfillment records at multiple warehouse or other part storage locations in situations where the repair or upgrade parts are not all in inventory at a single location. In some arrangements the fulfillment records may be operative to cause the repair or upgrade parts to be furnished directly to the VRE such as by delivery through a carrier, while in other arrangements the parts may be collected by or shipped to the auto dealer who furnishes the parts to the VRE. Of course it should be understood that these approaches are exemplary and in other embodiments other approaches may be used.

In other exemplary arrangements the RECC may generate an NPR that includes parts identifying data only for OE parts. In this way the RECC only makes available to the PPC information about the OE parts that are planned to be used in repairing the damaged vehicle. The non-OE parts such as aftermarket or salvage N-parts may not be listed in the NPR as the entity operating the RECC expects such N-parts to be obtained from lower cost non-OE parts sources.

In such system arrangements an exemplary PPC may operate to cause analysis of the OE parts included in the NPR, and determine other OE parts that are likely to be usable in the repair of the damaged vehicle. The PPC may include or communicate with suitable circuitry which is operative to analyze the parts identifying data for the requested OE parts in the NPR, and from this information determine the nature of the repairs that are likely needed to restore the damaged vehicle to operating condition. For example, if the parts identifying data for the OE part includes a headlight bezel, the PPC may operate to determine the other OE parts that are likely to be utilized in connection with making the repairs to the vehicle that include the replacement of the headlight bezel. In making the determination the PPC may include functionality similar to that in the RECC to make determinations as to parts identifying data for other repair related to a specified repair part or specified groups of parts. Further, exemplary arrangements of the PPC may be operative to utilize accessed data regarding available N-parts for purposes of determining N-parts that were likely specified by the RECC for purposes of making the repairs.

In the exemplary alternative arrangement the PPC is operative to generate a supplemental parts record (SPR) which includes parts identifying data for the OE parts that are likely to be usable in repair of the damaged vehicle, but that were not part of the NPR sent to the PPC. In an exemplary arrangement the PPC is operative to store the SPR in association with the ID that is stored in association with the PPR. In some arrangements the SPR may be a part of the PPR. In this way the authorized dealer of the manufacturer of the damaged vehicle is enabled to recover the parts identifying data associated with the PPR as well as with the SPR when the parts in the PPR are ordered for use by the VRE. This may provide the dealer who orders the parts through operation of the ADPOC to offer to the VRE OE parts as substitutes for the N-parts that were likely originally specified through operation of the RECC.

In some exemplary arrangements the parts identifying data in the SPR is associated with reduced pricing as well as a rebate amount that is made available by the manufacturer based on the dealer's sale of the OE part. In this way the dealer is offered an incentive to provide the OE part as a substitute for the RECC specified N-parts. The PPC may also operate to access stored data associated with labor costs associated with reworking of N-parts in order to make such N-parts usable in the vehicle repair. The PPC may utilize this data in calculating pricing for OE parts included in the SPR. The SPR may also include the data usable by the dealer to demonstrate the use of the OE part is more cost effective.

In some exemplary arrangements the PPC may be operative to utilize information provided with the NPR to include the OE parts identifying data in the SPR. Such information that may be utilized may include the entity responsible for payment of the repairs or upgrades to the damaged vehicle. For example information associated with the programming of the PPC may utilize the information regarding the payment responsible entity to determine a suitable pricing level that may be offered for OE parts that would cause the entity responsible for payment to prefer the OE parts over N-parts. In other exemplary arrangements information regarding the model, mileage or location of the damaged vehicle may be usable for purposes of determining the OE parts and/or associated pricing that may be suitable for purposes of identifying parts not listed in the NPR that are intended to be purchased from non-OE sources, and the pricing that would be sufficiently competitive to have the VRE purchase the OE part instead of the N-part.

In still other exemplary embodiments the PPC may operate in accordance with its associated instructions to include parts identifying data for OE parts in the SPR data for the vehicle. For example in some situations the damaged vehicle or a vehicle to be upgraded may include a luxury or performance vehicle for which the vehicle manufacturer makes available performance improvement parts which have higher performance than the direct replacement parts produced by the manufacturer. For example, some manufacturers provide high-performance parts which may be installed as upgrades on certain high-performance or luxury vehicles. Alternatively manufacturers of certain types of industrial work vehicles may offer higher performance parts which offer greater durability or longer useful life than the manufacturer's direct replacement parts for the parts originally installed on the vehicle. In some exemplary arrangements the PPC may operate in accordance with its programming to identify OE parts for which the manufacturer makes available higher performance parts which can be used in the repair or upgrade of the vehicle. This may include for example new or improved batteries and motors for electric and/or hybrid vehicles. In such circumstances the PPC may operate in accordance with its programmed instructions to include in the SPR the parts identifying data for the upgraded performance improvement parts. In other exemplary arrangements, the PPC may operate to provide optional parts that enable the vehicle to be upgraded to different performance models or trim levels. For example in some exemplary arrangements for high-performance vehicles the SPR may include options to specify lighter weight carbon fiber parts or weight reduced metal parts as replacements for the original vehicle parts, that correspond to an improved performance vehicle model than was installed on the original vehicle. Options for performance improvement parts may include additional components such as ground effects, suspension upgrades, higher performance brakes, higher performance wheels and tires and other features to convert the vehicle to a higher performance version may also be included in the SPR. Of course these approaches are exemplary and other embodiments other approaches may be used.

Alternatively or in addition for luxury vehicles additional enhanced luxury parts may be included in the SPR to provide the vehicle owner with the opportunity to upgrade the vehicle to a different trim or model level. The options may include adding different electronic modules to the SPR which can be installed to provide capabilities such as remote start, automatic collision avoidance, self parking capabilities, semi or fully autonomous driving operation capabilities, voice control over certain vehicle functions and other modules that may be selected to upgrade the vehicle. Other enhanced luxury parts associated with upgrading trim levels that may be included in an exemplary SPR may include parts that provide improvements to the vehicle entertainment center, improved radio or audio features including speakers, graphic equalizers, and other audio equipment. Additional enhanced luxury parts, performance improvement parts and security improvement parts may include electronic improvements, circuit executable instructions and upgraded modules may also provide enhanced capabilities for working in conjunction with the user's mobile device such as providing capabilities for determining vehicle location, remotely checking vehicle location and status, remotely monitoring images from internal or external cameras on the vehicle, remotely limiting vehicle top speed, acceleration, or other performance aspects of the vehicle, initiating vehicle anti-theft features remotely from a user's mobile device, security improvements to reduce the risk of intrusion to vehicle systems and security improvements to reduce the risk of interception and false origination of wireless communications with vehicle systems. In still other exemplary arrangements the SPR may include other upgrade part options that the vehicle owner may select for use in repairing and upgrading the vehicle to add additional or different capabilities. For example some users may wish to add parts such as electronic modules and circuit executable instructions to the vehicle that enable the owner of the vehicle to rent the vehicle to third parties on a temporary basis for a fee. Suitable parts such as communication modules may be added to enable the vehicle owner to provide controlled vehicle access and operational capabilities to third parties through the provision of credentials from a user's mobile device app or other remote computing device or system. The necessary parts to enable the operation of the vehicle by temporarily authorized parties without the need for a physical key or dedicated wireless token or similar device, may be listed in the SPR to provide the vehicle owner with the option to upgrade the vehicle to be a revenue-generating asset. Of course it should be understood that these components and capabilities which may be listed in the SPR for offering to the vehicle owner in connection with vehicle repairs, are exemplary of numerous different types of upgrade and alternative components and capabilities that may be offered through inclusion in the SPR. Alternatively in other arrangements such upgrade parts may be determined by the RECC in a manner like that used to determine applicable repair parts, or the RECC may determine applicable upgrade parts through communication with the PPC or through communication with other systems that can determine parts for vehicle upgrades.

In still other exemplary arrangements the PPC may operate in accordance with its programming to determine if the identifying data for the damaged vehicle or vehicle subject to upgrade corresponds to a vehicle that is subject to an unperformed manufacturer recall repair. In exemplary arrangements the PPC may be operative to make this determination through communication with one or more systems associated with the respective vehicle manufacturer such as circuits 64 and 70 previously discussed. Such circuits or other accessible data may be usable to determine that the damaged vehicle is subject to such unperformed recall repairs. In response to such determination an exemplary PPC may be operative to include in the SPR the parts identifying data for the OE parts that are usable in completing the unperformed recall repair. Such SPR data may be useful to the dealer in that the dealer can obtain the additional revenue for performing the recall repair for the manufacturer on the damaged vehicle. This may be done at the time of making such repairs if the dealer is acting as the VRE for purposes of repairing the vehicle. Alternatively the dealer may offer to work with an independent VRE making repairs for purposes of completing the recall repairs in connection with returning the damaged vehicle to service. Of course these approaches are exemplary and in other arrangements other approaches may be used.

In other exemplary arrangements the damaged vehicle may have operational data related thereto stored in one or more remote vehicle operation data databases. In some exemplary arrangements such databases may include information that is reported wirelessly directly from the vehicle concerning operation of the vehicle. Such reporting systems may operate to automatically report operating parameters, vehicle locations, part conditions, environmental conditions, parts replacement activity, or other information to a system that is operated by or under the auspices of the vehicle manufacturer. Such systems may include or be integrated with a system operated by the vehicle manufacturer to track repairs that are made through authorized dealer service organizations to the particular vehicle.

In some exemplary arrangements the remote vehicle operation data may be analyzed responsive to the PPC or otherwise to determine parts associated with the damaged vehicle that are near the end of the normal operational life of the part. For example in an electrically powered or hybrid vehicle, one or more battery cells may have a rated useful life which includes a number of charge and/or discharge cycles. Other vehicle components may have limited operating lives based on environmental conditions to which they are exposed or other conditions which can be tracked for purposes of identifying when the components are nearing the end of the expected service life. Other operation data or performance parameters, such as voltages, amperages, response times, charging rates, operating temperatures, number and duration of operating cycles and other measurable aspects of components may include data which correspond to values or changes which indicate a near end-of-life condition for the particular vehicle part.

In exemplary arrangements the PPC may communicate with one or more circuits in operative connection with a remote vehicle operation data database that includes information regarding prior operation of the vehicle that is currently in a damaged condition or vehicle that is subject to an upgrade. The PPC may operate to access data which identifies parts on the damaged vehicle that are in a near end-of-life condition based on the vehicle operation data, independent of damage caused to the vehicle in the accident or other circumstances that has necessitated the current repair or upgrade. Responsive at least in part to determining that at least one vehicle component is near the end of its life based on the vehicle operation data, the PPC is operative to include parts identifying data for the parts near the end the expected life to be included in the SPR. In exemplary embodiments the PPC is operative to include in the SPR additional data that explains the life cycle status of the part and the basis for replacing the part in conjunction with repair or upgrade of the damaged vehicle. Such arrangements may avoid labor costs or other costs associated with replacing parts that are going to need to be replaced in the relatively near future, and which can be changed less expensively in conjunction with making repairs or upgrades to the damaged vehicle. Of course these approaches are exemplary and in other embodiments other approaches may be used.

In some exemplary arrangements vehicles may operate to automatically send wirelessly, information related to numerous different vehicle components and systems. Such information and data may be received by server circuitry that is operated by or under the authority of the vehicle manufacturer, which store the information and data regarding the various vehicle components and the operation thereof. Such data may include for example, information regarding the particular driving habits of the usual operator or operators of the vehicle. Such information regarding driving habits may be utilized by onboard vehicle systems for purposes of controlling vehicle operation so as to achieve desirable properties such as the optimization of fuel mileage, minimizing wear and the risk of damage to vehicle parts, the calculation of the times for service activities and service intervals and providing indications to the vehicle operator of the need for service activities to be carried out on the particular vehicle.

In other exemplary arrangements remote server circuitry may also receive other information from vehicle systems. Such information may include information regarding comfort and position settings for vehicle seats, mirrors, climate control systems and other vehicle systems that keep the user comfortable and/or safe while operating the vehicle. Remote server circuitry may also receive subscription information regarding satellite radio options or remote accessible entertainment options that have been acquired and connected by the vehicle systems. Other information may relate to subscriptions that have been acquired or otherwise made available to the user and connected to or installed on the vehicle systems related to wayfinding or locating capabilities for finding particular types of establishments (for example service stations, coffee shops, or restaurants operated by providers with which the user has a loyalty or discount program). Other information may relate to settings that the user has programmed into onboard vehicle systems such as radio station settings, settings for hands-free communications with user wireless devices and other instructions that the user has specifically programmed into the onboard vehicle systems.

Still other exemplary systems may include financial related information, such as user account information or token data that corresponds to a particular user financial account or accounts. Such user financial information may be used for example, when a user passes through a drive-through at a coffee shop or restaurant, to pay for purchases without the need for the vehicle operator to use their cash, credit card or phone. This may be done for example by the onboard vehicle wireless systems that use near field communication (NFC), Bluetooth, WiGig or other similar short range communications providing to the retail establishment the financial token information and/or other information necessary for the retail establishment to assess the charges for goods purchased, to the user's financial account. Of course it should be understood that these are merely examples of information that vehicle components have stored therein and which may be transmitted wirelessly to and stored in remote server circuitry operated by or under the authority of the vehicle manufacturer.

In some exemplary arrangements this data related to operational and user programmed information may be stored in the server circuitry operated under the authority of the vehicle manufacturer for later recovery when it is desirable for the data to be restored onto the user's vehicle or onto another vehicle that has been acquired by the particular user. Such data may be stored in a secure manner on the remote server circuitry in a way that is correlated to the vehicle and/or to the vehicle owner.

In some exemplary arrangements when a vehicle has been involved in a collision and requires repairs, the PPC may operate to determine through communication with the server circuitry which stores such data, the identifying data for the record file or files in the form of circuit executable instructions that have been accumulated that are associated with the damaged vehicle. Alternatively such files may be provided into memory on a new or different vehicle the vehicle owner has acquired, as an upgrade to the new or different vehicle. In such arrangements the SPR may include an additional item or items as parts which corresponds to one or more fees associated with being able to access this stored record data so that it can be installed on the replaced and/or new upgraded vehicle components. In some exemplary arrangements the SPR may include a configuration charge or similar parts fee associated with loading the applicable data into the data store of a particular part of the vehicle that is being replaced. Thus for example a control module that includes circuitry operative to control the vehicle transmission may have the data loaded thereon which has been previously stored or determined so that the vehicle after repair will operate the transmission in a manner comparable to that prior to being involved in an accident. In still other exemplary arrangements, the SPR may include a fee that corresponds to restoring all the applicable remotely stored data on the numerous different vehicle system components. This fee may be associated in some arrangements with the ability of the VRE to download this data from the remote server circuitry onto the parts being installed or existing parts on the vehicle as repairs or upgrades are being made. In still other exemplary arrangements these parts which comprise circuit executable instructions may be provided on one or more items of portable media from which the instructions can be restored or loaded to the vehicle parts and systems. In some arrangements such portable media may be ordered and delivered in a manner similar to other vehicle repair parts. In other arrangements parts may be provided as a download. In some exemplary vehicles, onboard circuitry may include circuit executable instructions that enable certain autonomous or semi autonomous vehicle operations. These may include circuit executable instructions that operate to cause the vehicle to perform functions such as to avoid collisions with other vehicles or objects, maintain the vehicle in its current lane during operation, provide warnings to the operator of objects near the vehicle that may not be readily visible to the operator, provide night vision display capabilities, provide fog, rain and snow penetrating sensing capabilities for the road surface and/or obstructions in the path of the vehicle, and other capabilities. Such executable instructions may also include object identifying instructions that enable circuitry in the vehicle to identify different types of objects such as pedestrians, animals, guardrails, road markings, road signs, other vehicles and other types of objects which enable autonomous or semi autonomous vehicle operation. In exemplary arrangements the SPR may include parts which correspond to updates to the circuit executable instructions currently operating on the vehicle that will bring the vehicle up to current the available capabilities. Alternatively or in addition the SPR may include additional upgrade parts including circuitry and associated control devices that would provide such capability to a vehicle not currently having such capabilities. Further in other exemplary arrangements the SPR may include parts which correspond to such circuit executable instructions and/or other components, with or separate from, a subscription offering that enables the vehicle owner to receive periodic updates to the circuit executable instructions in exchange for the payment of periodic upgrade fees. Of course it should be understood that these approaches are exemplary and in other embodiments other approaches may be used.

In other exemplary arrangements the PPC may operate in accordance with its circuit executable instructions and/or in combination with other system circuits to provide other capabilities in addition to producing the PPR and SPR. For example in some exemplary arrangements the PPR may operate to determine that a vehicle has sustained a level of damage responsive at least in part to the nature and/or value of the repair parts that have been specified to repair the vehicle. Responsive to the level of damage being determined to be at or above a set threshold, the PPC itself or in combination with other connected system circuits may operate to take certain actions. For example the threshold may include a dollar threshold associated with the specified repair parts (and the calculated supplemental repair parts likely to be needed to repair the vehicle). Alternatively or in addition, the threshold may be based on the nature of certain repair parts that are specified for replacement, for example the inclusion in the NPR of a replacement part that corresponds to a vehicle frame or subframe structure or another major structural component. Of course other bases for determinations of the threshold may be used.

In some exemplary arrangements the PPC or other connected circuits may operate responsive at least in part to making a determination that the vehicle has sustained damage above a threshold to indicate to a system circuit associated with the vehicle manufacturer or a vehicle dealer that the vehicle owner may wish to acquire another vehicle, rather than repair the damaged vehicle. In such arrangements the PPC may operate in conjunction with the vehicle manufacturer system circuits that track information regarding repairs or other activity of the vehicle, to determine the identity of the vehicle owner and the owner's associated contact information based on data stored in the systems associated with the vehicle manufacturer. Responsive to determining the vehicle owner, the vehicle manufacturer systems or other circuits may operate in accordance with their associated circuit executable instructions to make a determination of a calculated credit that the manufacturer or dealer is willing to offer the owner of the damaged vehicle toward the purchase or lease of a new or reconditioned vehicle. The manufacturer associated systems may operate for example, to automatically send the vehicle owner a notice that they may choose to receive a credit from the manufacturer toward the purchase of a new manufacturer vehicle in a particular amount. Alternatively and/or in addition, the manufacturer system may operate to provide the vehicle owner a credit amount in exchange for trade in of their damaged vehicle for salvage and purchase a new or reconditioned vehicle. Alternatively, the manufacturer systems may communicate to the vehicle owner or lessee that they are offered a discount on the purchase or lease of another vehicle. Further, in some exemplary arrangements the system circuitry associated with the manufacturer may operate so that when a damaged vehicle that meets the threshold has been identified through operation of the PPC, the manufacturer related system operates to identify new or reconditioned vehicles that are immediately available from manufacturer dealers geographically close to the owner of the vehicle, that are likely to be of interest to the vehicle owner of the damaged vehicle. This may include for example, the identification of vehicles in inventory that are the same or a related or successor model to the vehicle that has been damaged and which can be made immediately available for purchase or lease by the owner of the damaged vehicle. Such manufacturer operated systems may also operate in conjunction with dealer systems or other related systems to provide the user with pictures and other related information and offers concerning the vehicles that the vehicle owner may wish to choose to lease or purchase as an alternative to having their damaged vehicle repaired. In some exemplary arrangements such systems may operate to enable the user to complete a purchase or lease transaction online to minimize the time that the user is without the use of a vehicle. Alternatively or in addition such online transactions may include the capability for the user to buy out the unexpired term of the lease that is applicable to the damaged vehicle, or to sell the damaged vehicle for salvage as part of the transaction associated with the new or refurbished vehicle. Of course these approaches are exemplary and other embodiments other approaches may be used.

In still other exemplary arrangements the PPC may operate in accordance with its circuit executable instructions, or in conjunction with other systems, to provide other offerings that may be of interest to the owner of the damaged vehicle. For example, in some exemplary arrangements the PPC may operate to identify vehicles that are being repaired or upgraded under circumstances where the party responsible for the cost of the repairs or upgrades is entirely or at least partially the individual owner of the vehicle. This may be done for example based on the pricing circuit executable instructions of the PPC that use information regarding the party responsible for payment for the vehicle repairs or upgrades for purposes of determining the pricing of parts included in the NPR. In situations where the individual vehicle owner is exclusively or largely the entity responsible for paying for the repairs or upgrades, the PPC may interface with and provide that information to vehicle manufacturer or dealer operated or associated systems that have the capability to identify and contact the vehicle owner. In such situations the manufacturer or dealer through an affiliated financing company may offer the vehicle owner a loan to help the owner finance the vehicle repairs or upgrades. Such a loan may be based on using the vehicle owner's ownership interest in the vehicle as collateral for the loan amount. The availability of a loan from the vehicle manufacturer and/or an entity that is affiliated by working with the vehicle manufacturer, may enable the vehicle owner to perform a more thorough and complete repair and refurbishment or upgrade of the vehicle, including the use of parts that are made available by the vehicle manufacturer. Further in some exemplary arrangements the vehicle manufacturer may condition the provision of the loan on the use of repair or upgrade parts that are made available by the vehicle manufacturer as well as the repair or upgrade work being performed by an authorized dealer of the vehicle manufacturer. Of course these approaches are exemplary and other embodiments other approaches may be used.

In exemplary embodiments systems may also be utilized for purposes of facilitating the distribution and management of inventories of repair parts which are needed to repair damaged vehicles. Such systems may be operated to assure that dealers of vehicle manufacturers have sufficient quantities of OE repair parts available for purposes of making repairs on vehicles in a timely manner.

In exemplary arrangements factors which are statistically likely to result in a need for certain types of vehicle repair parts may be analyzed through operation of one or more circuitry or systems associated with the vehicle manufacturer or other supplier of repair parts. For example, systems may operate to determine the expected deer population in a given geographical region based on weather conditions and other factors. Such weather conditions may reflect availability of food, cold weather related population reductions and other factors that are usable to determine or estimate changes in deer population in a given geographical area. Such other factors may include available data on the numbers of hunting licenses issued, information on numbers of deer taken and the sex of the deer taken, and other available or estimated data on factors that impact the deer population. Based on historical data on the number of accidents involving vehicle collisions with deer in a given region, and the calculated change in deer population based on weather and other measured or estimated factors, an anticipated number of vehicle repair parts needed to repair vehicles involved in collisions with deer can be calculated. The calculation is based on the types of manufacturer produced vehicles registered to users in the region, and the parts that typically need to be replaced on such vehicles as a result of a collision with a deer. Such parts commonly include hoods, windshields, bumpers, grills, airbags, headlights and front fenders.

In exemplary embodiments a calculation circuit operated by or for the benefit of the vehicle manufacturer can produce statistical models which include estimates of the quantities of the particular OE parts that are expected to be needed in a given time window based on the factors that impact the deer population in a given region. Based on these circuit calculated estimates, the needed quantities of OE parts can be manufactured in advance and made available in dealer inventories or in regional warehouses in order to meet the demand for such repair parts at the time that the collisions occur. In this way the vehicle manufacturer and its authorized dealers are enabled to satisfy demand and provide the necessary collision repair services to customers involved in such collisions.

In other exemplary embodiments calculation circuits may be operative to calculate anticipated demand for other types of repair parts in response to other measurable conditions and predicted parts failures. For example prolonged periods of hot or cold weather may impact the battery life of cells used in electrically powered vehicles and hybrid vehicles. The population of models of vehicles which include such cells in a given geographical area that experiences weather conditions that impact the usable life of such cells, enable the calculation of the demand for such replacement cells within the geographical area experiencing such weather conditions. Further such circuits and systems may utilize the available data from a remote vehicle operation data database such as previously discussed, to identify performance trends of electrical cells or other vehicle parts which show changes in properties that are indicative of a need for future replacement within a given future time window. Using such data such calculation circuits may operate to determine the probable future demand for the repair parts that will be needed to keep operational the population of vehicles which include such parts within the geographical area. The manufacturer may then assure that authorized vehicle dealers and regional parts warehouses associated with the manufacturer have the adequate number of needed repair parts available to make the anticipated number of repairs when such parts are needed.

Additionally as previously discussed, vehicle information that is communicated from the vehicle to systems associated with the vehicle manufacturer, either wirelessly in real-time during vehicle operation, or by physical connections when the vehicle is subject to a service activity, may also be used to determine components that are nearing the end of the expected service life. The type and nature of these components can be utilized by system circuits associated with the manufacturer to determine the types and quantities of replacement components that will be needed within certain future time windows for purposes of making the necessary vehicle repairs or vehicle upgrades. Such calculated data associated with vehicle components reaching the end of life may also be used for scheduling orders and/or production of replacement parts so that adequate quantities of the required types of replacement parts are available to meet the service needs for the population of manufacturer vehicles.

Of course it should be understood that these are mere examples of types of repair parts for which the demand can be accurately estimated from external factors and/or remote vehicle operation database data. Future demand for numerous different types of repair parts can be calculated and used for production and distribution purposes to assure the availability of such parts when needed.

Operation of an exemplary PPC to provide an RECC and the operator thereof with parts pricing data is now described in connection with FIGS. 5-23. In the exemplary arrangement, the PPC is configured to restrict access to the capabilities of the PPC to certain authorized users. Further the exemplary arrangement assures that if the user is authorized, they can only access those records and functions to which the particular user or RECC system is authorized to have access.

In the exemplary arrangement, the PPC uses software based on OAUTH 2.0 for enabling access by authorized users. The OAUTH 2.0 is a protocol that provides specific authorization flows from device applications. The OAUTH specification and associated RFCs are developed by the IETF OAUTH working group. Of course it should be understood that this approach to enabling access to the available resources of the PPC is exemplary and other approaches may be used.

Figure 5:
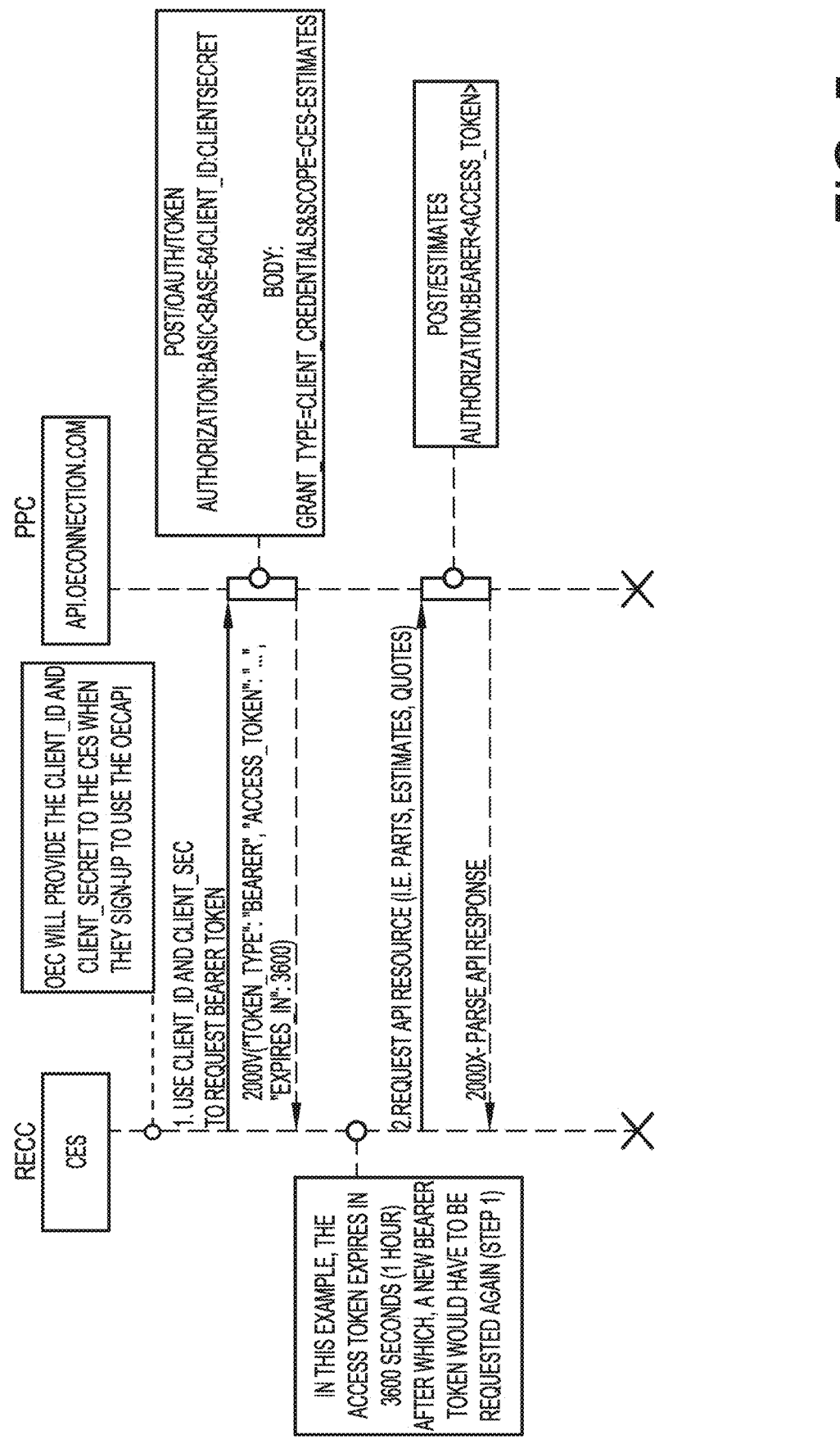
FIG. 5 is a schematic view of exemplary logic flow associated with providing authorized access to the functions of the PPC by a repair estimate calculation circuit (RECC) associated with a collision estimating system (CES).

The exemplary message and logic flows associated with authenticating an authorized RECC user to the PPC is represented in FIG. 5. As represented therein, the operator of the PPC which in this case is referred to as OEConnection or OEC, provides a client ID and client secret to the operator of the collision estimating system (CES and/or RECC) when they agree to participate in the use of the system including the PPC. As represented in FIG. 5, the RECC sends the client ID and client secret to request a token from the PPC system. As shown in FIG. 5, authenticating the genuineness of provided credentials causes the PPC to operate to provide an access token which enables the RECC to access the PPC and the methods available therein, for obtaining parts pricing information for a limited period of time. In the example represented in FIG. 5, the period of time corresponds to one hour. The token enables the RECC to have the functions performed in conjunction with methods to be carried out to provide the RECC with parts pricing information during the time period associated with the token. If the access token expires or the RECC has an expired access token, the exemplary PPC and server associated therewith enables the RECC to acquire a new token so as to carry out further operations.

Further in the exemplary embodiment of the PPC, control logic is provided by the circuit executable instructions to avoid abuse of the system by authorized users who have been granted access. The access logic associated with the PPC monitors usage by individuals to determine the number of inquiries processed. If the number of parts pricing transactions carried out exceeds one or more program thresholds, the user's further access to the PPC resources is discontinued. For example in a circumstance where an authorized user is attempting to construct a price list for a broad range of parts or otherwise attempting to gain information on parts pricing from the system that is unrelated to a specific vehicle collision situation, the logic associated with the system will operate to suspend further inquiries. Further in exemplary arrangements, control logic is included in connection with the PPC so that if a particular operator of an RECC repeatedly attempts to engage in activities that suggest that they are utilizing the PPC for unauthorized purposes, the RECC system will be blacklisted and no longer allowed to access functions of the PPC.

In exemplary arrangements, this control logic is associated with the number of parts pricing requests processed within a given time period by the RECC. Further the control logic considers factors including the type of authorized user granted access to the system. For example in the case of an authorized user associated with the RECC and who is identified in the system as a company that makes payments for repair of numerous vehicles, the threshold for the number of permitted inquiries may be set to a very large number within a given time window or may be set as unlimited. Alternatively when the authorized user has been categorized as an independent body shop having a single location, the threshold may be programmed to be at a much lower level. In exemplary arrangements the categorization of an authorized user so as to associate each user as a particular type and assign the corresponding thresholds may be done at the time that credentials such as the client ID and client secret are issued. In this way, the entity responsible for operation of the PPC may allow access by user entities about which little is known, while still guarding against such entities having capabilities to improperly use and mine data from the system. Of course it should be understood that these approaches are exemplary and in other arrangements, other approaches may be used.

Exemplary PPC functions and the application programming interface (API) associated therewith for communication with RECC devices that operate as collision estimating systems (CES) is configured in the exemplary embodiment to employ the methods associated with eight program objects that are included in the instructions executed by the exemplary PPC. These eight program objects are given the designators listed in FIG. 6.

In the exemplary configuration the PPC enables its capabilities to be used in conjunction with numerous diverse and different types of systems. As a result, this enables the PPC to operate with RECC systems and CES instructions that utilize diverse platforms and programming languages. Likewise the exemplary PPC is enabled to operate in conjunction with ADPOC platforms that utilize different programming languages and dealer management systems (DMS) platforms. These capabilities are accomplished in an exemplary arrangement by the PPC communicating PPR data in a data format that can be read and used by any one of numerous computer programming languages. In the exemplary arrangement the PPC communicates in the JavaScript object notation (JSON). JSON is a lightweight data interchange format that is language independent. It has the advantage that it is a "self describing" to other programs and is easy to interpret. It is a text-based language that uses JavaScript syntax. Of course it should be understood that in other arrangement other data formats that are suitable for being read and used by numerous platforms and programming languages may also be used. This includes markup language formats such as XML and extended XML formats. Of course it should be understood that these approaches are exemplary and while it is desired in the exemplary arrangement to have the PPC be interoperable with numerous other types of systems, other arrangements may operate based on specific proprietary technologies with more limited capabilities but still accomplish the functions as described herein.

FIGS. 7-14 describe the exemplary program objects that are utilized in connection with PPC communication with RECC devices and CES operators. Although system operation is discussed in connection with providing parts to repair vehicle damage, similar operation may be used in connection with vehicle upgrades. Specifically FIG. 7 describes the New Estimate object which contains the records including estimate or repair order identification number and the name of the entity that is requesting the pricing associated with the parts needed for the particular damaged vehicle.

FIG. 8 describes the Estimate Header object. This object contains records with all the data fields for the exemplary PPC to provide a price for the indicated repair parts. As shown in FIGS. 8 and 8A, such information commonly includes information which uniquely identifies the vehicle including the model year, make, model manufacturer associated therewith. The data also includes an identifier for the company responsible for payment, the vehicle mileage and the state where the vehicle is located. As will be explained in greater detail later, this information is utilized by the pricing logic in order to provide parts pricing for OE parts to include in the parts pricing record (PPR) produced by the PPC.

FIG. 9 shows the Part object which includes the request and response records for the pricing for one or more OE parts associated with a collision situation and PPR record. The values associated with the object are described in the indicated figures.

FIG. 10 shows the information included in the Part object. This data includes record data which identifies the OE part and the quantity needed in connection with the vehicle repair situation. It should be mentioned in connection with the Part object that in some situations, the collision estimating system software operated by an RECC will also attempt to calculate part price data. When such data is provided, it will be included in the Part object data.

FIG. 11 shows the data in the Related Part object. The Related Part object has to do with data records concerning an aftermarket or used part that may be included in the NPR data that is submitted to the PPC. As previously mentioned, the exemplary PPC includes the non-OE part (or N-part data) in the PPR record data that is stored by the PPC as it may be used in some cases to offer a vehicle repair entity, the opportunity to purchase a new OE part at the same price as an N-part (or at a reduced price).

FIG. 12 shows the Quotes object of the exemplary embodiment. This object corresponds to the list of parts in a given estimate or PPR record.

FIG. 13 describes the EMS Data object. The EMS Data object contains a record including a complete data set of information related to the damaged or other vehicle, an example of which is shown for example in FIG. 20. This is also referred to herein as the parts pricing record for PPR data.

FIG. 14 describes the Errors object which indicates records of errors or anomalies that may occur in connection with operation of the PPC.

Figure 16:
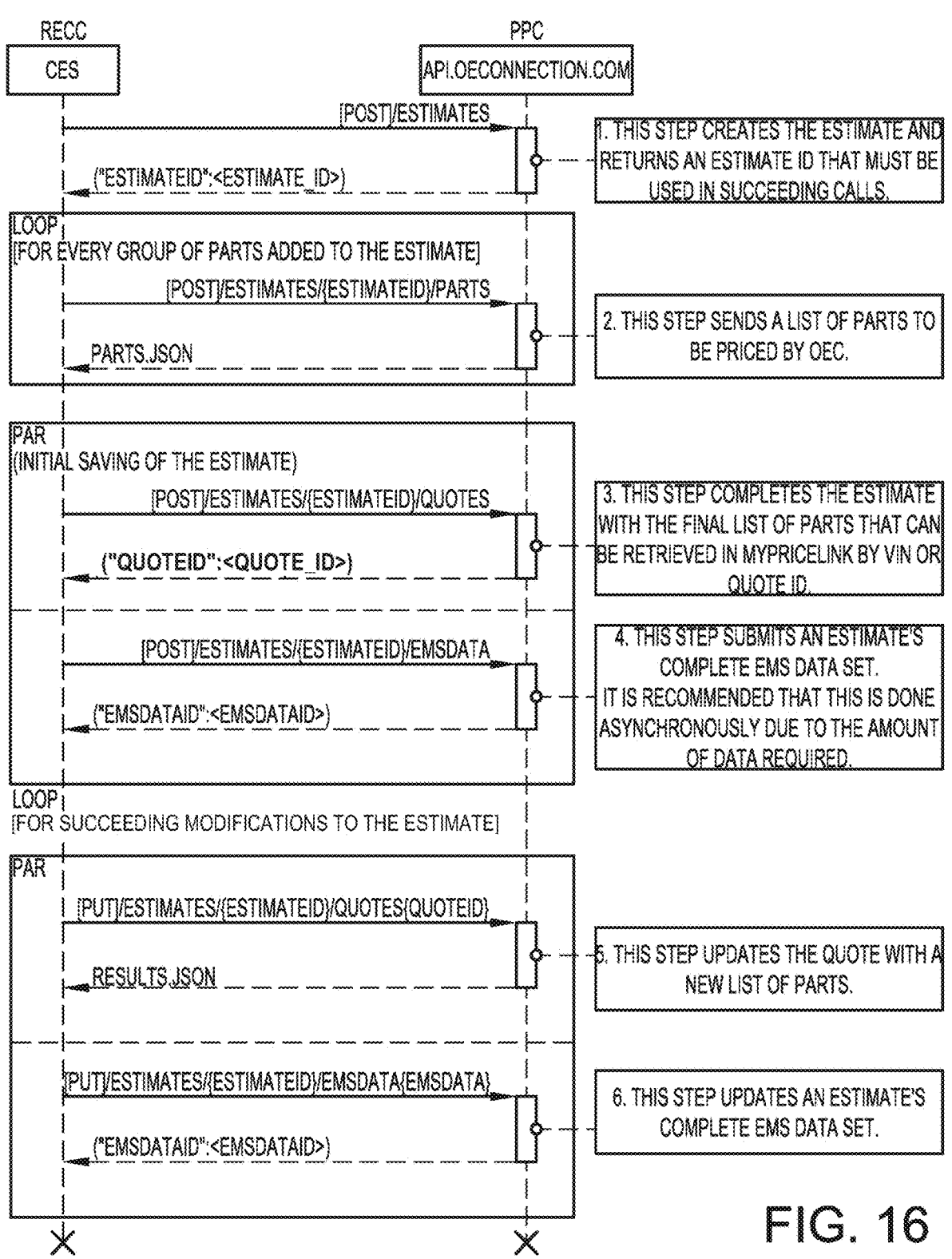
FIG. 16 is a schematic view representing the methods and logic flows executed in a session between an RECC and the PPC of an exemplary embodiment.

FIG. 15 describes the methods that are invoked in connection with the operation of the PPC and the program objects previously described. FIG. 15 lists the methods, how they are used and the data each returns. These API method endpoints described in FIG. 15 enable the collision estimating system instructions and functions operated in RECC systems to create parts pricing records, store them in the PPC and retrieve them as desired. FIG. 16 describes an exemplary session for communications and logic flow carried out between an RECC used for creating a parts pricing record (PPR) associated with a damaged vehicle, and the PPC which provides the pricing data for use in connection with the estimate/repair order.

FIG. 16 describes the communications and the functions carried out in producing a parts pricing record PPR which is alternatively referred to in the drawings as an EMS data set. As shown in FIG. 16, the communications and logic flow create a parts pricing record which includes the prices for the OE parts that are specified by the RECC as needed for repair of the vehicle. Further in the exemplary communications and logic flow, the RECC is enabled to access and update the parts pricing record and EMS data set data that is stored in the PPC.

FIGS. 17-22 describe the methods that are carried out in connection with communications between the RECC and PPC and the logic flow described in FIG. 16. Examples of the data that is included in the request to the method and the results provided by the method are also included in the Figures. The Figures also describe the resource URLs for the methods described in the exemplary arrangement of the PPC. Other information such as the need for authentication to access the method and whether the method is rate limited is also described. In some cases, the method may have the rate selectively limited through operation of the control logic which limits the number of requests which can be processed within a given time period based on the type of authorized user of the PPC.

FIG. 17 describes the POST/estimates method which is used to create the estimate and returns a newly created estimate ID in the PPC system.

FIG. 18 describes the POST/estimates/{id}/parts method. This method is used to retrieve the parts prices of OE parts. The example shows the information that is submitted concerning the damaged vehicle and the part numbers and the returned pricing data for the PPR based on the pricing logic.

FIG. 19 describes the methods associated with the POST/estimates/{id}/quotes method. This method creates a quote with the final list of parts for the estimate or repair order record. It returns the newly created quote ID. This method includes pricing for both OE parts and non-OE parts.

FIG. 20 describes the POST/estimates/{id}/EMS data method. This method submits a complete EMS data set associated with a parts pricing record. The submitted information includes all the EMS data described in the Figures. However, as indicated some of the data may not be available and need not be included or may be filled with null values. The method produces a result that indicates the data ID.

FIG. 21 describes the PUT/estimates/{id}/quotes/{quoteid} method. This method is used to update an existing quote by replacing parts in the PPR with a new list of parts. An example is indicated and the method returns an indication of success if the method is successfully carried out.

FIG. 22 describes the PUT/estimates/{id}/EMS data/{ems Dataid} method. This method is used to replace the entire data set in a PPR with a new EMS data set. Again as previously mentioned, EMS data sets include information that is not related to parts pricing and which in some cases may be omitted or filled with null values. The method used to replace an existing PPR data set and returns an indication of success if the data is updated.

The exemplary PPC further includes the capability for delivering large numbers of PPR records responsive to needed parts record (NPR) data for a large number of damaged vehicles. In the exemplary arrangement the PPC is enabled to accept batches of EMS data in compressed data files. As described in FIG. 23, the compressed data files include contents for each record in the JSON format. These large batch files are then processed through the operation of the exemplary PPC to provide parts pricing data in a folder that can be accessed by the submitting entity. Further, as is the case with individually processed files, each of the NPR files is operative to cause the PPC to produce a PPR/EMS file data set that is stored in the PPC data store.

Thus as can be appreciated, the exemplary PPC is enabled to provide pricing for OE parts to external RECC systems and store records that correspond to each damaged vehicle situation. Further the RECC systems are enabled to access and update the PPR data records for purposes of producing estimates/repair order records.

The exemplary PPC further enables communication with numerous auto dealer parts order circuit (ADPOC) devices. As previously described, the exemplary ADPOC devices are enabled to access the PPR data and EMS data sets in connection with the dealer receiving an order for the OE repair parts from a VRE circuit associated with a vehicle repair entity (VRE) responsible for repairing the damaged vehicle. Further the exemplary PPC provides additional capabilities to the dealer through the ADPOC like those previously discussed which enables the dealer to offer the VRE the capability to acquire OE parts on terms that are competitive with aftermarket and used parts in many circumstances. Further the exemplary PPC and its capabilities to communicate in a data format that can be read and used by numerous different computer program languages enables various different types of ADPOC platforms running different ADPOC programs and dealer management systems (DMS) instructions to readily communicate with the PPC.

Figure 24:
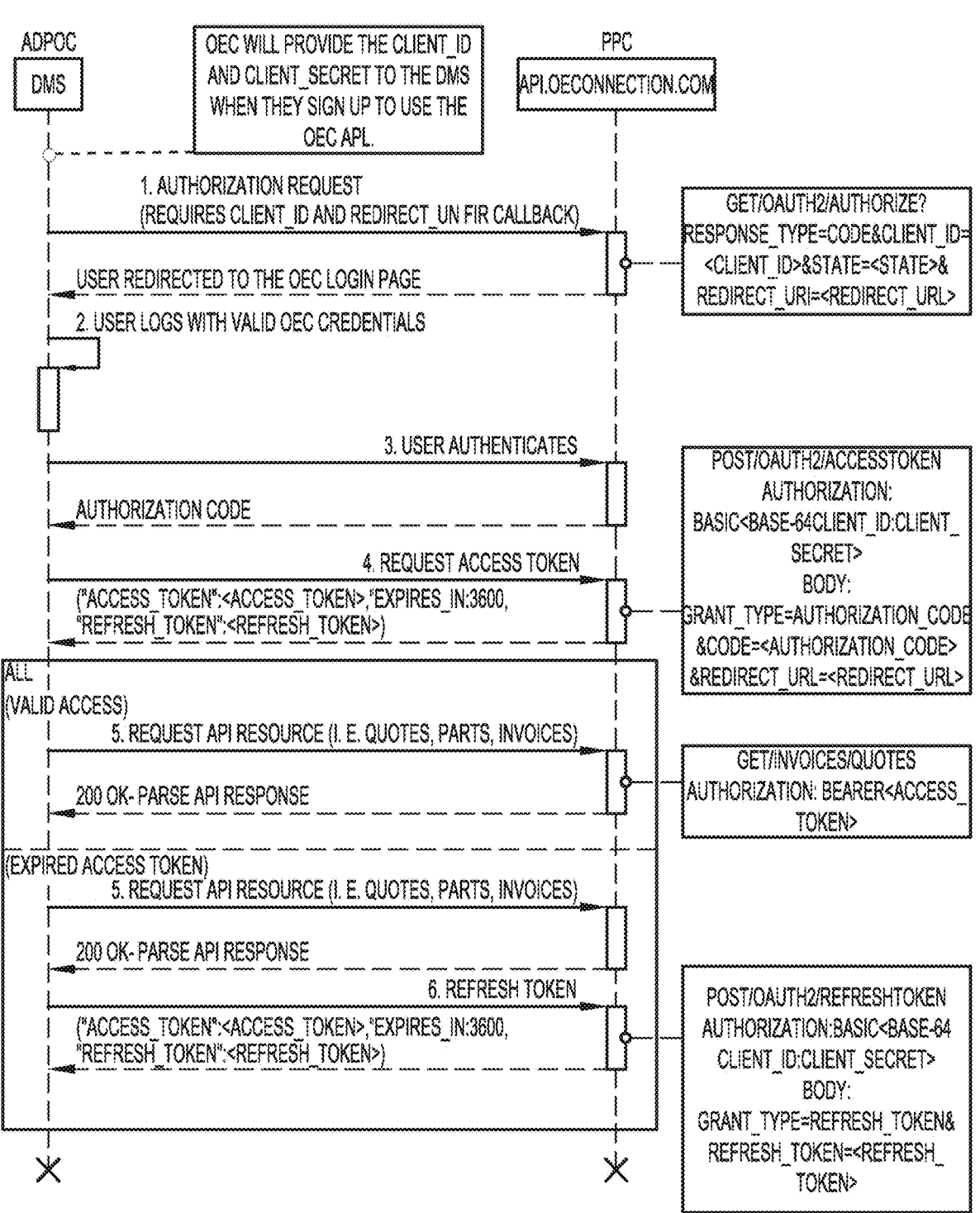
FIG. 24 shows exemplary session communications and logic flow of the PPC in conjunction with an auto dealer parts order circuit (ADPOC) for purposes of gaining authorized access to functions of the PPC and for purposes of fulfilling parts orders.

The communications and functions of the exemplary PPC in connection with an ADPOC is described in connection with FIGS. 24 through 35. FIG. 24 describes schematically the communicating and logic flow associated with enabling authorized users to access PPR records (and SPR records if applicable) stored in the system. As was previously described in connection with RECC access, ADPOC access relies on an implementation of OAUTH 2.0 in which the ADPOC operator is provided a client ID and client secret when they are initially granted authorization to utilize the PPC by the operator thereof, which operator in this case is referred to as OEC. As is the case with RECC systems, ADPOC systems are issued an access token which limits access to PPR files (and SPR files) that include OE parts of the type sold by the dealer. Further the access token has a limited duration and must be refreshed after the assigned period of time.

In the exemplary arrangement the PPC in interacting with ADPOC systems will carry out functions associated with the four indicated program objects listed in FIG. 25. These four objects are described as the Quotes, Parts, Invoices and Errors objects.

FIG. 26 describes the methods that are carried out by the objects in response to the external ADPOC/DMS applications. FIG. 26 lists the methods and the usage thereof. It also describes the returns and endpoints of each of the methods.

Figure 27:
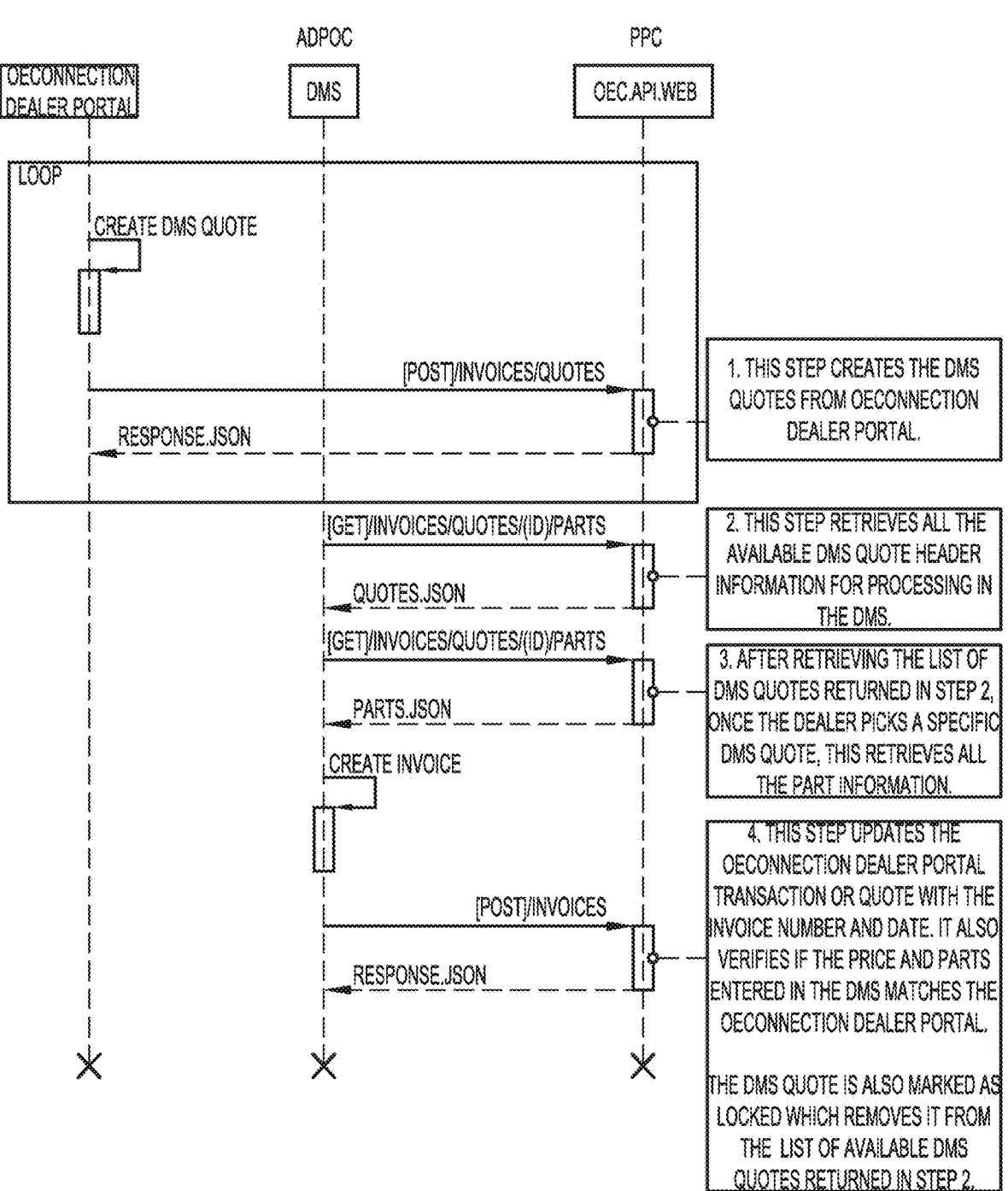
FIG. 27 is a schematic view of session communications and logic flow carried out between the PPC and an exemplary ADPOC.

FIG. 27 describes in detail the particular implementation of the PPC in communicating with an ADPOC in order to retrieve the authorized and desired PPR records for purposes of placing an order for the OE parts described therein. The described arrangement does not describe associated SPR records which may be used in some implementations. FIG. 27 further describes the communications carried out in sessions associated with the ADPOC system operating to receive the order associated with the OE parts that are included in a PPR record. In the exemplary system the flow represented in FIG. 27 initially describes a scenario in which a dealer operates their ADPOC dealer management system (DMS) to create parts quotes in the designated dealer portal operated by OEConnection, which is also the operator of the PPC in the exemplary embodiment. This step can be utilized in some embodiments to create DMS quotes associated with the particular parts which are included in PPR/EMS data sets. This particular step is useful in the exemplary arrangement as this enables the ADPOC of the dealer that accesses a particular PPR to have not only the pricing data that was given by the PPC for purposes of creating the estimate/repair order record, but also other pricing data for the OE parts. Such other pricing data includes for example, the dealer price data for the particular part and any rebates or other incentives that the manufacturer offers in connection with the dealer's sale of the particular part. Other pricing data which is provided in an exemplary embodiment includes the trade price data which represents pricing that is offered to other entities engaged in the trade, such as the body shop operators. The difference between the quoted parts price in the PPR for the part and the trade price which the VRE will actually pay enables the VRE to make a profit on the sale of the parts to the owner of the vehicle in connection with making repairs. Further as discussed in additional detail later, the interconnection with pricing capabilities of the dealer portal may facilitate enabling the dealer to sell an OE part where an aftermarket or used part had been originally specified in the PPR. Further as later explained, exemplary arrangements enable the ADPOC to operate to submit the order as well as to process manufacturer requests for rebates associated with the sale of the particular OE parts.

As represented in FIG. 27, the exemplary transaction flow enables the ADPOC/DMS system to obtain the PPR data, to update it as necessary, and to also when the order for the parts is placed with the dealer, to remove it from the list of available PPR records for which dealers can fulfill the parts orders.

FIG. 28 describes the Quotes object of the PPC. As shown the Quotes object provides a response to the request for pricing for OE parts in a collision transaction.

FIG. 29 shows the Parts object which shows the part and pricing data in a quote that a dealership provides concerning the price of a part.

FIG. 30 describes the Invoices object. The Invoices object provides a list of parts tied to a quote that have been invoiced in an ADPOC/DMS.

FIG. 31 describe the Errors object which provides the reasons that a request to obtain a quote is invalid or rejected.

FIGS. 32-35 describe the methods that are carried out in connection with the PPC ADPOC transaction flows.

FIG. 32 describes the GET/invoices/quotes method. This method is used to retrieve a collection of records corresponding to open quotes. The method supports a number of different query parameters by which existing PPRs/EMS data sets can be selected and retrieved. Examples of ways in which the PPRs are retrieved using the methods are shown. Thus for example a dealer operating an ADPOC who is contacted by a VRE about parts needed for repairing a vehicle, may recover the PPR data in the PPC data stores using any of the query parameters that the VRE may provide.

FIG. 33 in contrast describes the GET/invoices/quotes/ {id} method. This method provides for retrieval of a single PPR by the associated id. Thus if the dealer has the particular id, the PPR/EMS data set can be retrieved using the id.

FIG. 34 describes the GET/invoices/quotes/{id}/parts method. This method is used to retrieve identifying data describing all parts associated with a PPR. As shown in FIG. 34, this method provides as a result, a record including the number, description, quantity and pricing information associated with each part. Further in the exemplary embodiment the pricing information includes the list price included in the estimate, the cost to purchase the item and the trade price offered to a body shop or other dealer.

FIG. 35 describes the POST/invoices method. This method operates to update the PPC with the DMS invoice information. This information is used to indicate that the ADPOC has been operated to order the particular parts for a VRE, and/or that one or more fulfillment records have been generated.

Thus as can be appreciated, the exemplary PPC enables ADPOC systems to be operated to retrieve PPR records and to enable the dealer to fulfill the order of a VRE for the OE repair parts included in a PPR record associated with a damaged vehicle or vehicle being upgraded.

The exemplary embodiment of the PPC enables calculating the quoted price for repair parts of different types that may be requested for purposes of repairing a damaged vehicle. The exemplary PPC also executes programmed instructions which implement discount logic for purposes of determining the quoted price for a given part.

FIG. 36 lists exemplary categories of collision parts for which situational pricing is offered through operation of the exemplary PPC. As can be appreciated, these different parts have widely different properties and have different levels of demand. These factors impact how the vehicle manufacturer charges for such items. Further the cost to make such items can vary widely. For example, certain parts require a substantial tooling investment where other parts do not. The manufacturer's dealer price generally reflects these different considerations.

FIG. 37 lists factors that influence the quoted parts prices offered by the exemplary PPC. These quoted parts prices are the situational pricing that an entity operating an RECC such as a repair shop or an insurance company, receives in response to their request for pricing. As represented in FIG. 37, the exemplary pricing logic considers the dealer prices set by the manufacturer. Also considered is whether the particular part is covered by patent protection. This factor could be important as aftermarket parts corresponding to a patented part will not be available. Other considerations include filtering whether the particular type of part for which pricing is being requested falls into one of the product lines, such as those indicated in FIG. 36.

Exemplary situational pricing also considers information specific to the vehicle repair that needs to be made. Factors that are considered by the pricing logic include the company who is responsible for making payment for the repairs. Other considerations include the model year, manufacturer, make, model and mileage of the vehicle. These factors are important because often companies or other persons responsible for repair do not accept the use of aftermarket and/or used parts on what are considered relatively new and/or high end vehicles. Alternatively if a vehicle is older or has high mileage or is not considered a high end vehicle, aftermarket or used parts may be considered acceptable.

Other factors considered by the pricing logic include the residence state of the vehicle owner. This factor may have a bearing on different aspects of pricing engine logic. The state in which the vehicle is located may have rules that regulate the use of aftermarket or used parts so this can impact the requirement to use OE parts. In addition the state of the vehicle has a bearing on the level of competition which factors into the price.

Another factor in pricing is whether the part specified is an OE part or non-OE part. This includes used parts and aftermarket parts. As discussed previously, the exemplary PPC may provide special processing instructions for dealing with N-parts to provide opportunities to enable the dealer to substitute a sale of an OE part that the dealer provides for the N-parts which were originally specified for use in repair of the vehicle.

Other factors considered by the exemplary pricing logic include the historical pricing to meet competition. Data included in the files of the exemplary PPC include the lowest selling price of each particular part on a national basis and the lowest selling price of the part on a state basis. These factors are utilized in making decisions when attempting to provide attractive pricing for OE parts to compete effectively with N-parts.

FIG. 38 is similar to FIG. 37 and shows where in the exemplary embodiment of the PPC, the sources from which the data in each of the factor categories is derived. As reflected in FIG. 38, the categories of information regarding particular parts come from the vehicle manufacturer who supplies the parts. Companies such as insurers may have their own rules and policies which are stored in the records of the PPC concerning whether aftermarket or used parts are allowed to be used on particular vehicles. Also, manufacturers may provide discounts based on the year, make and model of the vehicle. This may be done for a number of reasons including parts availability for models in given categories. Further in exemplary arrangements, records include rules or other program requirements associated with particular states and the parts that can be used. The exemplary PPC also includes files which store lowest selling price information for each particular part on both a state and national basis for use in calculations of discounts.

Figure 39:
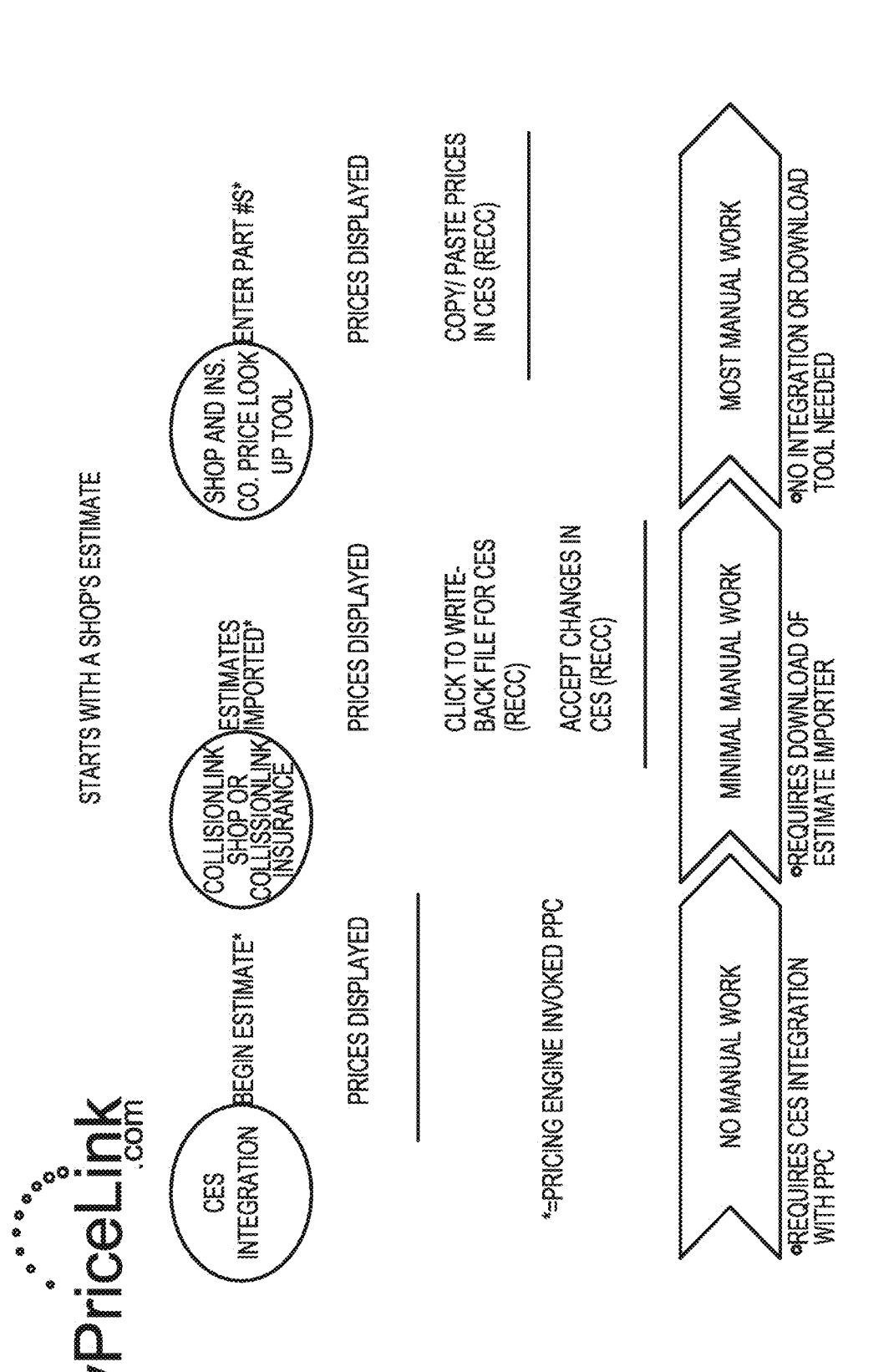
FIG. 39 shows schematically options for interfacing with the PPC for purposes of determining pricing for collision parts.

FIG. 39 shows graphically some different approaches that can be used in connection with an exemplary embodiment of the PPC for purposes of creating the estimate/repair order which includes the price for repair parts. The use case on the left which is referred to as a collision estimating system integration, represents a situation where the RECC is operated to work automatically with the PPC. The RECC provides an NPR including the list of parts that are needed to the PPC and obtains the parts pricing automatically in connection with the parts pricing record.

The use case displayed in the middle involves a scenario where estimates are imported from the CollisionLink system offered by OEConnection. This approach involves routing back the file to the entity's collision estimating system. In this case the PPC produces the prices based on the imported estimates.

The use case shown on the right shows a manual input of each part number into the PPC system and the pasting of pricing into the shop's collision estimating system. This approach requires the most manual labor. However, it should be understood that all of these approaches are effective and readily accomplished compared to other approaches that can be carried out without the functions provided through operation of the exemplary PPC.

FIG. 40 represents schematically the work flow carried out by a dealer in connection with quoting, ordering and processing requests for manufacturer's rebate on collision or other parts sold by the dealer. As shown in FIG. 40, this process generally involves three separate processes carried out by the dealer. These processes include viewing the PPR records of the pricing, and recording the sales price for the parts to the VRE who is requesting to purchase them from the dealer. The second step includes creating an invoice in the dealer management system (DMS) which includes the list price and the sales price. The third step is to submit a claim for the reimbursement that the vehicle manufacturer provides on the sale of the manufacturer's OE parts. It should be understood that such approaches may also be used in connection with OE parts included in an SPR.

Figure 41:
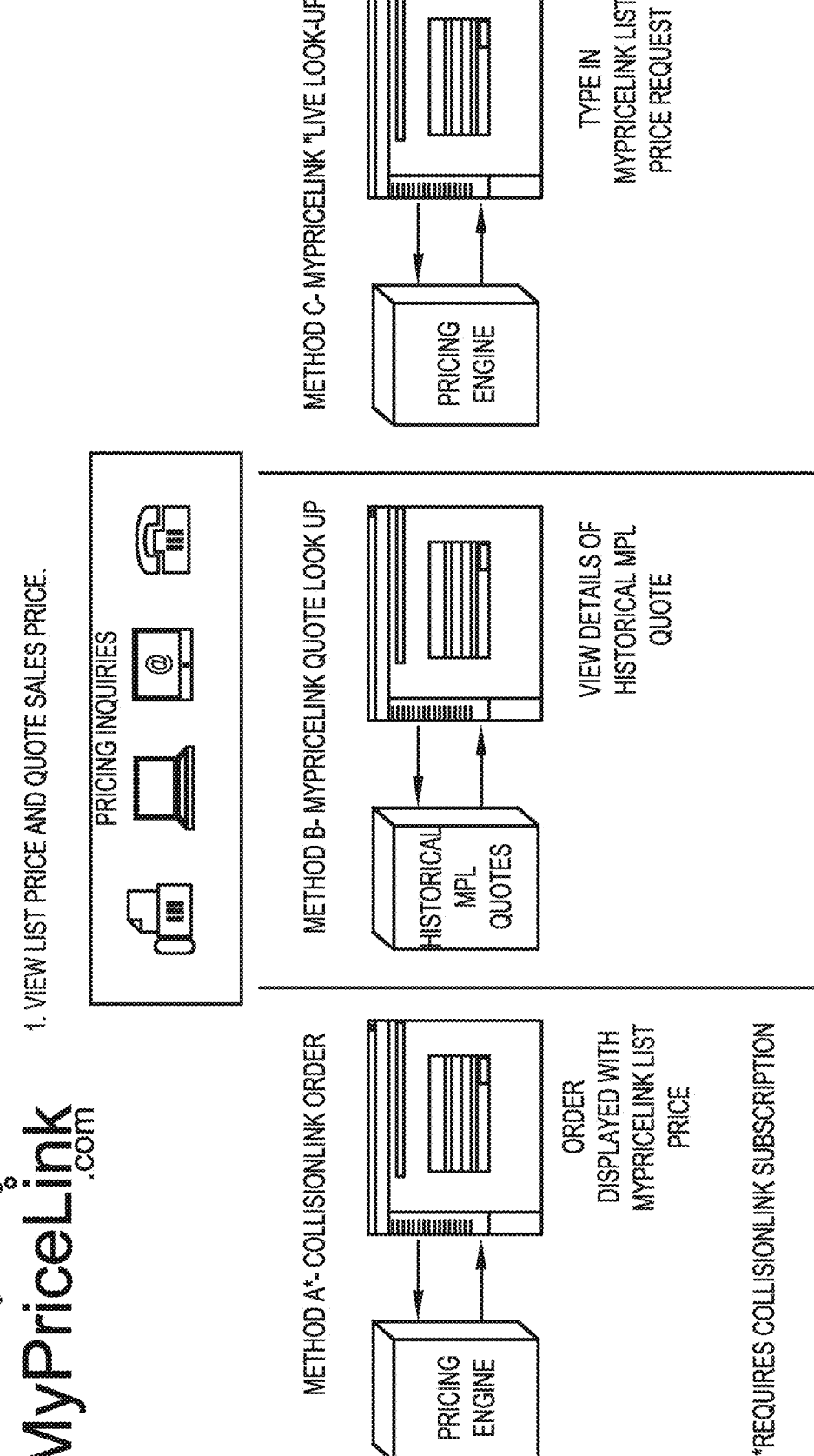
FIG. 41 is a schematic view showing different processes by which the exemplary PPC interfaces with other systems for purposes of providing pricing for vehicle collision parts.
Figure 42:
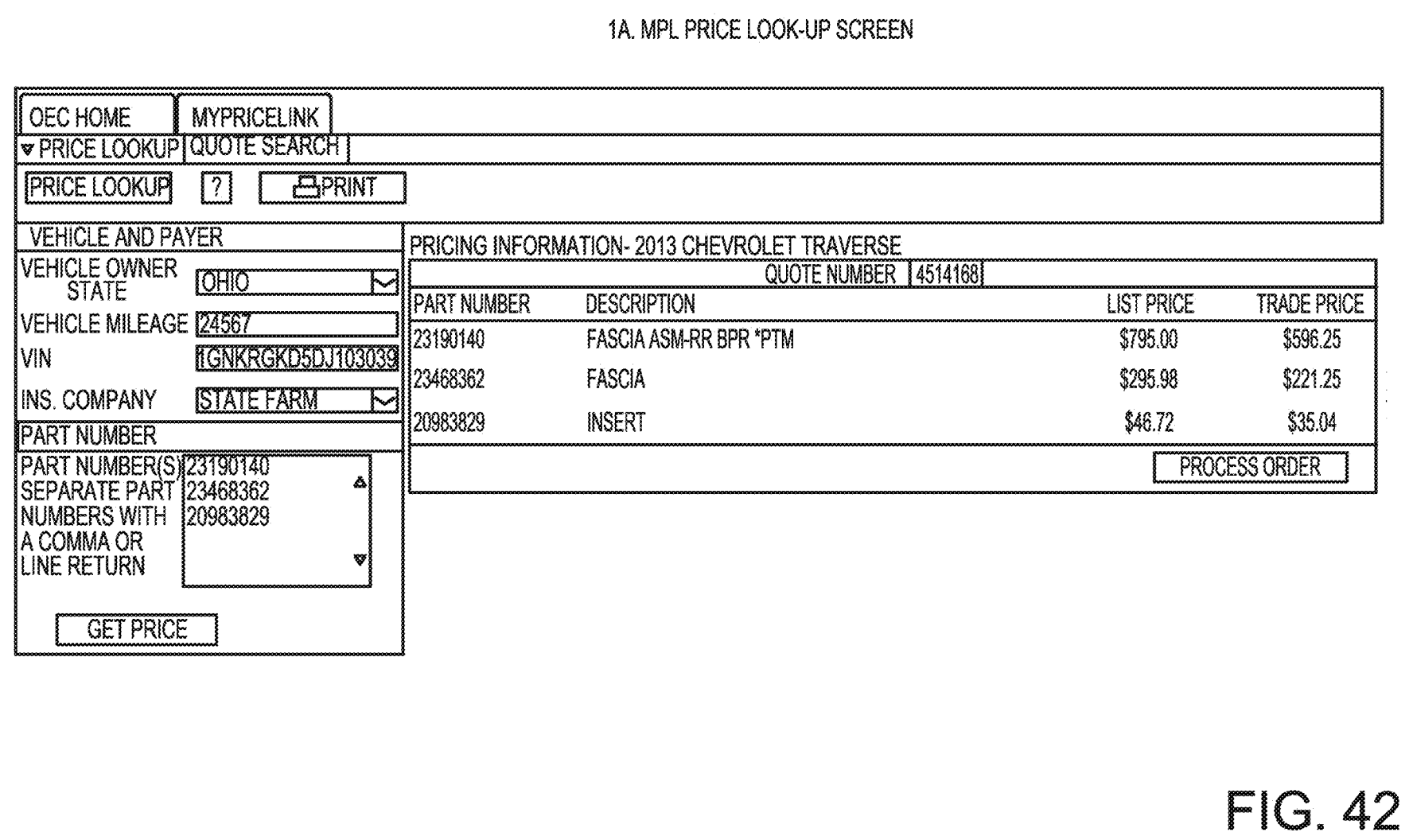

FIG. 41 reflects different options for viewing the list price in the PPR and quoting sales price by the dealer. The approach referred to as method A, involves a situation where a dealer uses the ADPOC to obtain prices via the CollisionLink order system. This is a system offered by OEConnection that provides a way for a dealer to acquire needed repair parts and to make repair parts the dealer has in inventory available to others. FIG. 42 shows an exemplary output display screen which shows an output produced on the display of the ADPOC through operation thereof in response to the PPC in response to a look up request. As highlighted in this example, the output provided by the PPC includes the parts and the list prices that the PPC has provided to the company responsible for payment or other entity that requested pricing. The PPC is also operative to provide to the ADPOC the trade price which reflects the price of each part recommended to be charged when the dealer sells such part to a body shop or other entity engaged in the repair business. The display also provides to the dealer the list price for the particular part.

Figure 44:
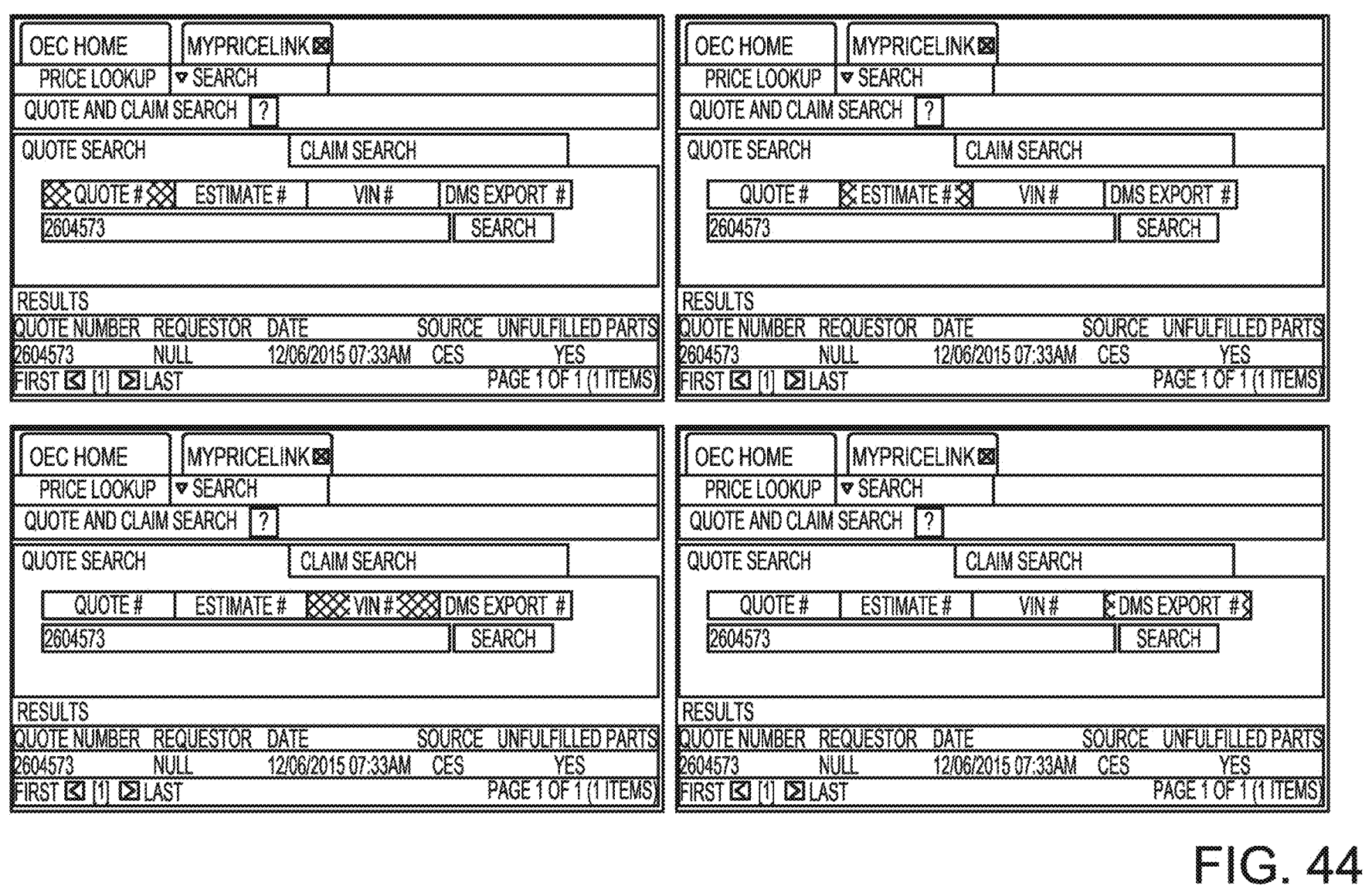

Referring again to FIG. 41, the method described in the middle includes the approach of looking up a PPR in the PPC data store as represented in FIG. 43. This approach to recovering PPR data from the PPC enables the dealer through the ADPOC to review the quote details. This includes both the OE parts and N-parts which have been included as part of the quote. In the exemplary arrangement, the PPC provides a segregated list of the non-OE parts that have also been specified for use in carrying out the repair. The PPC is operative to calculate responsive to its pricing logic the pricing that can be made available by the manufacturer to offer a price on a corresponding OE part that can be used instead of the specified recycled or aftermarket part which is at least as low as that offered for the used or aftermarket part. The exemplary arrangement further indicates the reimbursement that is offered to the dealer in the event that they sell the OE part in place of the used or aftermarket part specified. In the exemplary arrangement the PPC operates to determine if there is an opportunity to lower the price of the corresponding OE part so that it is more attractive to the VRE making the repairs than specified N-part. This enables the dealer selling the OE parts that have already been specified to have the opportunity to try to convert the VRE buyer to buying OE parts instead of the N-parts. Further as represented in FIG. 44, the quote look up functionality of the PPC enables the dealer to search for quotes within the system to find the particular PPR quote or quotes for the vehicles that are being repaired by the VRE who may approach the dealer about supplying the needed repair parts.

Referring again to FIG. 41, the method on the right enables the dealer to operate the PPC in conjunction with the live lookup. As represented in FIG. 45, in this exemplary system the PPC operates in conjunction with the CollisionLink system to provide pricing outputs concerning the repair parts of interest to the dealer. Likewise similar to the previously described embodiment, any N-parts which have been specified are segregated and information on suitable OE parts and additional discounting is offered to provide the dealer with an opportunity to sell the VRE additional OE parts at prices that meet the prices offered for the aftermarket or used parts. Of course it should be understood that these approaches and screen outputs that are provided to the dealer are exemplary and in other arrangements, other approaches may be used.

Figure 46:
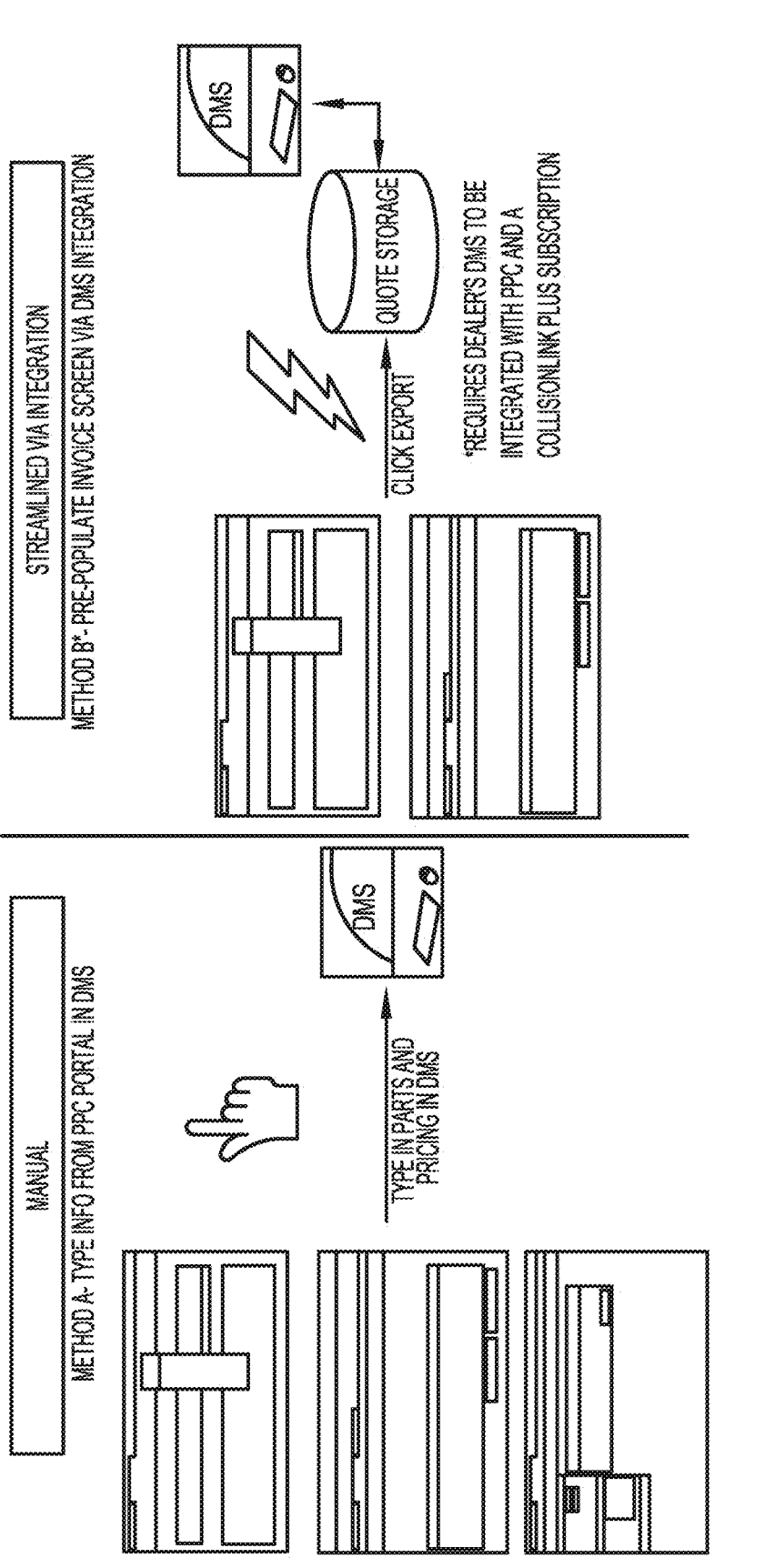
FIG. 46 shows schematically options for an ADPOC to produce invoices for collision parts.

FIG. 46 graphically describes the step associated with creating an exemplary invoice in the dealer management system (DMS) which includes the list and sales prices. As represented by the left-hand option shown in FIG. 46, one approach is to manually input the parts and pricing data produced by the PPC to the ADPOC and the DMS application operating therein. An alternative streamlined approach is represented on the right in FIG. 46. The streamlined approach enables the export of pricing data from the PPC stored information. This approach enables automatically integrating the pricing data into a quote produced by the DMS application. This automated export approach is carried out through additional functions that are available in conjunction with the CollisionLink service that is offered by OEConnection.

Figure 47:
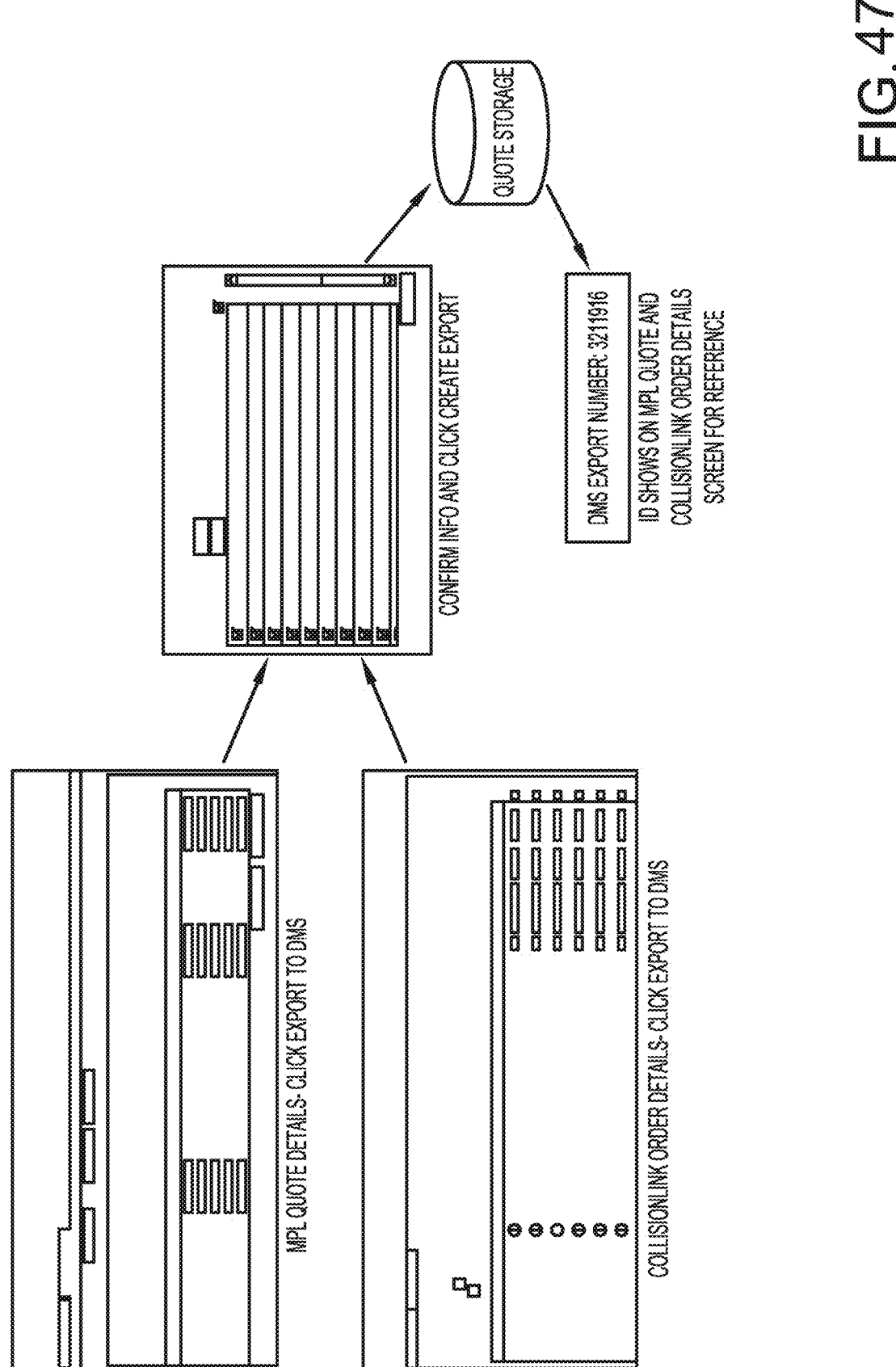
FIG. 47 is a schematic view related to the import of data stored by the PPC into an ADPOC function.

FIG. 47 is an alternative schematic view which represents the record data export capability that can be automatically carried out through the combined operational capabilities of the PPC, the DMS application operated by the dealer of the ADPOC, and the CollisionLink service. These capabilities enable the dealer to produce a quote from their system for selling the parts without the need for manual data inputs.

As previously discussed, in exemplary approaches vehicle manufacturers offer rebates to dealers in connection with the sale of OE parts. These rebates may increase in cases where the dealer is encouraged to drop the price of the part so as to make a sale of an OE part that replaces a specified aftermarket or used part.

Figure 48:
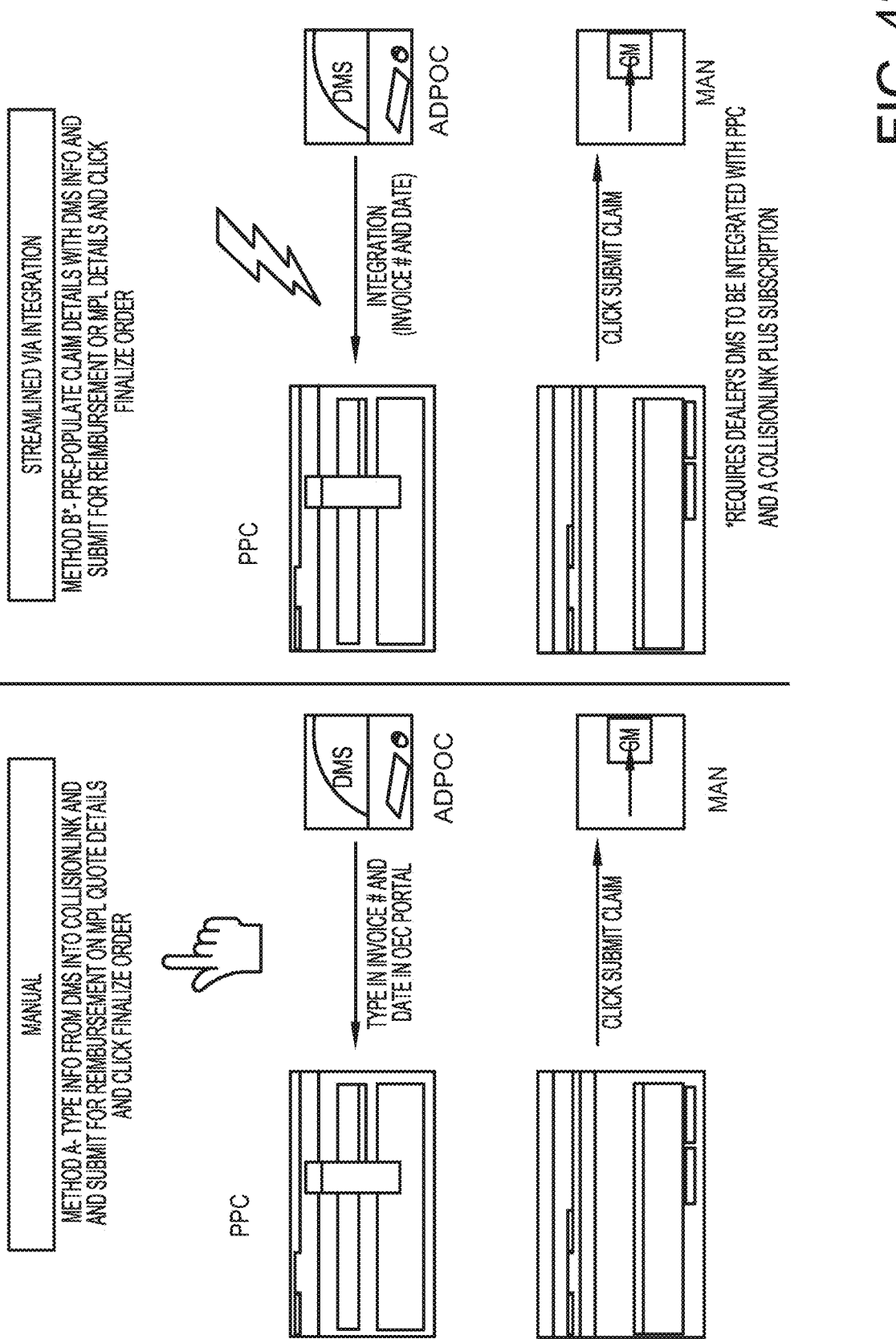
FIG. 48 is a schematic view representing options by which an auto dealer may present claims to the manufacturer of the OE part for reimbursement related to the dealer's sales of such parts.

FIG. 48 shows schematically the processes carried out for submitting a claim for reimbursement by the dealer to the vehicle manufacturer in connection with the sales of OE parts. As represented on the left in FIG. 48, the exemplary embodiment of the PPC enables the dealer to manually input the information from their ADPOC concerning the order into the PPC, and select to submit the claim for reimbursement to the manufacturer through operation of the PPC. The PPC operates in accordance with its programming to submit the claim for reimbursement of the dealer to the vehicle manufacturer.

Figure 49:
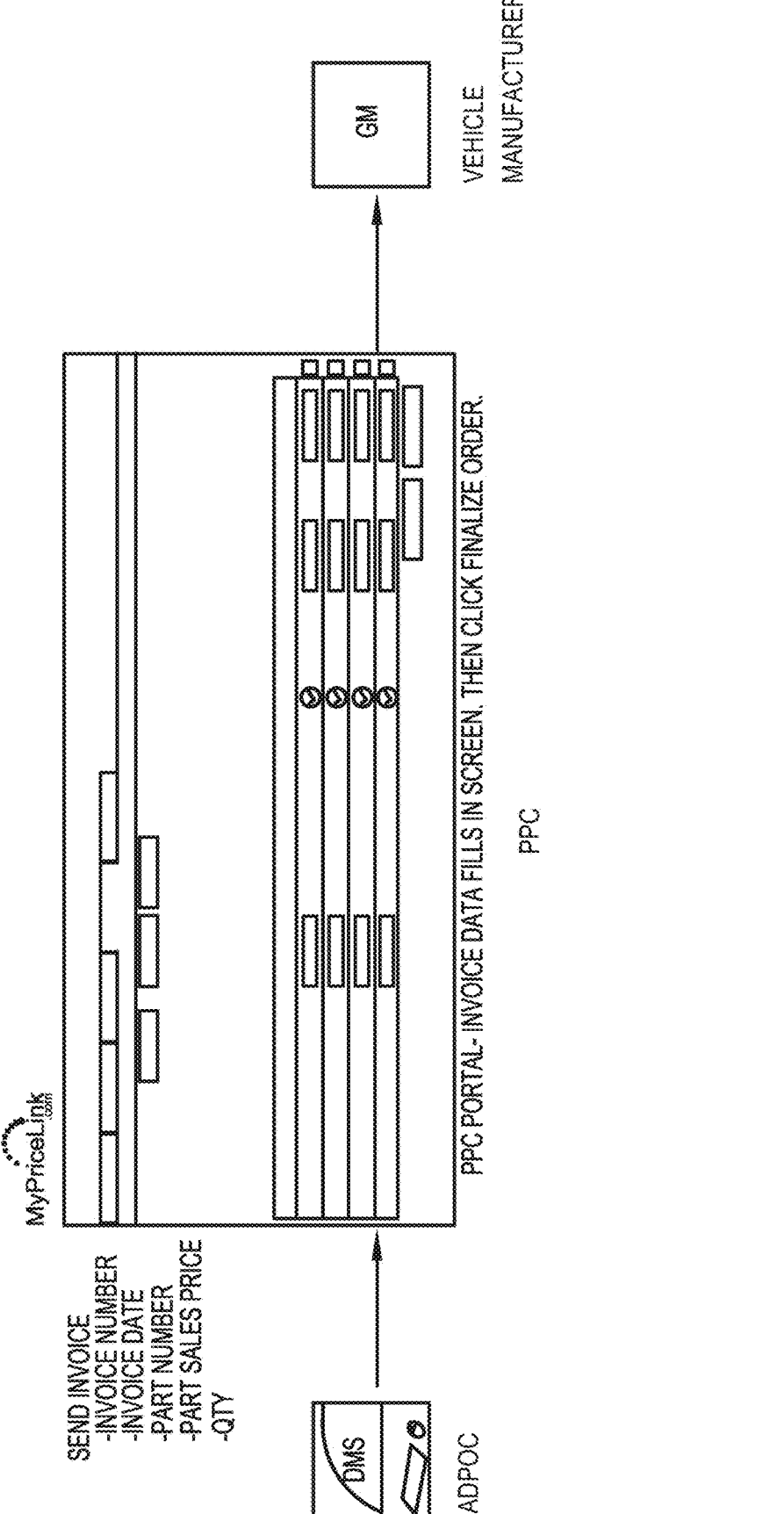
FIG. 49 is a schematic view showing the streamlined methodology for the submission of rebate claims to the vehicle manufacturer for OE parts sold by the auto dealer.

Alternatively as represented on the right in FIG. 48, manual aspects of this process can be automated. In the exemplary arrangement the automation process offered by the CollisionLink service of OEConnection enables automatically importing the record claim details from the ADPOC and the dealer management system application, to the PPC. Once the data has been automatically imported, the dealer may select to present the claim. This streamlined method for importing the invoice data is further represented in FIG. 49. The exemplary PPC is configured to accept the data automatically and import it into the proper fields within the reimbursement claim application. This readily enables the dealer to submit their claim associated with part sales to the manufacturer.

FIGS. 50-52 describe the logic carried out by the exemplary embodiment of the PPC in connection with providing prices for OE parts to the dealer in an effort to have the dealer be able to effectively compete on price with aftermarket parts or used parts that may be designated for use in connection with the repair or upgrade of a particular vehicle. As represented in FIG. 50, in the exemplary PPC pricing for OE parts to substitute for N-parts can be requested via a look up. As discussed previously, such a look up may be conducted via inputs to an ADPOC system or other suitable system operated by the dealer. However, as represented at the bottom of FIG. 50 when a look up of pricing for an OE part is conducted, when there is no existing parts pricing record (PPR), the pricing provided for the OE part will be based on the pricing logic for pricing the parts. It will not include the pricing logic to beat a lower price that may be associated with an N-part in an existing PPR record. However, as indicated on the right in FIG. 50, where there is existing PPR records which include N-parts for which OE parts can be substituted, the pricing logic in the exemplary PPC may operate to provide a lower competitor price for the OE part. Alternatively, as previously discussed, some embodiments of the PPC may be operative to determine N-parts that have likely been specified even when the N-parts are not identified in the NPR, and to provide parts identifying data for such OE parts in an SPR or other file.

FIG. 51 describes the PPC pricing logic in cases where there is not a pre-existing PPR data record stored in the system. In this case to calculate the pricing of the OE part, the system checks the state and national files for the pricing associated with the part. If the part's pricing is not at the lowest selling price in either file, a default dealer price is offered which is a set percentage discount off the listed dealer price. As represented in FIG. 51A, step two of the logic considers whether the vehicle's age and mileage fall within the payor company's threshold for requiring OE parts. If the company responsible for payment requires OE parts under its rules, there is no reason to further discount the OE part because no substitute N-parts may be provided. A third step in the logic is to resolve the state of the vehicle owner and apply any rules associated with that state discount. The final step is to add the age/mileage discount and state discount and to calculate the proposed price. This proposed price is then compared to the lowest price at which the OE part has been offered. If the calculation results in a price lower than the lowest allowable price, the lowest allowable price is offered. If not, the calculated discount is what is used. Generally this approach will result in a price for the OE part that is at or below the N-part which could be specified for use in connection with the repair of the particular vehicle.

FIG. 52 describes the exemplary logic when there is an existing PPR record which includes an N-part. This approach involves checking the lowest allowed PPC price that is allowed, similar to the price from the prior approach. However, in this case, the second step involves comparing the calculated discount price to the N-part price included in the PPR. The pricing logic associated with the PPC then operates to match the price for the N-part or offer the lowest available price. Of course as previously discussed, in exemplary arrangements when the PPC operates to lower the price, the reimbursement to the dealer is increased so that the dealer maintains a reasonable profit margin.

The result of applying these approaches is to enable the dealer to sell the VRE responsible for repairing or upgrading the vehicle the higher quality OE parts at the same or a lower price than the VRE would pay to acquire aftermarket or used parts. In this way, the VRE can avoid the possible additional labor and work that may result from having to make a non-OE part that will work satisfactorily in connection with the repair of the vehicle. In addition, the vehicle owner generally gets a higher quality of repairs by having OE parts that are the same as were installed when the vehicle was new.

It should be understood that the approaches described in connection with exemplary PPC and related devices may be supplemented to add additional functions and capabilities to further enhance the procurement of repair parts. Such additional features may include, for example, the automated tracking of the dispatch and delivery of the repair and upgrade parts, the staging of deliveries for selected items or parts and provisions for assuring that OE parts that come from different locations are coordinated to arrive at the VRE before the time that they are needed in conjunction with particular repair work that needs to be done on the vehicle.

These and other capabilities to facilitate upgrade or repair of damaged vehicles and the parts associated therewith, provide significant advantages for the repair or upgrade of damaged or undamaged vehicles.

Thus the system controlled responsive to data bearing records of exemplary embodiments achieves useful results, eliminates difficulties encountered in the use of existing system and attains the useful and beneficial results described herein.

In the foregoing description certain terms have been used in connection with describing exemplary embodiments for purposes of brevity, clarity and understanding. However, no unnecessary limitations are to be implied therefrom because such terms are used for descriptive purposes and are intended to be broadly construed. Moreover the descriptions and illustrations herein are by way of examples and the new and useful concepts are not limited to the features that are shown and described.

Further in the following claims any feature described as a means for performing a function shall be construed as encompassing any means known to those skilled in the art as being capable of carrying out the recited function and shall not be deemed limited to the particular means shown or described for performing the recited function in the foregoing description or mere equivalents thereof.

Having described the features, discoveries and principles utilized in the exemplary embodiments, the manner in which they are constructed and operated and the advantages and useful results attained, the new and useful structures, devices, elements, arrangements, parts, combinations, systems, equipment, operations and methods, processes and relationships are set forth in the appended claims.

We claim:

1. At least one machine readable storage medium bearing non-transitory circuit executable instructions which are operable to cause machine operations comprising:

a) at least one repair estimate calculation circuit (RECC) to operate responsive at least in part to received vehicle identifying data corresponding to a vehicle to determine at least one vehicle part usable to at least one of repair or upgrade the vehicle, generate a needed parts record (NPR) wherein the NPR includes parts identifying data usable to identify at least one of the vehicle parts, b) at least one of the RECC and a parts pricing circuit (PPC) to operate responsive to stored vehicle operation data for the vehicle to determine at least one further vehicle part that is near an end of useful life and to cause a supplemental parts record (SPR) including parts identifying data usable to identify the at least one further vehicle part to be produced, c) the PPC to operate responsive at least in part to the parts identifying data included in the NPR and the SPR to cause a parts pricing record (PPR) to be produced, wherein the PPR includes parts identifying data and respective price data for at least one of the vehicle parts corresponding to the parts identifying data included in the NPR and the SPR, wherein the PPR has an associated unique identifier (ID), d) the RECC to operate responsive at least in part to the PPR included data to cause a repair order record corresponding to the repair or upgrade of the vehicle to be generated, e) PPR included data to be made available to a parts order circuit (POC), through operation of at least one of the RECC and the PPC, responsive at least in part to receipt of data corresponding to the ID from the POC, wherein the POC is enabled to operate responsive at least in part to the PPR included data to cause at least one vehicle part corresponding to the PPR included data to be made available for installation on the vehicle.

2. The at least one medium according to claim 1 wherein in (b), at least some of the stored vehicle operation data is received wirelessly from the vehicle.

3. The at least one medium according to claim 1 wherein in (a) the vehicle identifying data includes a vehicle identification number (VIN), and wherein in (e) the ID includes at least a portion of the VIN.

4. The at least one medium according to claim 3 wherein the RECC operates to cause entity identifying data to be communicated to the PPC, wherein in (c) at least some of the price data included in the PPR is determined responsive at least in part to the entity identifying data.

5. The at least one medium according to claim 4 wherein the RECC operates to cause data corresponding to at least one of the year, make, model and mileage associated with the vehicle to be communicated to the PPC, wherein in (c) at least some of the price data included in the PPR is determined responsive at least in part to the at least one of the year, make, model and mileage data.

6. The at least one medium according to claim 5 wherein in (a) the vehicle identifying data includes data corresponding to a location of the vehicle, and wherein in at least one of (a) and (b) the parts identifying data for at least one vehicle part is determined responsive at least in part to the location of the vehicle.

7. The at least one medium according to claim 6 wherein the entity identifying data includes responsible payor data, wherein the responsible payor data corresponds to an entity responsible for payment for the at least one of repair or upgrade to the vehicle, wherein in (c) at least some of the price data is determined responsive at least in part to the responsible payor data.

8. The at least one medium according to claim 7 wherein the responsible payor data is communicated to the PPC in association with the NPR, wherein in (c) the PPC is operative to cause price data for at least one vehicle part to be included in the PPR responsive at least in part to the responsible payor data.

9. The at least one medium according to claim 8 and further comprising:

subsequent to (e) the PPC to operate to calculate rebate data associated with at least one vehicle part for which identifying data is included in the PPR, cause the rebate data to be stored in at least one data store in association with data corresponding to the ID, wherein the ID is usable by the POC to access the stored rebate data.

10. The at least one medium according to claim 9 wherein in (a) the RECC is operated by a vehicle repair entity (VRE), and wherein in (e) the POC is operated by a vehicle dealer that sells a brand of new vehicles that corresponds to a brand associated with the vehicle.

11. The at least one medium according to claim 1 wherein in (a) the at least one vehicle part includes repair parts,
performance improvement parts, enhanced luxury parts, security improvement parts, circuit executable instructions, autonomous vehicle operation parts, semi-autonomous vehicle operation parts, electric vehicle batteries, and hybrid vehicle batteries.

12. The at least one medium according to claim 1 wherein data corresponding to at least one of the year, make, model and mileage associated with the vehicle is communicated to the PPC, and wherein in (c) at least some of the price data included in the PPR is determined responsive at least in part to the at least one of the year, make, model and mileage data.

13. The at least one medium according to claim 1 wherein the vehicle identifying data includes data corresponding to a location of the vehicle, and wherein the parts identifying data for at least one part that is included in at least one of the NPR, the SPR and the PPR is determined responsive at least in part to the location of the vehicle.

14. The at least one medium according to claim 1 wherein responsible payor data is communicated to the PPC, wherein the responsible payor data corresponds to an entity responsible for payment for the at least one of repair or upgrade to the vehicle, wherein in (c) the price data for at least one of the vehicle parts is determined responsive at least in part to the responsible payor data.

15. The at least one medium according to claim 1, and further comprising:

subsequent to (e) the PPC to operate to calculate rebate data associated with at least one part for which identifying data is included in the PPR, cause the rebate data to be stored in at least one data store in association with the data corresponding to ID, wherein the POC is enabled to access the rebate data through use of the ID.

16. The at least one medium according to claim 1 and further comprising:

prior to (c) the RECC to operate to receive responsible payor data, wherein the responsible payor data corresponds to an entity responsible for payment for the at least one of repair or upgrade to the vehicle, wherein parts identifying data which corresponds to at least one vehicle part that is included in at least one of the NPR, the SPR or the PPR is determined responsive at least in part to the responsible payor data.

17. At least one machine readable storage medium bearing non-transitory circuit executable instructions which are operable to cause machine operations comprising:

a) at least one repair estimate calculation circuit (RECC) to operate responsive at least in part to vehicle identifying data, to determine a plurality of vehicle parts usable to at least one of repair and upgrade the vehicle, b) at least one circuit to operate responsive to stored vehicle operation data for the vehicle, to determine at least one further vehicle part that is near an end of useful life, c) responsive to the determinations in (a) and (b), at least one parts record to be generated, wherein the at least one parts record includes parts identifying data usable to identify the plurality of vehicle parts and the at least one further vehicle part, d) the RECC to communicate with a parts pricing circuit (PPC), e) responsive at least in part to the at least one parts record and the communication in (d), at least one of the RECC and the PPC to operate to cause, a parts pricing record (PPR) to be produced, wherein the PPR includes parts identifying data and respective price data for at least some of the vehicle parts corresponding to the parts identifying data included in the at least one parts record, and a unique identifier (ID) to be associated with the at least one parts record, f) the RECC to operate to generate a repair order record, wherein the repair order record corresponds to the at least one of repair and upgrade of the vehicle and includes the ID, g) responsive at least in part to receipt of data corresponding to the ID from a parts order circuit (POC), at least one of the RECC and the PPC to operate to make at least some of the PPR included data accessible to the POC, wherein the POC is enabled to operate responsive at least in part to the PPR included data to cause at least one vehicle part corresponding to the PPR included data to be available to install on the vehicle.

18. The at least one medium according to claim 17 and further comprising:

the RECC to operate to receive data corresponding to at least one of a location, a year, a make, a model and a mileage associated with the vehicle, wherein at least some of the parts identifying data usable to identify the plurality of vehicle parts included in the at least one parts record is determined responsive at least in part to at least one of the location, the year, the make, the model and the mileage.

19. The at least one medium according to claim 17 and further comprising:

the RECC to operate to receive responsible payor data, wherein the responsible payor data corresponds to an entity responsible for payment for the repair or upgrade to the vehicle, wherein at least some of the parts identifying data corresponding to at least one vehicle part is included in the at least one parts record responsive at least in part to the responsible payor data.

20. The at least one medium according to claim 17 wherein the PPC is operative to receive responsible payor data, wherein the responsible payor data corresponds to an entity responsible for payment for the repair or upgrade to the vehicle, wherein at least some of the price data included in the PPR data is determined responsive at least in part to the responsible payor data.

21. The at least one medium according to claim 17 and further comprising:

the PPC to operate to calculate rebate data associated with at least one vehicle part for which parts identifying data is included in the PPR, at least one of the RECC and the PPC to operate to make the rebate data accessible to the POC.

22. The at least one medium according to claim 17 wherein in (b) the stored vehicle operation data is received wirelessly from the vehicle.

23. The at least one medium according to claim 17 wherein in (a) the vehicle identifying data includes a vehicle identification number (VIN), wherein in (e) the ID includes at least a portion of the VIN.

24. The at least one medium according to claim 17 wherein in (c) the at least one parts record includes parts identifying data corresponding to at least one of
a repair part,
a performance improvement part,
an enhanced luxury part,
a security improvement part,
circuit executable instructions,
an autonomous vehicle operation part,
a semi-autonomous vehicle operation part,
an electric vehicle battery, and
a hybrid vehicle battery.

25. At least one machine readable storage medium bearing non-transitory circuit executable instructions which are operable to cause machine operations comprising:
a) at least one circuit to operate responsive at least in part to vehicle identifying data corresponding to a vehicle that is to be at least one of repaired and upgraded, to determine a plurality of vehicle parts usable to at least one of repair and upgrade the vehicle and to determine based on stored vehicle operation data at least one further vehicle part that is near an end of useful life,
b) responsive at least in part to at least one determination in (a), the at least one circuit to operate to cause determination of parts record data, wherein the parts record data includes parts identifying data usable to identify at least some of the plurality of vehicle parts and the at least one further vehicle part,
c) responsive at least in part to the parts record data, at least one of a repair estimate calculation circuit (RECC) and a parts pricing circuit (PPC) to operate to produce parts pricing record (PPR) data, wherein the PPR data includes parts identifying data and respective price data for at least some of the vehicle parts corresponding to the parts identifying data included in the parts record data, and
cause a unique identifier (ID) to be associated with at least one of the PPR data and the parts record data,
d) the RECC to operate to cause generation of repair order record data corresponding to the vehicle,
e) responsive at least in part to receipt of data corresponding to the ID from a parts order circuit (POC), at least one of the RECC and the PPC to operate to make at least some of the PPR data accessible to the POC,
wherein the POC is enabled to operate responsive at least in part to the accessible PPR data to cause at least one vehicle part corresponding to the accessible PPR data to be available to install on the vehicle.

26. The at least one medium according to claim 25 wherein the RECC is operative to cause the parts record data to be sent to the PPC, and
the PPC is operative to produce the PPR in (c), and wherein the PPC is operative to receive the ID from the POC in (e).

27. The at least one medium according to claim 25 wherein in (a) the stored vehicle operation data includes data reported wirelessly by the vehicle.

28. The at least one medium according to claim 25 and further comprising:
at least one of the RECC and the PPC to operate to receive responsible payor data, wherein the responsible payor data corresponds to an entity responsible for payment for at least one of repair and upgrade of the vehicle,
wherein in (c) the price data corresponding to at least one of the vehicle parts included in the PPR data, is determined responsive at least in part to the responsible payor data.

* * * * *